(12) United States Patent
Tsurumi

(10) Patent No.: US 8,126,206 B2
(45) Date of Patent: Feb. 28, 2012

(54) IMAGE PROCESSING APPARATUS, IMAGE PROCESSING METHOD, AND PROGRAM

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 1045 days.

(21) Appl. No.: 12/033,564

(22) Filed: Feb. 19, 2008

(65) Prior Publication Data

US 2008/0199044 A1 Aug. 21, 2008

(30) Foreign Application Priority Data

Feb. 20, 2007 (JP) ................................ P2007-038853

(51) Int. Cl.
*G06K 9/00* (2006.01)
*G06K 9/46* (2006.01)

(52) U.S. Cl. ..................... 382/103; 382/100; 382/190

(58) Field of Classification Search .................. 382/100, 382/103, 190
See application file for complete search history.

(56) References Cited

U.S. PATENT DOCUMENTS

| | | | | |
|---|---|---|---|---|
| 4,083,034 A * | 4/1978 | Hicks | | 382/178 |
| 5,499,306 A * | 3/1996 | Sasaki et al. | | 382/291 |
| 6,594,378 B1 * | 7/2003 | Li et al. | | 382/128 |
| 7,164,786 B2 * | 1/2007 | Katayama et al. | | 382/154 |
| 7,221,777 B2 * | 5/2007 | Nagaoka et al. | | 382/104 |
| 7,657,059 B2 * | 2/2010 | Olson et al. | | 382/103 |
| 2003/0169928 A1 * | 9/2003 | Stanek | | 382/232 |
| 2003/0206653 A1 * | 11/2003 | Katayama et al. | | 382/154 |
| 2003/0219147 A1 * | 11/2003 | Nishiura | | 382/103 |
| 2004/0146183 A1 * | 7/2004 | Shimoni | | 382/103 |
| 2005/0013466 A1 * | 1/2005 | Beun | | 382/107 |
| 2005/0213821 A1 * | 9/2005 | Matsuda | | 382/199 |
| 2006/0008119 A1 * | 1/2006 | Chang et al. | | 382/103 |
| 2007/0018811 A1 * | 1/2007 | Gollu | | 340/539.13 |
| 2007/0097112 A1 * | 5/2007 | Greig | | 345/419 |
| 2008/0019568 A1 * | 1/2008 | Nishiura | | 382/103 |
| 2008/0151106 A1 * | 6/2008 | Verburgh et al. | | 348/452 |
| 2008/0219545 A1 * | 9/2008 | Chen et al. | | 382/145 |

FOREIGN PATENT DOCUMENTS

JP 2006-065399 3/2006

OTHER PUBLICATIONS

Lowe, David G., "Object Recognition from Local Scale-Invariant Features", in Proc. International Conference on Computer Vision, vol. 2, pp. 1150-1157, Sep. 20-25, 1999.

(Continued)

*Primary Examiner* — Vikkram Bali
*Assistant Examiner* — Avinash J Yentrapati
(74) *Attorney, Agent, or Firm* — Finnegan, Henderson, Farabow, Garrett & Dunner, L.L.P.

(57) ABSTRACT

Disclosed herein is an image processing apparatus for recognizing, from a taken image, an object corresponding to a registered image registered in advance, including, an image taker configured to take an image of a subject to obtain the taken image of the subject, a recognizer configured to recognize, from the taken image, an object corresponding to the registered image, a first specified area tracker configured to execute first specified area tracking processing for tracking, in the taken image, a first tracking area specified on the basis of a result of recognition by the recognizer, and a second specified area tracker configured to execute second specified area tracking processing for tracking a second specified area specified on the basis of a result of the first specified area tracking processing.

15 Claims, 42 Drawing Sheets

OTHER PUBLICATIONS

Mikolajczyk, Krystian et al., "Indexing based on scale invariant interest points", International Conference on Computer Vision, IEEE, pp. 525-531, (2001).

Lowe, David G., "Distinctive Image Features from Scale-Invariant Keypoints", International Journal of Computer Vision, vol. 60, No. 2, pp. 91-110, (2004).

Lindeberg, Tony, "Scale-space theory: A basic tool for analysing structures at different scales", Journal of Applied Statistics, vol. 21, No. 2, pp. 225-270, (1994).

Bouguet, Jean-Yves, "Pryamidal Implementation of the Lucas Kanade Feature Tracker Description of the algorithm", Intel Corporation, Microprocessor Research Labs, pp. 1-9.

* cited by examiner

LOCAL AREA CONCENTRATION GRADIENT

FEATURE POINT P

FEATURE POINT NEIGHBORHOOD

TIME t-1    TIME t

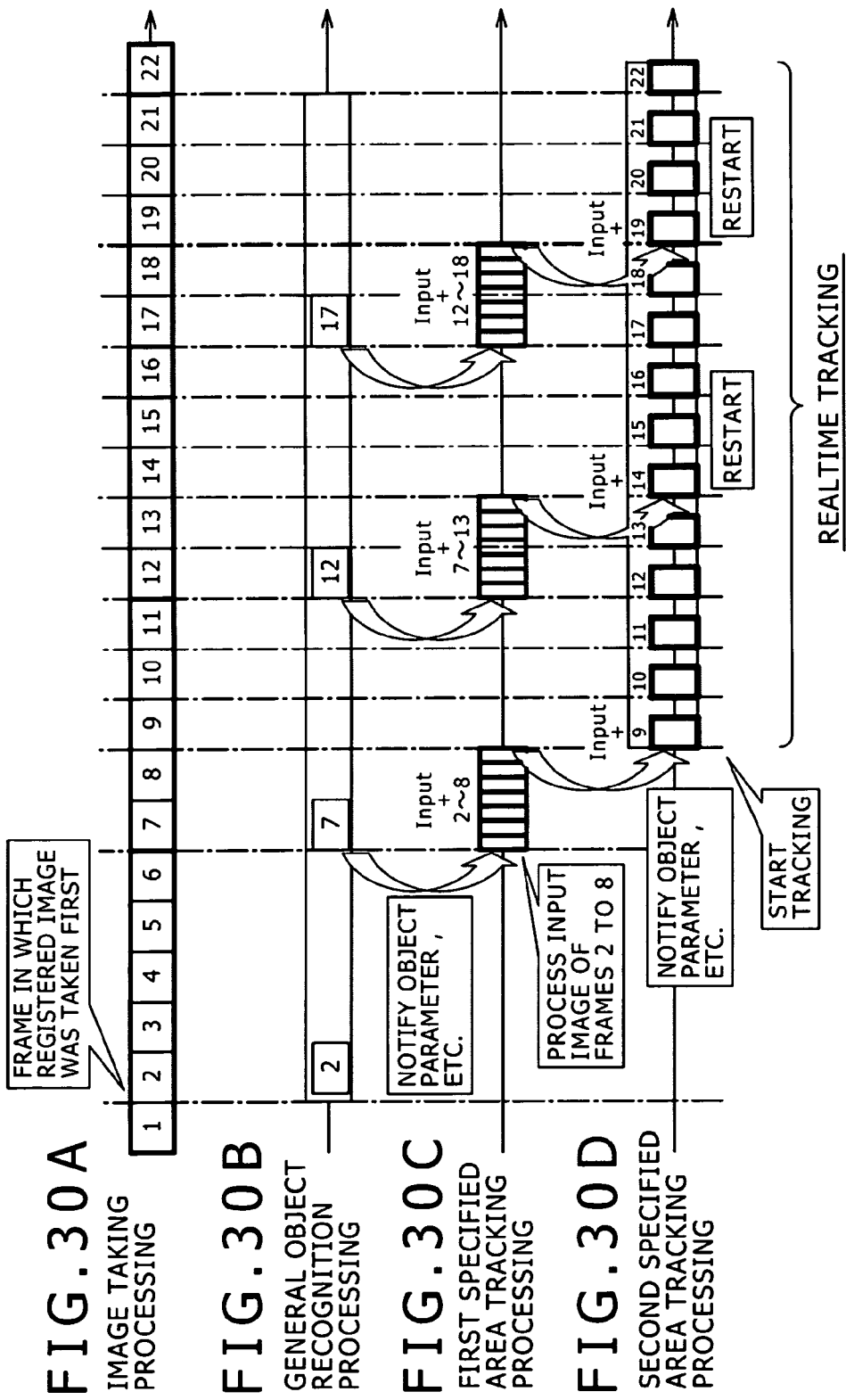

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2007-038853 filed in the Japan Patent Office on Feb. 20, 2007, the entire contents of which being incorporated herein by reference.

BACKGROUND OF THE INVENTION

1. Field of the Invention

The present invention relates to an image processing apparatus, an image processing method, and a program and, more particularly, to an image processing apparatus, an image processing method, and a program that are configured to execute realtime precision tracking.

2. Description of the Related Art

For example, an image processing apparatus is proposed as an image processing apparatus configured to recognize a registered model image from an input image, in which the resolution of an image input is lowered at a predetermined ratio, a multiple-resolution image is generated made up of images having two or more different resolutions, and a comparison is made between the feature quantity of feature points in the image of each resolution of these multiple-resolution images and the feature quantity of a model image, thereby estimating the location and posture in the input image of the model image on the basis of a candidate-corresponding feature point pair as a pair of feature points having a similar feature quantity (refer to Patent document 1: Japanese Patent Laid-Open No. 2006-065399 below for example).

SUMMARY OF THE INVENTION

However, because the above-mentioned related-art image processing apparatus generates a multiple-resolution image and makes a comparison between the feature quantities in the image of all resolutions, it takes comparatively long to carry out the processing for estimating the location and posture of a model image in an input image. In addition, because the above-mentioned related-art image processing apparatus makes a comparison between the feature quantities of lots of model images registered in a database for example, as the data amounts in the database increases, it takes longer to carry out the processing. Consequently, it is difficult for the related-art image processing apparatus to realtime track the model image in an input image on the basis of the location and posture estimated by this image processing apparatus.

Therefore, the present invention addresses the above-identified and other problems associated with related-art methods and apparatuses and solves the addressed problems by providing an image processing apparatus, an image processing method, and a program configured to provide precision realtime tracking of model images.

In carrying out an embodiment of the present invention, there is provided an image processing apparatus for recognizing, from a taken image, an object corresponding to a registered image registered in advance, including:

an image taker configured to take an image of a subject to obtain the taken image of the subject;

a recognizer configured to recognize, from the taken image, an object corresponding to the registered image;

a first specified area tracker configured to execute first specified area tracking processing for tracking, in the taken image, a first tracking area specified on the basis of a result of recognition by the recognizer; and a second specified area tracker configured to execute second specified area tracking processing for tracking a second specified area specified on the basis of a result of the first specified area tracking processing.

In carrying out another embodiment of the present invention, there is provided an image processing method for an image processing apparatus for recognizing, from a taken image, an object corresponding to a registered image, including the steps of:

taking an image of a subject to obtain the taken image of the subject;

recognizing, from the taken image, an object corresponding to the registered image;

executing first specified area tracking processing for tracking, in the taken image, a first tracking area specified on the basis of a result of recognition in the recognizing step; and executing second specified area tracking processing for tracking a second specified area specified on the basis of a result of the first specified area tracking processing.

In carrying out yet another embodiment of the present invention, there is provided a program configured to make a computer execute recognition processing for recognizing, from a taken image, an object corresponding to a registered image registered in advance, including the steps of:

taking an image of a subject to obtain the taken image of the subject;

recognizing, from the taken image, an object corresponding to the registered image;

executing first specified area tracking processing for tracking, in the taken image, a first tracking area specified on the basis of a result of recognition in the recognizing step; and executing second specified area tracking processing for tracking a second specified area specified on the basis of a result of the first specified area tracking processing.

In carrying out yet another embodiment of the present invention, there is provided an image processing apparatus for recognizing, from a taken image, an object corresponding to a registered image registered in advance, including:

an image taker configured to take an image of a subject to obtain the taken image corresponding to the subject;

a recognizer configured to recognize, from the taken image, an object corresponding to the registered image;

two specified area trackers configured to execute a first specified area tracking processing for tracking, in the taken image, a first specified area specified on the basis of a result of recognition by the recognizer and second specified area tracking processing for tracking, in the taken image, a second specified area specified on the basis of a result of the first specified area tracking processing, wherein the two specified area trackers alternately execute the second specified area tracking processing with one of the two specified area trackers starting the first specified area tracking processing while the other is executing the second specified area tracking processing.

In carrying out yet another embodiment of the present invention, there is provided an image processing method for an image processing apparatus for recognizing, from a taken image, an object corresponding to a registered image registered in advance, including the steps of:

taking an image of a subject to obtain the taken image corresponding to the subject;

recognizing, from the taken image, an object corresponding to the registered image;

executing, by two specified area trackers, a first specified area tracking processing for tracking, in the taken image, a first specified area specified on the basis of a result of recognition by the recognizer and second specified area tracking processing for tracking, in the taken image, a second specified area specified on the basis of a result of the first specified area tracking processing, wherein, while one of first specified area tracking processing for tracking, in the taken image, a first specified area specified on the basis of a result of the recognition and second specified area tracking processing for tracking, in the taken image, a second specified area on the basis of a result of the first specified area tracking processing is executing the second specified area tracking processing, the other starts the first specified area tracking processing, thereby alternately executing the second specified area tracking processing.

In carrying out yet another embodiment of the present invention, there is provided a program configured to make a computer execute recognition processing for recognizing, from a taken image, an object corresponding to a registered image registered in advance, including the steps of:

taking an image of a subject to obtain the taken image corresponding to the subject;

recognizing, from the taken image, an object corresponding to the registered image;

executing, by two specified area trackers, a first specified area tracking processing for tracking, in the taken image, a first specified area specified on the basis of a result of recognition by the recognizer and second specified area tracking processing for tracking, in the taken image, a second specified area specified on the basis of a result of the first specified area tracking processing, wherein, while one of first specified area tracking processing for tracking, in the taken image, a first specified area specified on the basis of a result of the recognition and second specified area tracking processing for tracking, in the taken image, a second specified area on the basis of a result of the first specified area tracking processing is executing the second specified area tracking processing, the other starts the first specified area tracking processing, thereby alternately executing the second specified area tracking processing.

BRIEF DESCRIPTION OF THE DRAWINGS

Other objects and aspects of the invention will become apparent from the following description of embodiments with reference to the accompanying drawings in which:

FIGS. 30A, 30B, 30C and 30D are diagrams illustrating timings of processing in the image processing apparatus shown in FIG. 2;

DETAILED DESCRIPTION OF THE PREFERRED EMBODIMENTS

This invention will be described in further detail by way of embodiments thereof with reference to the accompanying drawings.

Figure 1:
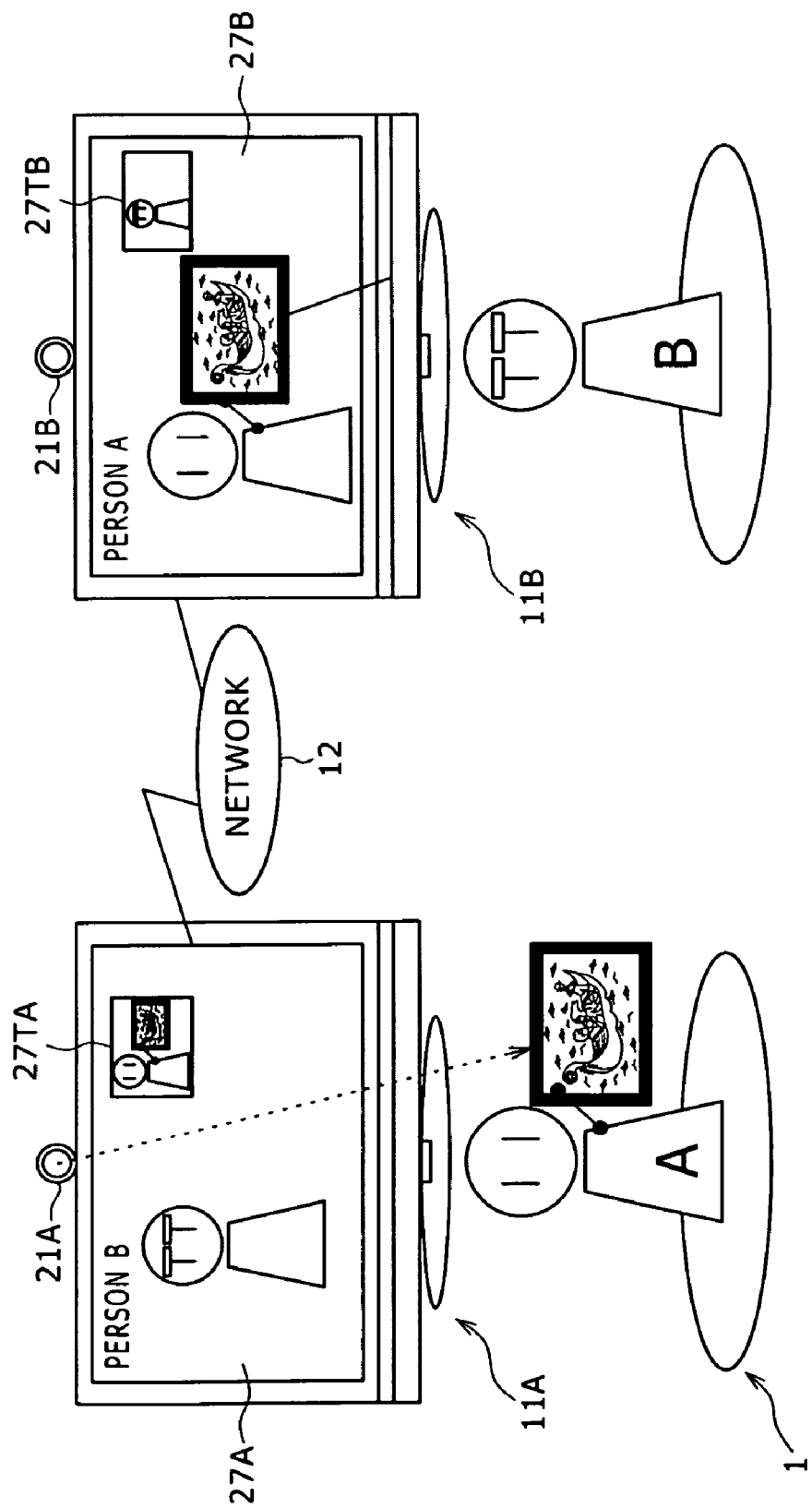
FIG. 1 is a schematic diagram illustrating an outline of an image processing system practiced as one embodiment of the invention.

Now, referring to FIG. 1, there is shown an image processing system 1 practiced as one embodiment of the invention.

The image processing system 1 is made up of an image processing apparatus 11A and an image processing 11B connected thereto via a network 12, such as the Internet. Subject A (person A) that is imaged by the image processing apparatus 11A telecommunicates, via the network 12, with subject B (person B) that is imaged by the image processing apparatus 11B.

To be more specific, an image pickup block 21A arranged on the image processing apparatus 11A takes an image of subject A. The image processing apparatus 11A transmits the taken image of subject A to the image processing apparatus 11B via the network 12. On the other hand, an image pickup block 21B arranged on the image processing apparatus 11B takes an image of subject B. The image processing apparatus 11B transmits the taken image of subject B to the image processing apparatus 11A via the network 12.

The taken image of subject B received from the image processing apparatus 11B is displayed on the entire screen of an output block 27A arranged on the image processing apparatus 11A. It should be noted that, as shown in FIG. 1, the taken image of subject A captured by the image pickup block 21A is also displayed in a window 27TA located in the upper right of the screen of the output block 27A.

Likewise, the taken image of subject A received from the image processing apparatus 11A is displayed on the entire screen of an output block 27B arranged on the image processing apparatus 11B. The taken image of subject B captured by the image pickup block 21B is also displayed in a window 27TB. Located in the upper right of the screen of the output block 27B.

As shown in FIG. 1, if subject A holds, by the hand, a print of a registered photograph or a digital camera or a mobile phone with a registered still image or moving image displayed on a display section thereof (hereafter generically referred to as a registered image), the image processing apparatus 11A recognizes the location and posture of an object (the image of a registered image in this example) corresponding to the registered image in the taken image of subject A taken by the image pickup block 21A. Then, on the basis of the recognized location and posture, the image processing apparatus 11A changes the object corresponding to the registered image in the taken image of subject A (hereafter appropriately referred to as a target object) to the registered image.

Namely, in the taken image of subject A, a photograph print hand-held by subject A or a still image or a moving image displayed on the display section of a digital camera or a mobile phone hand-held by subject A is changed to the registered one of that photograph or the still image or the moving image. The image processing apparatus 11A transmits the taken image of subject A after change to the image processing apparatus 11B via the network 12. Consequently, the output block 27B of the image processing apparatus 11B displays the image that is a registered image itself as a target object of the taken image of subject A, so that, as compared with the displaying of the taken image of subject A including the image before change, subject B can see the image held by subject A more clearly.

In what follows, the image processing apparatus 11A and the image processing apparatus 11B will be generically referred to as an image processing apparatus 11 unless otherwise noted. Likewise, the image pickup block 21A and the image pickup block 21B will be generically referred to as an image pickup block 21 and the output block 27A and the output block 27B will be generically referred to as an output block 27.

Figure 2:
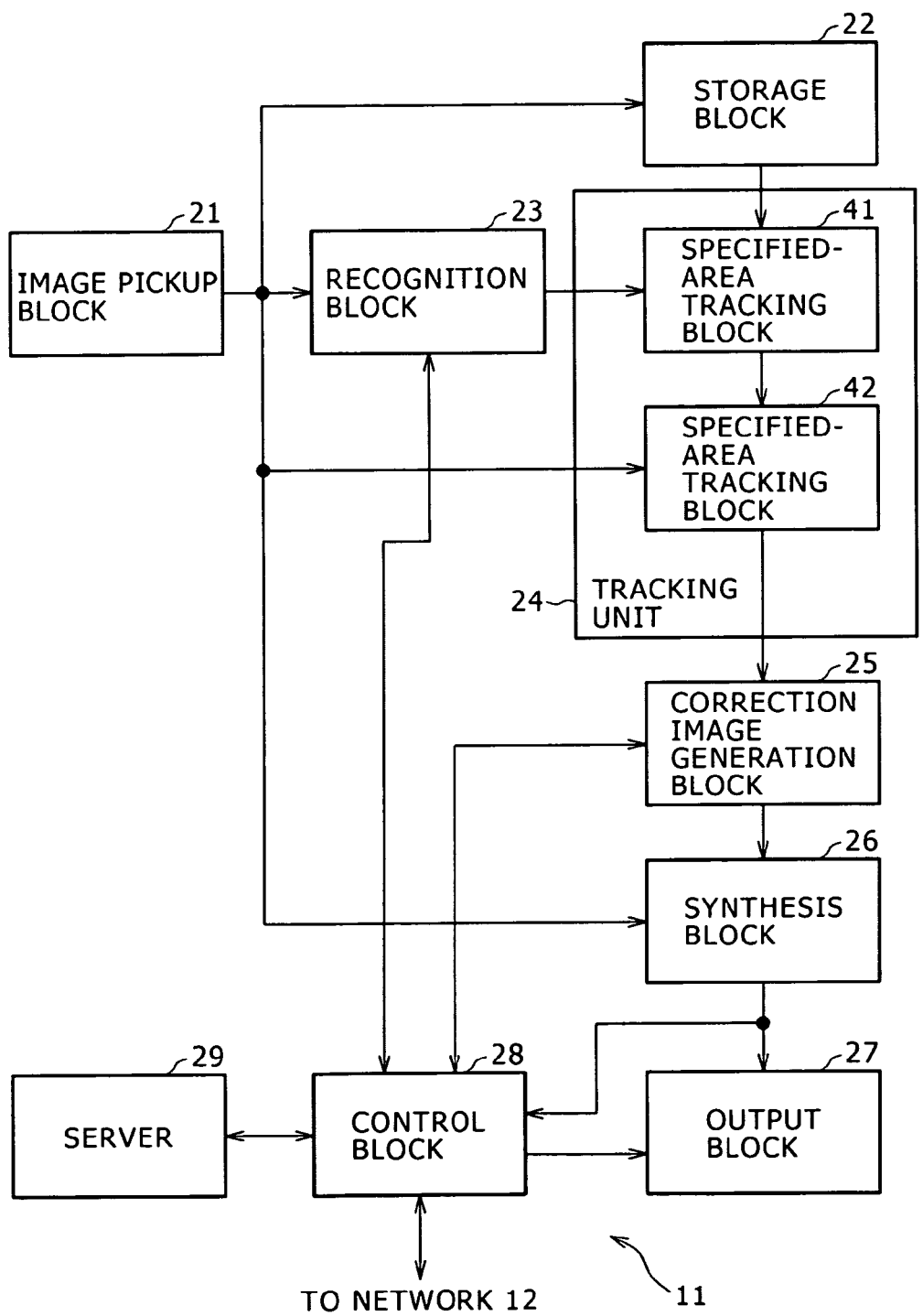
FIG. 2 is a block diagram illustrating an exemplary configuration of an image processing apparatus practiced as one embodiment of the invention.

Referring to FIG. 2, there is shown a block diagram illustrating an exemplary configuration of the image processing apparatus 11.

The image processing apparatus 11 shown in FIG. 2 is made up of the image pickup block 21, a storage block 22, a recognition block 23, a tracking unit 24, a correction image generation block 25, a synthesis block 26, the output block 27, a control block 28, and a server 29.

The image pickup block 21, made up of a video camera having such a photoelectric conversion device for converting an optical image into an electrical signal as a CCD (Charge Coupled Device) sensor or a CMOS (Complementary Metal-Oxide Semiconductor) sensor, takes an image of a subject. The image pickup block 21 supplies an image in unit of frames taken thereby to the storage block 22, the recognition block 23, the tracking unit 24, and the synthesis block 26 as an input image.

The storage block 22 stores the input image supplied by the image pickup block 21. The storage block 22 is configured to store 100 frames of input images, for example. If more than 100 frames of images are supplied from the image pickup block 21, images least recently are deleted from the storage block 22. Consequently, the most recent 100 frames of images are stored.

The recognition block 23 recognizes a target object in the input image on the basis of the input image supplied from the image pickup block 21, a registered image corresponding to the target object of recognition supplied from the control block 28, and the ID of the registered image (hereafter referred to a registration ID). The recognition block 23 supplies the frame number of the input image, the registration ID corresponding to the target object included in the input image obtained as a result of recognition, and object parameters indicative of the location and posture of the target object to the tracking unit 24.

The frame number of an input image denotes the number given to each frame in the sequence of the image taking by the image pickup block 21, for example. The registration ID is the ID unique to each registered image and therefore is registered in correspondence to each registered image. The recognition block 23 will be detailed later with reference to FIG. 3.

Tracking processing is divided into two threads, so that the tracking unit 24 is configured by a specified-area tracking block 41 and a specified-area tracking block 42, each executing one of the two threads.

The specified-area tracking block 41 reads an input image from the storage block 22 on the basis of a frame number supplied from the recognition block 23. The specified-area tracking block 41 specifies an area to be tracked as a specified area on the basis of the object parameters supplied from the recognition block 23. The specified-area tracking block 41 tracks the specified area in the input image read from the storage block 22. The specified-area tracking block 41 supplies the registration ID and object parameters received from the recognition block 23 to the specified-area tracking block 42. The specified-area tracking block 41 will be detailed later with reference to FIG. 17.

The specified-area tracking block 42 specifies an area to be tracked as a specified area on the basis of the object parameters received from the specified-area tracking block 41. The specified-area tracking block 42 tracks the specified area in the input image supplied from the image pickup block 21. The specified-area tracking block 42 supplies the registration ID received from the specified-area tracking block 41 and the object parameters obtained as a result of tracking to the correction image generation block 25. The specified-area tracking block 42 will be detailed later with reference to FIG. 28.

The correction image generation block 25 supplies the registration ID received from the specified-area tracking block 42 to the control block 28, thereby requesting the control block 28 for a registered image corresponding to that registration ID. On the basis of the registered image received from the control block 28 in response to that request and the object parameters received from the specified-area tracking block 42, the correction image generation block 25 generates a registered image having the same size and posture as those of the target object as a correction image for correcting the input image. The correction image generation block 25 supplies the object parameters received from the specified-area tracking block 42 and the generated correction image to the synthesis block 26.

On the basis of the object parameters received from the correction image generation block 25, the synthesis block 26 synthesizes the input image received from the image pickup block 21 with the correction image received from the correction image generation block 25 to supply a synthesized image obtained as a result of synthesis to the output block 27 and the control block 28. The output block 27 displays the synthesized image received from the synthesis block 26 onto the upper right window 27T of the screen and, at the same time, displays an image taken by the other image processing apparatus 11 received therefrom via the network 12 and the control block 28 onto the entire screen.

The control block 28 reads a registered image and a registration ID from the server 29 and supplies these image and ID to the recognition block 23. Also, on the basis of the registration ID received from the correction image generation block 25, the control block 28 reads the corresponding registered image from the server 29 and supplies this image to the correction image generation block 25. In addition, the control block 28 transmits the synthesized image received from the synthesis block 26 to the other image processing apparatus 11 via the network 12. The control block 28 receives the image from the other image processing apparatus 11 via the network 12 and supplies the received image to the output block 27.

In addition, the control block 28 receives a registered image from another device, not shown, via the network 12 and gives a registration ID to the received registered image in the order of reception for example. The control block 28 supplies the received registered image and the registration ID given thereto to the server 29 for registration. The server 29 relates the registered image with the registration ID supplied from the control block 28 and registers the image and ID. It should be noted that this server 29 can be connected to the control block 28 via the network 12.

Figure 3:
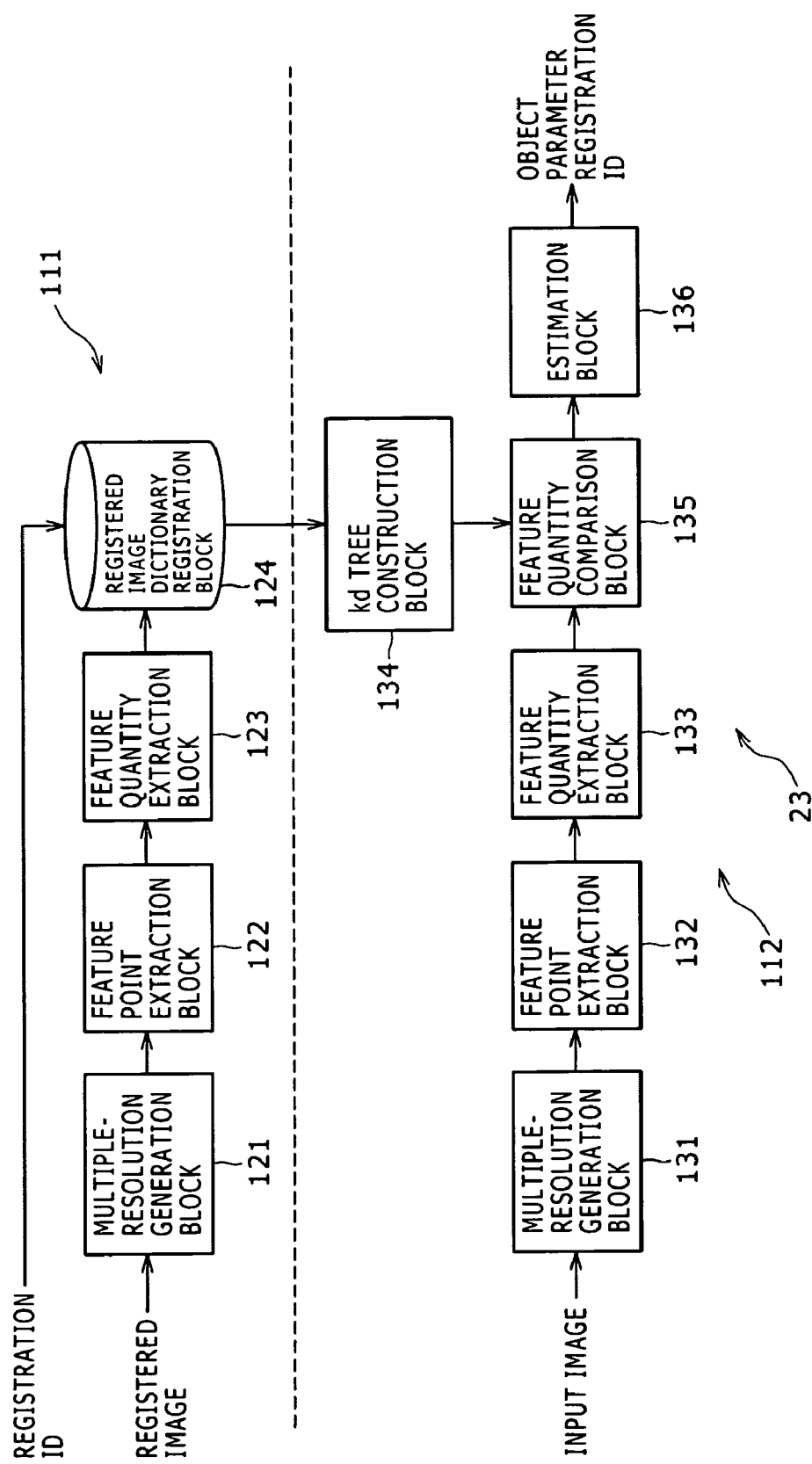
FIG. 3 is a block diagram illustrating an exemplary configuration of a recognition block shown in FIG. 2 practiced as another embodiment of the invention.

Referring to FIG. 3, there is shown a detail configuration of the recognition block 23 shown in FIG. 2. The recognition block 23 is made up of two components, a learning block 111 and a recognition block 112 configured to recognize a target object in each input image.

The learning block 111 is made up of a multiple-resolution generation block 121, a feature point extraction block 122, a feature quantity extraction block 123, and a registered image dictionary registration block 124.

The multiple-resolution generation block 121 generates an image having multiple resolutions from a registered image entered by the control block 28. The feature point extraction block 122 extracts feature points from each image having a multiple resolutions generated by the multiple-resolution generation block 121. The feature quantity extraction block 123 extracts a feature quantity of each feature point extracted by the feature point extraction block 122. The registered image dictionary registration block 124 relates a feature quantity group of the registered image extracted by the feature quantity extraction block 123 with the registration ID entered from the control block 28 and registers the related feature quantity group and registration ID. It should be noted that the registered image dictionary registration block 124 is actually built in the server 29. The transfer of data is executed via the control block 28.

The recognition block 112 is made up of a multiple-resolution generation block 131, a feature point extraction block 132, a feature quantity extraction block 133, a kd tree construction block 134, a feature quantity comparison block 135, and an estimation block 136.

The multiple-resolution generation block 131 generates an image having multiple resolutions from an input image supplied from the image pickup block 21. The feature point extraction block 132 extracts feature points from each of multiple-resolution images generated by the multiple-resolution generation block 131. The feature quantity extraction block 133 extracts a feature quantity of each feature point extracted by the feature point extraction block 132. The processing operations to be executed by the multiple-resolution generation block 131, the feature point extraction block 132, and the feature quantity extraction block 133 are the same as those executed by the multiple-resolution generation block 121, the feature point extraction block 122, and the feature quantity extraction block 123 in the learning block 111.

The kd tree construction block 134 constructs a kd tree from the feature quantity registered in the registered image dictionary registration block 124. The feature quantity comparison block 135 makes a comparison between the feature quantity extracted by the feature quantity extraction block 133 and the feature quantity group of all registered images (or, if the processing is executed for each target object, each registered image corresponding to each target object) corresponding to all target objects subject to recognition expressed in a kd tree constructed by the kd tree construction block 134. On the basis of a result of this comparison, the estimation block 136 checks the input image for a target image and, if a target image is found, estimates the location and posture thereof, thereby outputting the object parameters indicative of the estimated location and posture and the registration ID corresponding to the detected target object.

It should be noted that the learning block 111 and the recognition block 112 need not always exist at the same time. It is also practicable, as a result of the learning in advance by the learning block 111, to arrange the registered image dictionary registration block 124 on the recognition block 112 or use the registered image dictionary registration block 124 in a wireless communication manner.

Figure 4:
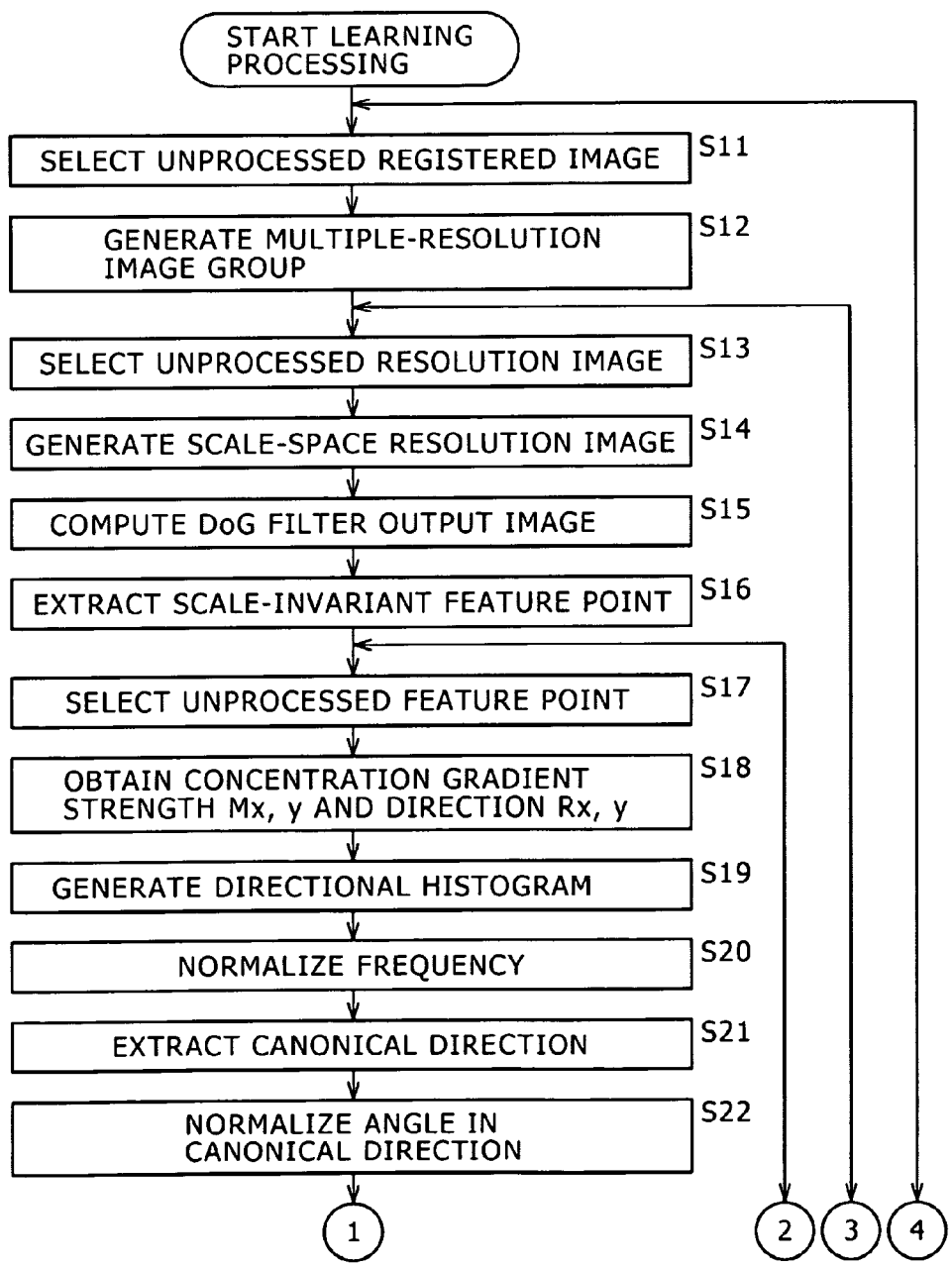
FIG. 4 is flowchart indicative of learning processing to be executed by a learning block shown in FIG. 3.
Figure 5:
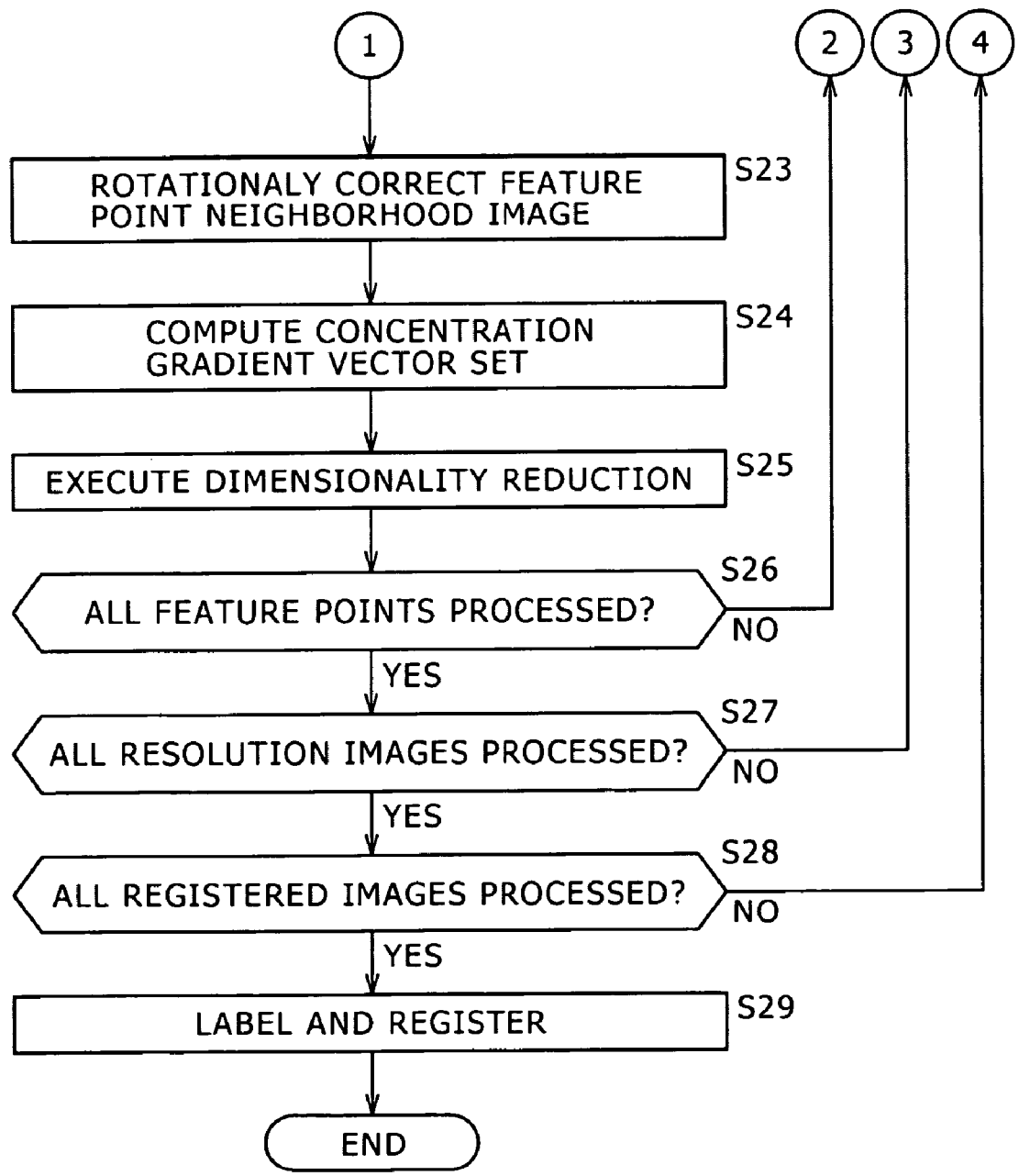
FIG. 5 is another flowchart indicative of learning processing to be executed by the learning block shown in FIG. 3.

The following describes the learning processing in the learning block 111 with reference to the flowcharts shown in FIGS. 4 and 5. This processing starts when the user commands the starting of learning processing. It should be noted that the general object recognition processing to be executed in the recognition block 112 will be described later with reference to FIGS. 34 through 36.

The multiple-resolution generation block 121 repeats the processing operations of steps S11 through S27 until all registered images are found processed in step S28 to be described later. First, in step S11, the multiple-resolution generation block 121 selects one unprocessed registered image. In step S12, the multiple-resolution generation block 121 generates a multiple-resolution group. To be more specific, the multiple-resolution generation block 121 reduces the registered image subject to learning with a predetermined scaling factor to generate a multiple-resolution image group. For example, let a reduction factor from an original image that is an image having a lowest resolution be a and the number of multiple-resolution images to be outputted be N (including the original image), then resolution image $I^{[k]}$ having k-th (for the original image, k=0) multiple resolution is generated by reducing original image $I^{[0]}$ with reduction factor $\alpha \times (N-k)$ in a linear interpolation manner.

Another method is possible in which the reduction factor for generating an image having a resolution one step lower is $\gamma$ (a fixed value); namely, $I^{[k]}$ is generated by reducing $I^{[0]}$ with reduction factor $\gamma^{[k]}$ in a linear interpolation manner.

Figure 6:
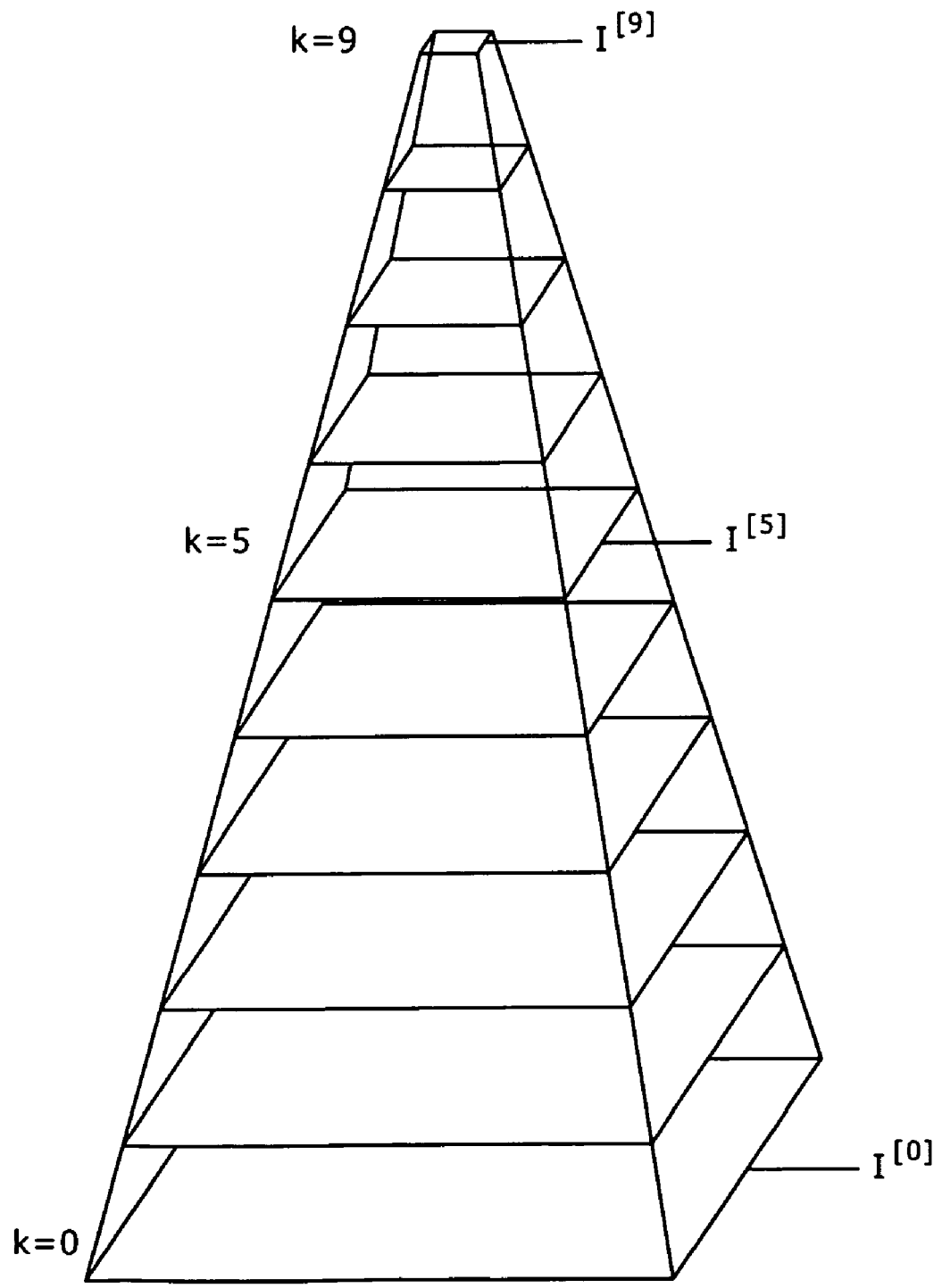
FIG. 6 is a diagram illustrating resolution images.

Referring to FIG. 6, there is shown a multiple-resolution image group that is generated when parameter N=10, $\alpha$=0.1. In the example shown in FIG. 6, a total of ten steps of multiple-resolution images are generated; namely, image $I^{[1]}$ obtained by reducing original image $I^{[0]}$ with reduction factor 0.9, image $I^{[2]}$ obtained by reducing original image $I^{[0]}$ with reduction factor 0.8, . . . , and image $I^{[9]}$ obtained by reducing original image $I^{[0]}$ with reduction factor 0.1. As the value of coefficient k for specifying reduction ratio increases, the image is further reduced in size, so that the image frame itself of each frame is reduced further as the value of coefficient k increases.

Next, the feature point extraction block 122 repeats the processing operations of steps S13 through S26 until all resolution images are found processed in step S27 to be described later, thereby extracting feature points (or scale-invariant feature points) that are extracted in robust from each resolution image $I^{[k]}$ (k=0, . . . , N−1) generated by the multiple-resolution generation block 121 if an enlargement-reduction conversion (or scale conversion) of the image takes place. Scale-invariant feature point extracting methods include one in which a scale space of image is constructed and, of the local maximum point (the maximum point in a local predetermined range) and the local minimum point (the minimum point in a local predetermined range) of a DoG (Difference of Gaussian) filter of each scale image, the point of which location does not change with the change in scale direction is extracted as a scale feature point (D. Lowe, "Object recognition from local scale-invariant features," in Proc. International Conference on Computer Vision, Vol. 2, pp. 1150-1157, Sep. 20-25, 1999, Corfu, Greece) and another in which a scale space of image is constructed and, of the corner points extracted from scale images by a Harris corner detector, a point that gives local maximum of LoG (Laplacian of Gaussian) filter of scale-space image is extracted as a feature point (K. Mikolajczyk, C. Schmit, "Indexing based on scale invariant interest points," International Conference on Computer Vision, 525-531, July 2001). Any method is applicable to the feature point extraction block 122 as long as scale-invariant features can be extracted.

The following describes a method based on a technique proposed by D. Lowe ("Distinctive image features from scale-invariant keypoints," accepted for publication in the International Journal of Computer Vision, 2004) as a method of extracting scale-invariant feature points. In the proposed technique, the local maximum point and the local minimum point with scale direction considered are extracted from the DoG filter output of the image concerned as feature points via the scale-space expression of an image subject to the extraction of scale-invariant feature points (T. Lindeberg, "Scale-space: A framework for handling image structures at multiple scales," Journal of Applied Statistics, vol. 21, No. 2, pp. 224-270, 1994").

Therefore, in step S13, the feature point extraction block 122 selects an unprocessed resolution image of resolution images. Next, in step S14, the feature point extraction block 122 generates a scale-space resolution image. Namely, a scale space of image I subject to scale-invariant feature point extraction (one of resolution images generated by the multiple-resolution generation block 121 (resolution images of k=0, 1, 2, . . . , 9) provides an image subject to scale-invariant feature point extraction) is generated. s-th (s=0, . . . S−1) resolution image $L_s$ of scale space is generated by executing convolution integral (or Gaussian filtering) on image I subject to scale-invariant feature point extraction with $\sigma=k^s\sigma_0$ by use of two-dimensional Gaussian function shown in equation (1) below.

$$g(x, y) = \frac{1}{2\pi\sigma^2} e^{\frac{-(x^2+y^2)}{2\sigma^2}} \quad (1)$$

In equation (1) above, $\sigma_0$ denotes a parameter for determining the degree of blur intended for noise cancelation of image I subject to scale-invariant feature point extraction and k denotes a constant factor associated with the degree of blur common to the resolutions of scale space, which is different from k of resolution image $I^{[k]}$. It should be noted that the horizontal direction of the image is X-axis while the vertical direction is Y-axis.

Figure 7:
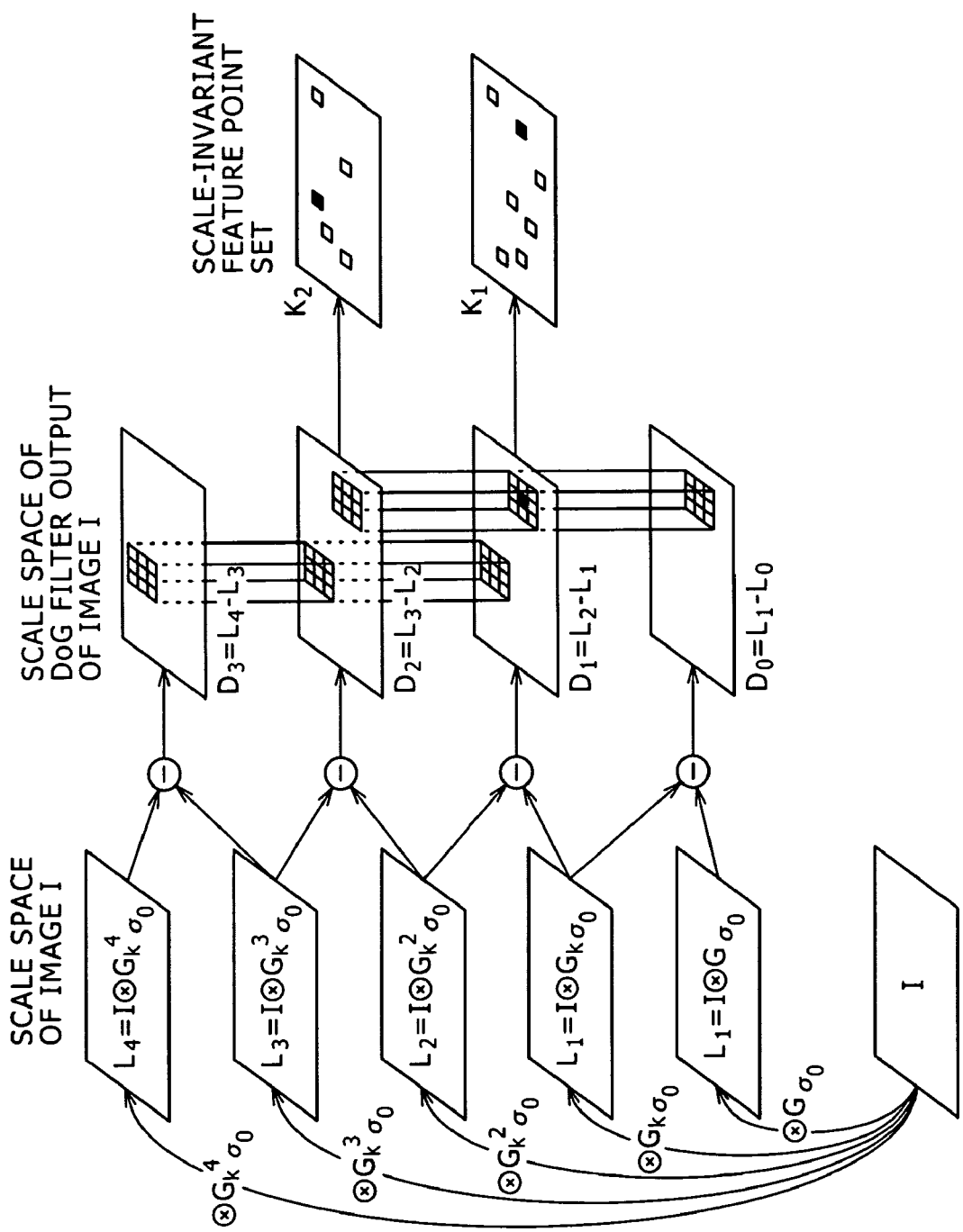
FIG. 7 is a diagram illustrating a scale space of a DoG filter.

Referring to FIG. 7, there is shown exemplary scale spaces thus generated. In this example, image I has resolution images $L_0$ through $L_4$ generated by use of five two-dimensional Gaussian functions shown below.

$$L_0 = I \otimes G_{\sigma_0} \quad (2)$$

$$L_1 = I \otimes G_{k\sigma_0} \quad (3)$$

$$L_2 = I \otimes G_{k^2\sigma_0} \quad (4)$$

$$L_3 = I \otimes G_{k^3\sigma_0} \quad (5)$$

$$L_4 = I \otimes G_{k^4\sigma_0} \quad (6)$$

In equations (2) through (6) above, the right-hand term of the symbol of convolution integral on the right-hand side in each of equations (2) through (6) is indicative of the following equation. Namely, the right-hand term is substantially the same as equation (1) above.

$$G_{k^S\sigma_0} = \frac{1}{2\pi(k^S\sigma_0)^2} e^{-\frac{(x^2+y^2)}{2(k^S\sigma_0)^2}} \qquad (7)$$

In FIG. 7, the number of resolution levels S=5.

Next, in step S15, the feature point extraction block 122 computes a DoG filter output image. Namely, the DoG filter output image of each resolution image Ls of the scale space of image I subject to feature point extraction thus obtained is computed. This DoG filter, a type of secondary differentiation filter for use in the edge enhancement of image, is often used with a LoG filter as an approximation model for the processing that is executed starting from the retina to be relayed by the lateral geniculate body in the human optical system. The output of the DoG filter can be efficiently obtained by obtaining a difference between two Gaussian filter output images. Namely, as shown in the center column in FIG. 7, DoG filter output image $D_s$ having s-th (s=0, . . . , S−2) resolution is obtained by subtracting resolution image $L_s$ from resolution image $L_{s+1}$ on the layer one step higher (namely, $L_{s+1}$-$L_s$).

In step S16, the feature point extraction block 122 extracts scale-invariant feature points. To be more specific, of the pixels on DoG filter output image $D_s$ (s=1, . . . , S−3), in a total of 27 pixels in a direct neighborhood area of DoG filter output image $D_s$ (in the present embodiment, an area of 3×3 pixels at a predetermined location) and an direct neighborhood area at the same location as (or a location corresponding to) DoG filter output image $D_{s-1}$ one step lower and DoG filter output image $D_{s+1}$ one step higher, the feature point extraction block 122 extracts the pixels providing local maximum (the highest value of 27 pixels) and local minimum (the lowest value of 27 pixels) as scale-invariant feature points, which are then held as feature point set $K_s$ (s=1, . . . , S−3). In the right-end column in FIG. 7, this feature point set $K_s$ is shown. The feature points thus extracted are scale-invariant feature points having positional invariance for a resolution change with factor=$k_2$ (namely, scale-variant).

The feature point extraction block 122 repeats the processing operations of steps S13 through S16 until it is determined in step S27 to be described later that all the resolution images have been processed, extracting scale-invariant feature point sets for each of multiple-resolution level images $I_{[k]}$ generated by the multiple-resolution generation block 121.

Next, the feature quantity extraction block 123 repeats the processing operations of steps S17 through S25 until it is determined in step S26 that all the feature points have been processed, thereby extracting the feature quantity at each feature point extracted from each multiple-resolution level image $I^{[k]}$ In what follows, the feature quantity at each feature point is referred to as a feature point feature quantity or simply a feature quantity depending on the context.

For the feature point feature quantity, a feature quantity invariant to the rotational transform and brightness change of each image. Two or more feature quantity may be applied to one feature point. In this case, processing of integrating comparison results between different feature quantities is requisite in the feature quantity comparison block 135 later. In the case of the present embodiment, two feature quantities are used that are derived from the concentration gradient information (the concentration gradient strength and concentration gradient direction at each point) in the feature point neighborhood of an image extracted from the feature point concerned. One of these feature quantities is a directional histogram corrected by the concentration gradient direction dominant in the feature point neighborhood area concerned (hereafter referred to as a canonical direction), while the other is a dimensionally degenerated concentration gradient vector corrected by the canonical direction.

Figure 8:
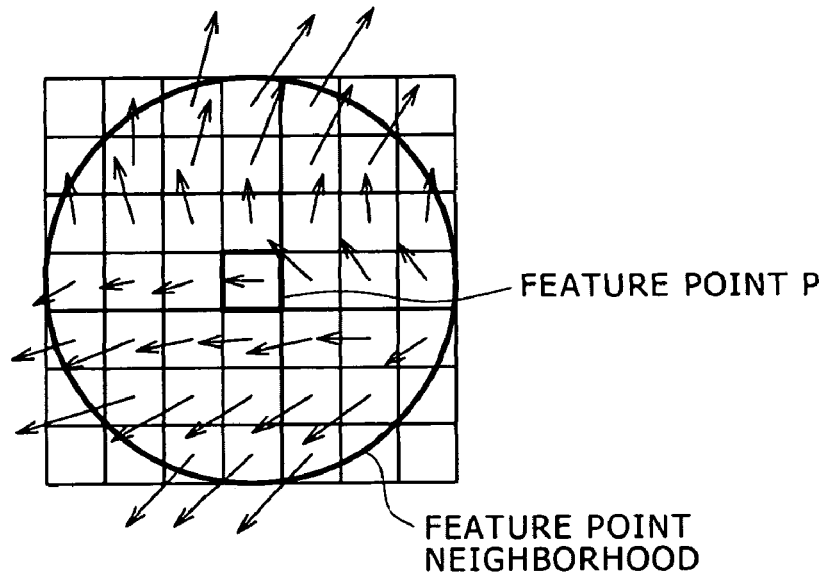
FIG. 8 is a diagram illustrating concentration gradient directions in the neighborhood of a feature point.

The first feature quantity (or the feature quantity of type 1) is obtained by correcting a histogram (or a directional histogram) associated with the concentration gradient of feature point neighborhood by zero in the dominant direction. In order to extract this first feature quantity, the feature quantity extraction block 123 selects one unprocessed feature point in step S17. Next, in step S18, the feature quantity extraction block 123 obtains concentration gradient strength $M_{x,y}$ and direction $R_{x,y}$. Namely, as shown in FIG. 8, concentration gradient strength $M_{x,y}$ and direction $R_{x,y}$ of the feature point neighborhood (in the present embodiment, the pixels falling within a range of the 7-pixel diameter (3.5-pixel radius) around feature point P concerned) are obtained by equations (8) and (9), respectively. In these equations, x, y represent the coordinates on the image of pixels for which concentration gradient is obtained and $I_{x,y}$ represents the pixel value thereof.

$$M_{x,y} = \sqrt{(I_{x+1,y}-I_{x,y})^2 + (I_{x,y+1}-I_{x,y})^2} \qquad (8)$$

$$R_{x,y} = \tan^{-1}(I_{x,y+1}-I_{x,y}, I_{x+1,y}-I_{x,y}) \qquad (9)$$

Figure 9:
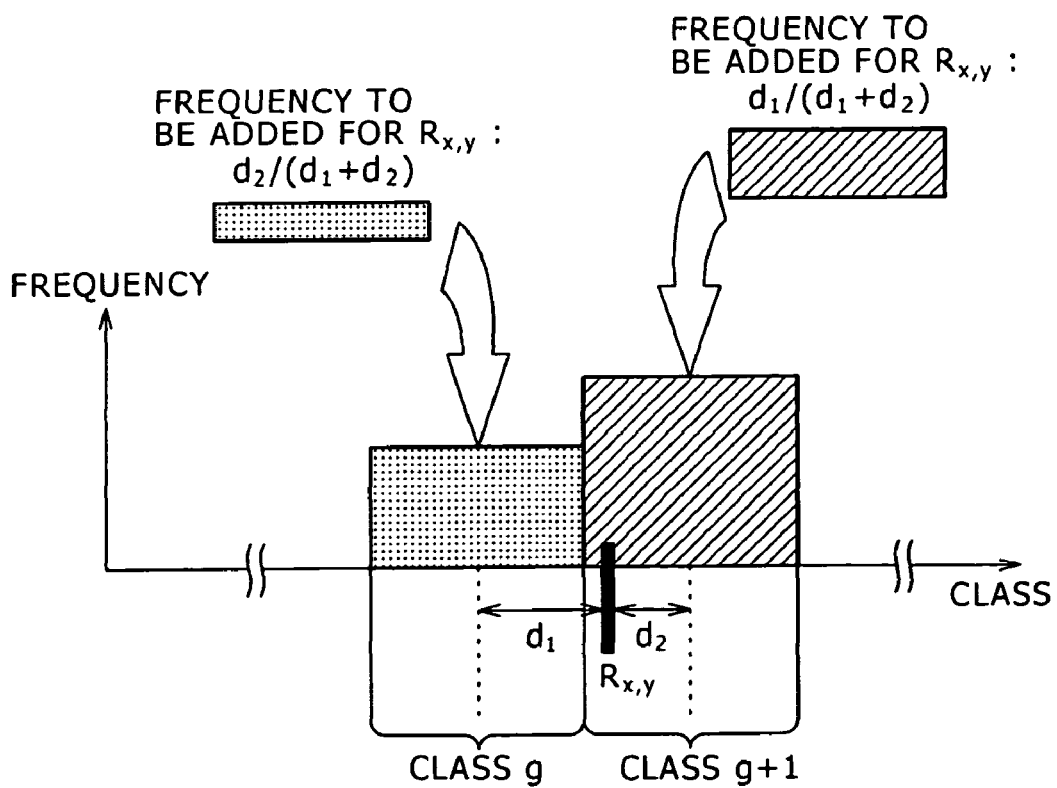
FIG. 9 is a diagram illustrating a computation method of histogram frequency.

Next, in step S19, the feature quantity extraction block 123 generates a directional histogram. To be more specific, on the basis of direction $R_{x,y}$ of each pixel in the feature point neighborhood, the frequency of each pixel is accumulated to the class to which the histogram (in the present embodiment, $\Delta\theta$=10 degrees) having class interval $\Delta\theta$ and class mark 360 degrees/$\Delta\theta$ corresponds. At this moment, as shown in FIG. 9, in order to minimize the influence on the quantization error of class, the values in proportion to the closeness in distance from the center value of the class (the horizontal axis in FIG. 9) in direction $R_{x,y}$ are accumulated for the frequency (the vertical axis in FIG. 9). Namely, let two classes closest to direction $R_{x,y}$ be g and g+1 and the distances between the center value and the direction $R_{x,y}$ of each class be $d_1$ and $d_2$, then the frequency values to be added to classes g and g+1 are $d_2/(d_1+d_2)$ and $d_1/(d_1+d_2)$, respectively. Thus, the quantization error is minimized.

In step S20, the feature quantity extraction block 123 normalizes the frequency. Namely, the frequency is normalized by dividing the frequency of the directional histogram by the number of feature point neighborhood pixels (or the number of pixels falling within the 7-pixel diameter). Thus, the accumulation only in the gradient direction can provide a feature quantity strong to brightness change.

Further, the feature quantity extraction block 123 extracts the canonical direction in step S21 and normalizes the angle by the extracted canonical direction in step S22. To be more specific, in order to provide a feature quantity invariant to rotational transformation, a canonical direction is extracted as an angle for giving a strong peak of the obtained directional histogram and the histogram is shifted so as to set the angle as that canonical direction becomes zero degree, thereby executing the angle normalization. In a histogram associated with feature points extracted around a corner, two or more strong peaks appear along the direction vertical to the edge of the corner, so that a directional histogram corrected (or normalized) so as to make the degree of each strong peak become zero degree is generated. Namely, feature quantities are separately generated for the number of canonical directions. The reference on which each peak is a canonical direction is a peak direction that gives an accumulation value of 80% or more of the maximum accumulated value, for example.

Figure 10:
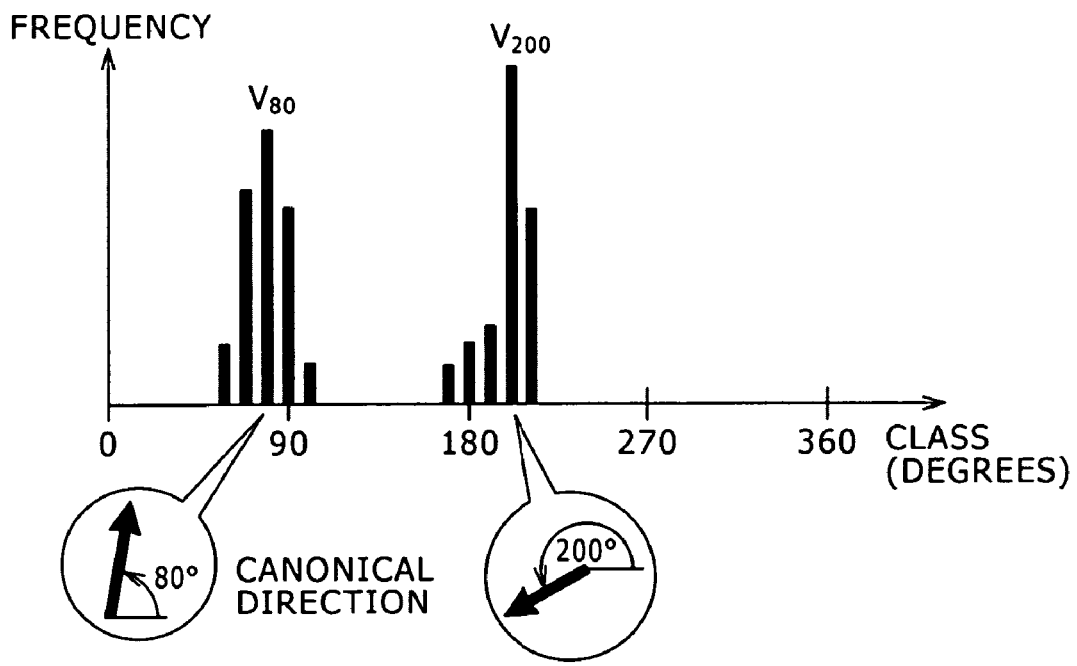
FIG. 10 is another diagram illustrating an exemplary directional histogram.
Figure 11:
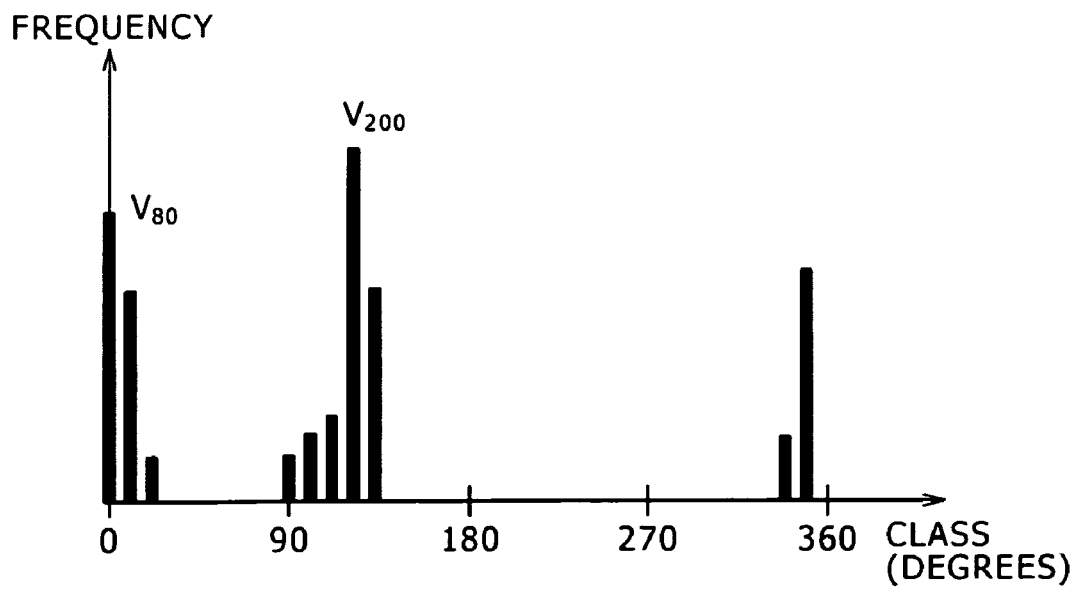
FIG. 11 is still another diagram illustrating an exemplary directional histogram.

In the directional histogram shown in FIG. 10 for example, two peaks exist, namely, frequency $V_{80}$ of angle 80 degrees and frequency $V_{200}$ of angle 200 degrees. Namely, angle 80 degrees and angle 200 degrees provide canonical directions. In this case, as shown in FIG. 11, a histogram with angle 80 degrees as a canonical direction normalized to zero degree and a histogram with angle 200 degrees as a canonical direction normalized to zero degree are generated.

The feature quantity of type 1 obtained by the above-mentioned processing is a feature vector of the same dimension as the class mark of the directional histogram (in the present embodiment, a 36 (=360 degrees/10 degrees)-dimension vector, namely, a vector consisting of 36 numbers indicative of class degrees).

Next, a low-dimensional regenerative concentration gradient vector is obtained as a second feature quantity (or a feature quantity of type 2). While the type-1 feature quantity ignores the spatial arrangement of feature point neighborhood pixels, paying attention only to the trend (or frequency) in the direction of concentration gradient vector in a feature point neighborhood local area, the type-2 feature quantity pays attention to the spatial arrangement of each concentration gradient vector in feature point neighborhood. Use of these two types of feature quantities for the comparison of feature quantities through a technique to be described later realizes the recognition strong to viewpoint change and brightness change.

Figure 13:
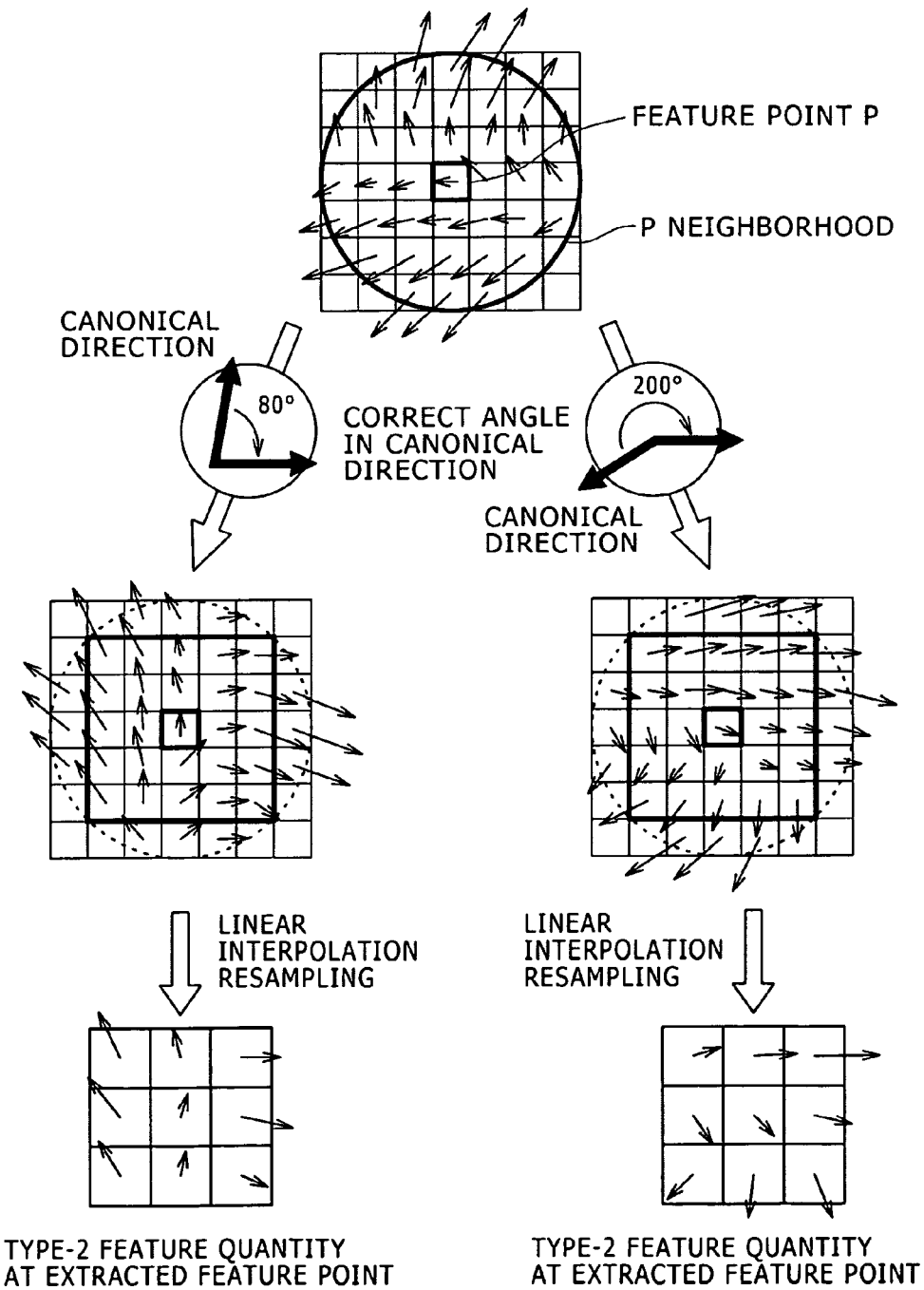
FIG. 13 is a diagram illustrating processing of extracting feature quantities.

In order to extract a type-2 quantity, the feature quantity extraction block 123 rotationally corrects a feature point neighborhood image in step S23. Namely, the feature point neighborhood image is rotationally corrected such that the canonical direction in the feature point neighborhood obtained by the above-mentioned processing becomes zero degree. Further, in step S24, the feature quantity extraction block 123 computes a concentration gradient vector set. For example, if the concentration gradient of pixels in the feature point neighborhood shown in the upper portion of FIG. 13 is distributed as shown in FIG. 10, the canonical directions are in 80 degrees and 200 degrees as described above. Therefore, as shown in the left side of the middle row of FIG. 13, the feature point neighborhood image is rotated clockwise in this case such that the canonical direction of 80 degrees becomes zero degree. Then, the concentration gradient vector set of this image is computed. This is eventually equivalent to obtaining a concentration gradient vector set of the directional histogram shown in FIG. 11 obtained by executing normalization with the canonical direction of angle 80 degrees shown in FIG. 10 set to zero degree.

Figure 12:
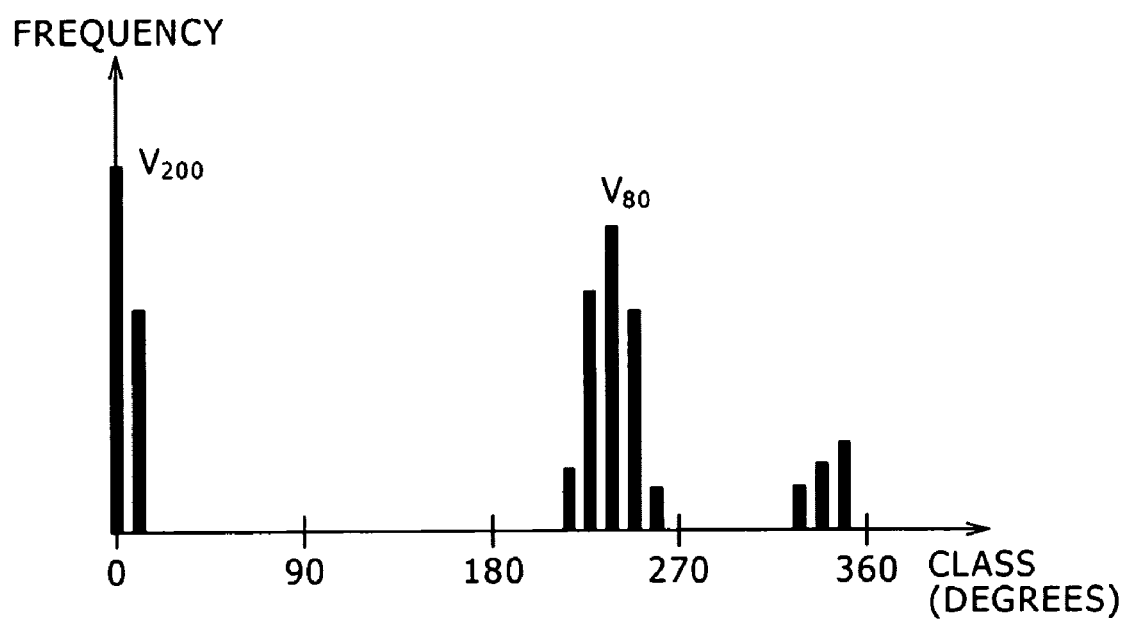
FIG. 12 is further another diagram illustrating an exemplary directional histogram.

Likewise, as shown in the right side of the middle row of FIG. 13, the feature point neighborhood image is rotationally corrected such that canonical direction of 200 degrees becomes zero degree. Then, the concentration gradient vector set of this image is computed. This is eventually equivalent to obtaining a concentration gradient vector set of the directional histogram shown in FIG. 12 obtained by executing normalization with the canonical direction of angle 200 degrees shown in FIG. 10 set to zero degree.

In step S25, the feature quantity extraction block 123 dimensionally degenerates the concentration gradient vector set. Namely, in order to be able to absorb a shift equivalent to several pixels in feature point extraction position, this concentration gradient vector set is degenerated by resampling in a linear interpolation manner from a vector set of 5×5 pixels in a square approximately touching internally a circle having a diameter of 7 pixels to a 3×3 vector set, for example, as shown in the left and right sides in the bottom of FIG. 13.

Figure 14:
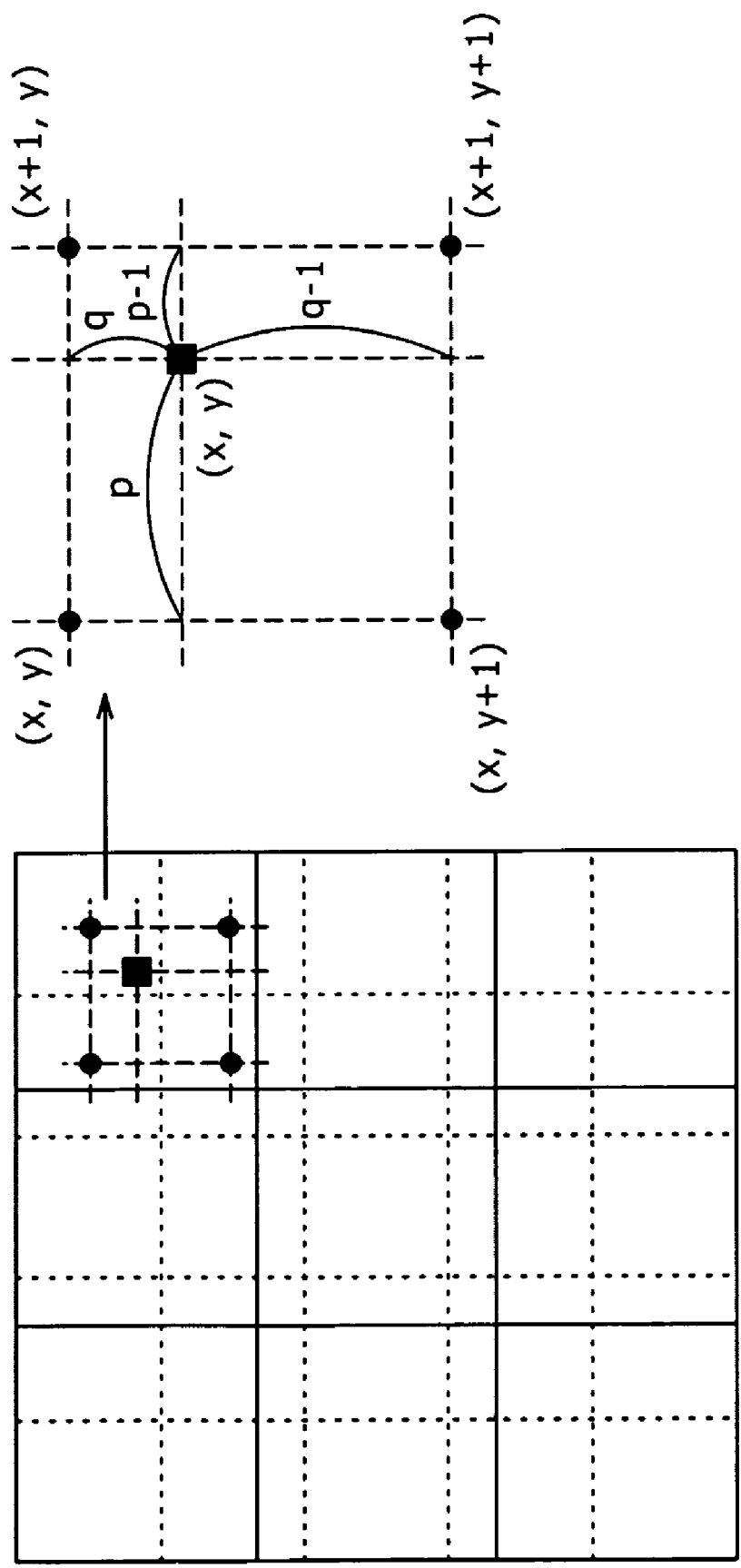
FIG. 14 is a diagram illustrating an example of resampling.

To be more specific, as shown in FIG. 14, the linear interpolation resampling is executed by computing the pixel value of a resampling image with a ratio of distance from 4 original image pixels in the neighborhood thereof from equation below.

$$f(X,Y)=(1-q)\cdot\{(1-p)\cdot f(x,y)+p\cdot f(x+1,y)\}+q\cdot\{(1-p)\cdot f(x,y+1)+p\cdot f(x+1,y+1)\} \quad (10)$$

In equation (10) above, (X,Y) denotes pixels of the resampling image, (x,y), (x+1, y), (x, y+1), (x+1, y+1) denote original image pixels in the neighborhood of resampling image (X, Y), f(a, b) denotes the pixel value of coordinate (a, b), and p, q are distance ratios in x coordinate direction and y coordinate direction from neighborhood pixel to resampling image (X, Y) as shown in FIG. 14.

Thus, by applying x and y components of the dimensionally degenerated vector to each dimension of the feature vector, the type-2 feature quantity is obtained. If the image is resampled to a 3×3 vector set by linear interpolation resampling, a feature quantity of 18 (=3×3×2) dimensions is obtained.

It should be noted that the target image size after resampling is below the half of the original image size, then the original image is reduced in sized by every 0.5 and, when an image of the minimum 0.5 multiplication size equal to or greater than the target size has been obtained, the resampling of equation (10) is executed from that image, thereby minimizing a resampling error. For example, if an image that is 0.2 times as large as an original image is to be created by linear interpolation resampling, the linear interpolation resampling of equation (10) is executed on an image 0.25 times as large as an original image obtained by multiplying 0.5 resample two times.

In step S26, the feature quantity extraction block 123 determines whether all feature points have been processed. If there are found any unprocessed feature points, then the procedure returns to step S17 to repeat the above-mentioned processing therefrom. If all feature points are found processed in step S26 (namely, if the processing operations of steps S17 through S25 have been executed on all feature points), then the feature point extraction block 122 determines in step S27 whether all resolution images have been processed. If there are found any unprocessed resolution images, the procedure returns to step S13 to repeat the above-mentioned processing therefrom. If the processing operations of steps S13 through S25 are found processed on all resolution images, then the multiple-resolution generation block 121 determines in step S28 whether all registered images have been processed. If there are found any unprocessed registered images, then the procedure returns to step S11 to repeat the above-mentioned processing therefrom. If the processing operations of steps S11 through S25 are found executed on all registered images, then the procedure goes to step S29.

In step S29, the registered image dictionary registration block 124 labels the feature point feature quantity extracted as described above and registers the labeled feature point feature quantity. In this case, labeling is executed so as to allow reference to a particular feature quantity of a particular registered image having a particular ID extracted from a particular scale of a particular image of a particular multiple-resolution image group of registered images having particular registration IDs. The labeled feature point feature quantity is registered in the registered image dictionary registration block 124.

As described above, the registered image corresponding to the target object to be recognized is registered in the registered image dictionary registration block 124 in advance.

If the recognition block 23 has both the learning block 111 and the recognition block 112, the recognition block 112 can use this registered image dictionary registration block 124 without change. If the learning block 111 and the recognition block 112 are configured as separate image processing apparatuses, then the registered image dictionary registration block 124 storing the necessary information as described above may be arranged on an image processing apparatus having the recognition block 112 or be available in a wired or wireless manner.

Figure 15:
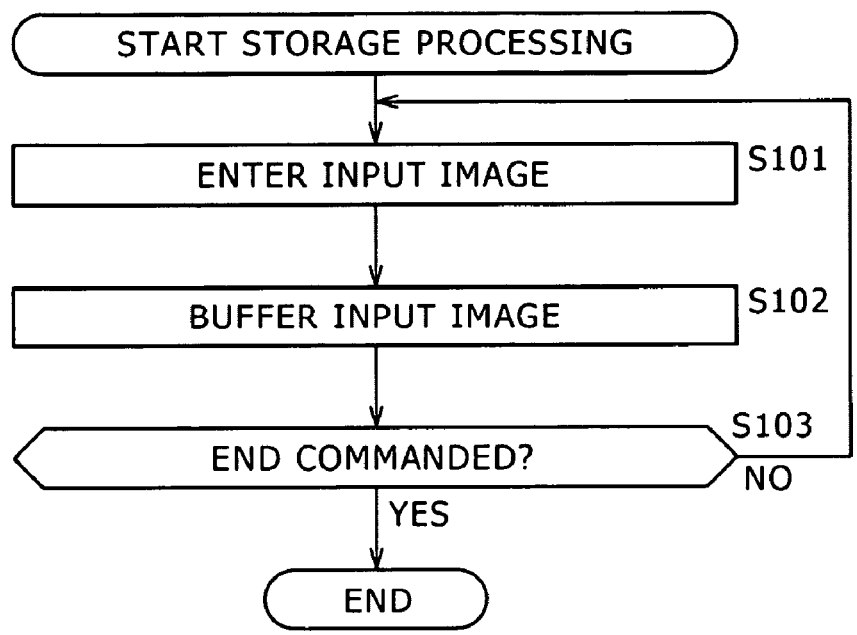
FIG. 15 is a flowchart indicative of storage processing.

The following describes the storage processing to be executed in the image processing apparatus 11 with reference to the flowchart shown in FIG. 15. This storage processing starts when the starting of television communication is commanded by the user, for example.

In step S101, the image pickup block 21 pickups an image of a subject and supplies the resultant input image to the storage block 22, the recognition block 23, the tracking unit 24, and synthesis block 26. In step S102, the storage block 22 stores 100 frames of the input images received from the image pickup block 21. If more than 100 frames of input images are entered, the older images are sequentially overwritten with new images, the most recent 100 frames of images being stored.

In step S103, the image pickup 21 determines whether the ending of television communication has been commanded by the user. If the ending of television communication is found not yet command, the procedure returns to step S101 to repeat the above-mentioned processed therefrom. If the ending of television communication is found command, the processing comes to an end.

Thus, while the image pickup block 21 is executing image pickup processing, the most recent 100 frames of input images are stored in the storage block 22.

Figure 16:
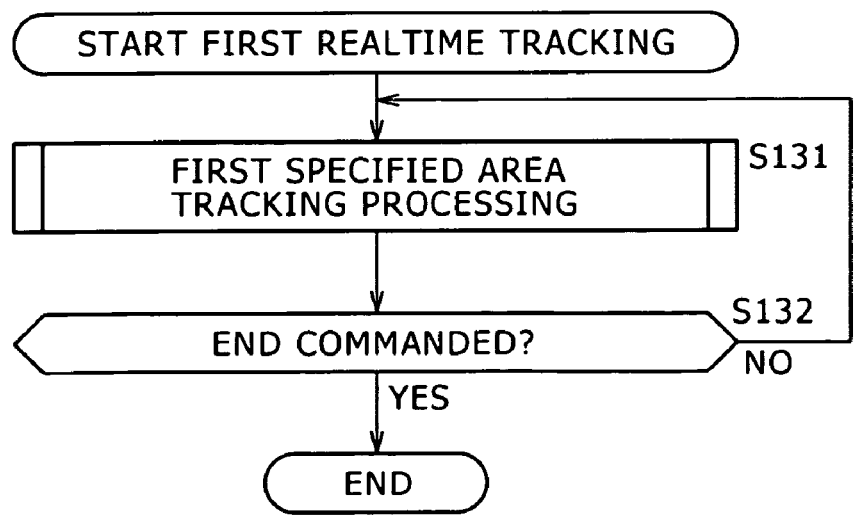
FIG. 16 is a flowchart indicative of first realtime tracking processing.

The following describes the first realtime tracking processing to be executed in the image processing apparatus 11 with reference to the flowchart shown in FIG. 16. This first realtime tracking processing starts when a registration ID, a frame number, and an object parameter are outputted by the genera object recognition processing by the recognition block 23 to be described later with reference to FIGS. 34 through 36.

Although details of the general object recognition processing will be described later with reference to FIGS. 34 through 36, if a target object corresponding to a registered image registered by learning processing is recognized from the input images by this processing, the registered ID, the frame number, and object parameter of the recognized image are outputted.

In step S131, the specified-area tracking block 41 of the tracking unit 24 executes the first specified area tracking processing for tracking a specified area based on the object parameter entered from the recognition block 23. Although details of this first specified area tracking processing will be described later with reference to FIG. 18, fast tracking processing is executed on the specified area specified on a recognition result obtained by the recognition block 23 is executed by this tracking processing.

In step S132, the specified-area tracking block 41 determines whether the ending of television communication has been commanded by the user. If the ending of television communication is found not yet command, then the procedure returns to step S131 to repeat the above-mentioned processing therefrom. If the ending of television communication is found command, then the processing comes to an end.

Figure 17:
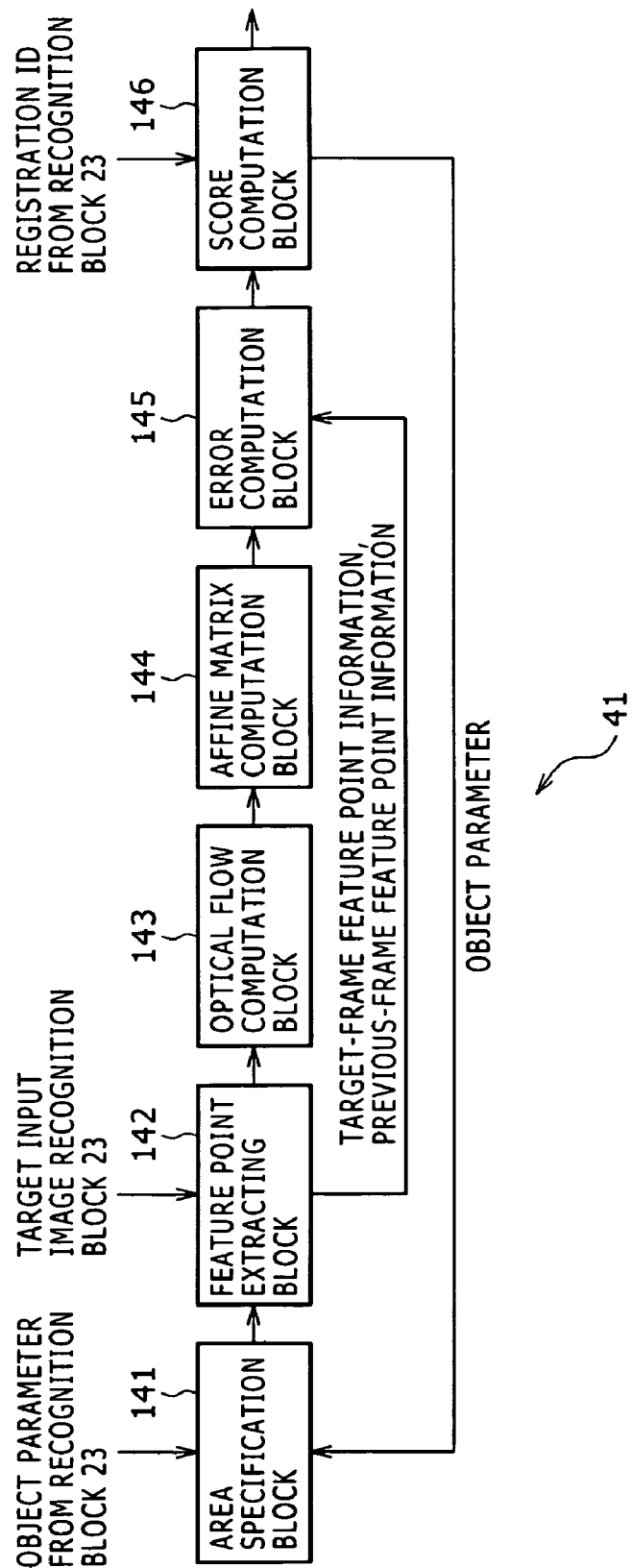
FIG. 17 is a block diagram illustrating an exemplary configuration of a specified-area tracking block shown in FIG. 2 practiced as one embodiment of the invention.

The specified-area tracking block 41 shown in FIG. 2 has a configuration as shown in FIG. 17 so as to execute the first specified area tracking processing.

The specified-area tracking block 41 shown in FIG. 17 has an area specification block 141, a feature point extraction block 142, an optical flow computation block 143, an affine matrix computation block 144, an error computation block 145, and a score computation block 146.

To the area specification block 141, an object parameter is supplied from the recognition block 23 or the score computation block 146. On the basis of the supplied object parameter, the area specification block 141 specifies a specified area and supplies the specified area to the feature point extraction block 142.

To the feature point extraction block 142, a frame number is supplied from the recognition block 23. On the basis of the supplied frame number, the feature point extraction block 142 reads an input image from the storage block 22 as an input image to be processed (hereafter referred to as a target input image).

The feature point extraction block 142 extracts feature points from the target input image in substantially the same manner as the feature point extraction block 122 shown in FIG. 3 for example. On the basis of the specified area supplied from the area specification block 141, the feature point extraction block 142 deletes, of the extracted feature points, the feature points located outside the specified area and temporarily holds the feature point information indicative of the feature points located inside the specified area. At the same time, the feature point extraction block 142 supplies the feature point information of the feature points inside the specified area of the target input image (hereafter referred to as a target frame feature point information), the feature point information of the feature points inside the specified area of the input image one frame before (hereafter referred to as a previous input image) of the target input image (hereafter referred to as previous-frame feature point information), and the target input image to the optical flow computation block 143. Also, the feature point extraction block 142 supplies the target frame feature point information and the previous-frame feature point information to the error computation block 145.

On the basis of the target frame feature point information, the previous-frame feature point information, and the target input image supplied from the feature point extraction block 142, the optical flow computation block 143 computes an optical flow as the moving information of each feature point and supplies the computed optical flow to the affine matrix computation block 144.

Of the optical flows of feature points supplied from the optical flow computation block 143, the affine matrix computation block 144 computes, from the optical flows of three feature points, an affine matrix for affine transform. The affine matrix computation block 144 then supplies the computed affine matrix to the error computation block 145.

The error computation block 145 multiplies the location of each feature point indicated by the previous-frame feature point information supplied from the feature point extraction block 142 by the affine matrix supplied from the affine matrix computation block 144. Then, the error computation block 145 computes an error between the location of each feature point computed by this multiplication and the location of each feature point indicated by the target frame feature point information supplied from the feature point extraction block 142 and supplies the error in each feature point and the affine matrix to the score computation block 146.

Of the errors supplied from the error computation block 145, the score computation block 146 determines whether there is any error that is smaller than preset threshold T. Depending upon a result of this decision, the score computation block 146 determines a score of the affine matrix corresponding to that error. It should be noted that the score is determined such that as the number of feature points with the error smaller than threshold T increases, the score increases.

Of the affine matrices in the target input image, the score computation block 146 selects the one that has the maximum score as a typical affine matrix in the specified area. The score computation block 146 supplies the parameter of the typical affine matrix to the area specification block 141 as an object parameter. To the score computation block 146, the registration ID is also supplied from the recognition block 23. The score computation block 146 supplies this registration ID and the parameter of the typical affine matrix to the specified-area tracking block 42 as the object parameter when a predetermined time comes.

Figure 18:
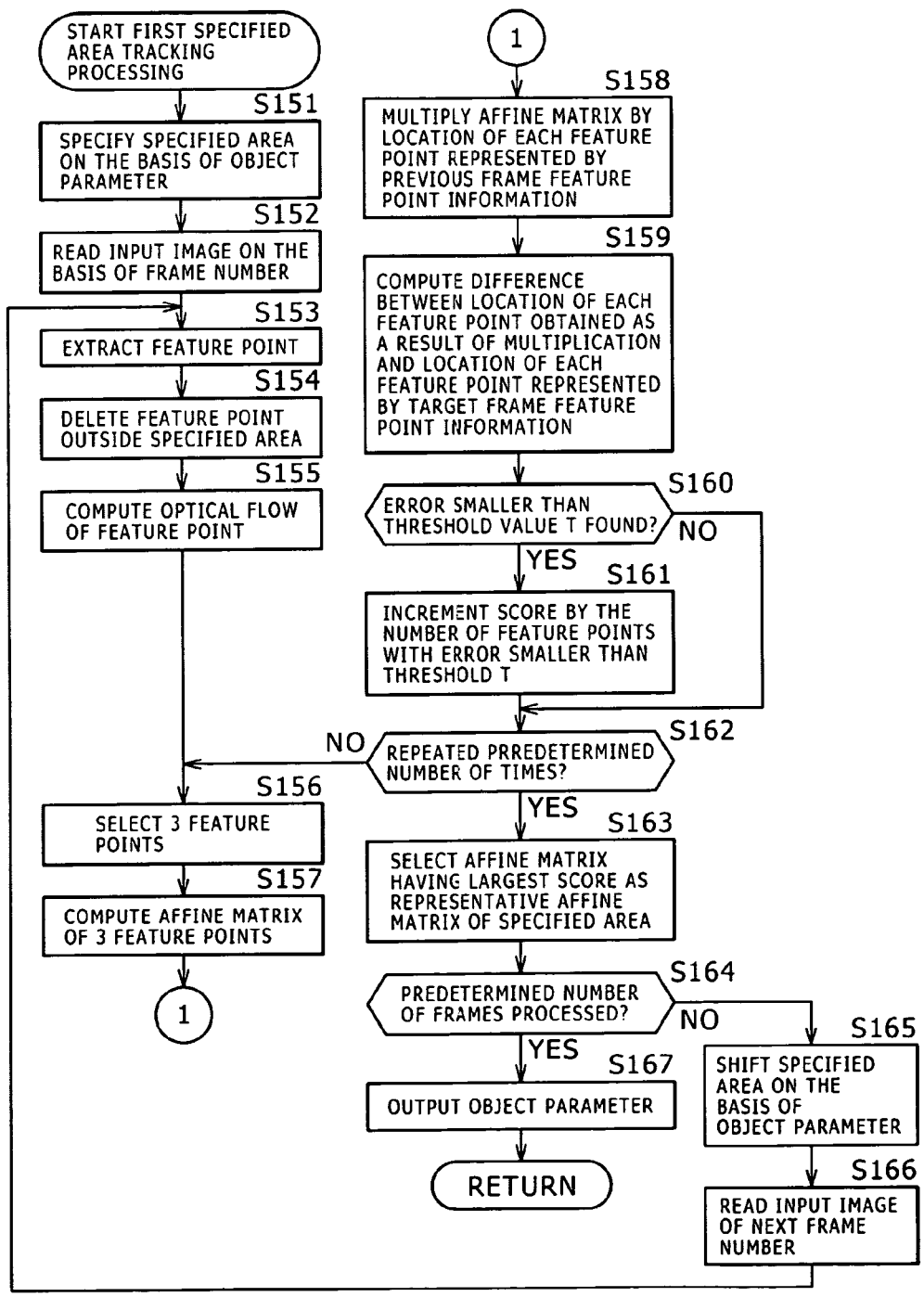
FIG. 18 is a flowchart indicative of the first specified-area tracking processing shown in FIG. 16.

The following describes details of the first specified area tracking processing of step S131 shown in FIG. 16 with reference to the flowchart shown in FIG. 18.

In step S151, the area specification block 141 specifies a specified area on the basis of the object parameter obtained as a result of the general object recognition processing executed by the recognition block 23. Namely, on the basis of the positional information (or coordinates data) of the object parameter, a specified area subject to tracking is specified and this specified area is supplied to the feature point extraction block 142. In step S152, on the basis of the frame number of a frame including the recognized target object supplied from the recognition block 23, the feature point extraction block 142 reads, as a target input image, the input image having this frame number from the input images stored in the storage block 22. In step S153, the feature point extraction block 142 extracts a feature point from the target input image. This feature point may be similar to that described above in step S16 shown in FIG. 4.

In step S154, from the feature points extracted in step S153, the feature point extraction block 142 deletes the feature points located outside the specified area supplied from the area specification block 141 and temporarily holds the feature point information indicative of the locations of feature points inside the specified area. At the same time, the feature point extraction block 142 supplies the target frame feature point information, the previous-frame feature point information, and the target image to the optical flow computation block 143 and the target frame feature point information and the previous-frame feature point information to the error computation block 145.

In step S155, on the basis of the target frame feature point information and the previous-frame feature point information received from the feature point extraction block 142, the optical flow computation block 143 computes the optical flow of each feature point by use of the LK (Lucas Kanade) method, for example.

The following describes this computation with reference FIG. 19. It should be noted that FIG. 19 shows an example in which the optical flow of feature point P in the direction orthogonal to the optical axis is computed by the LK method.

In the computation of an optical flow, a shift between the feature point of which location is indicated by the target frame feature point information and the feature point of which location is indicated by the previous-frame feature point information is analyzed. To be more specific, from the input image, two or more images with resolutions gradually lowered are formed and a comparison is made between the images having lowered resolutions. This can minimize the quantity of computation necessary for analyzing the shift between feature points.

Figure 19A:
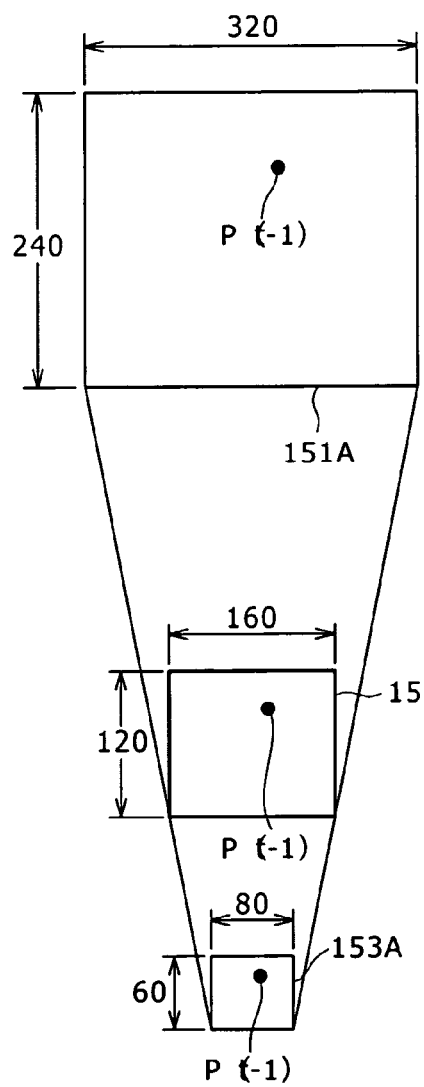
FIGS. 19A and 19B are diagram illustrating the computation of an optical flow.
Figure 19B:
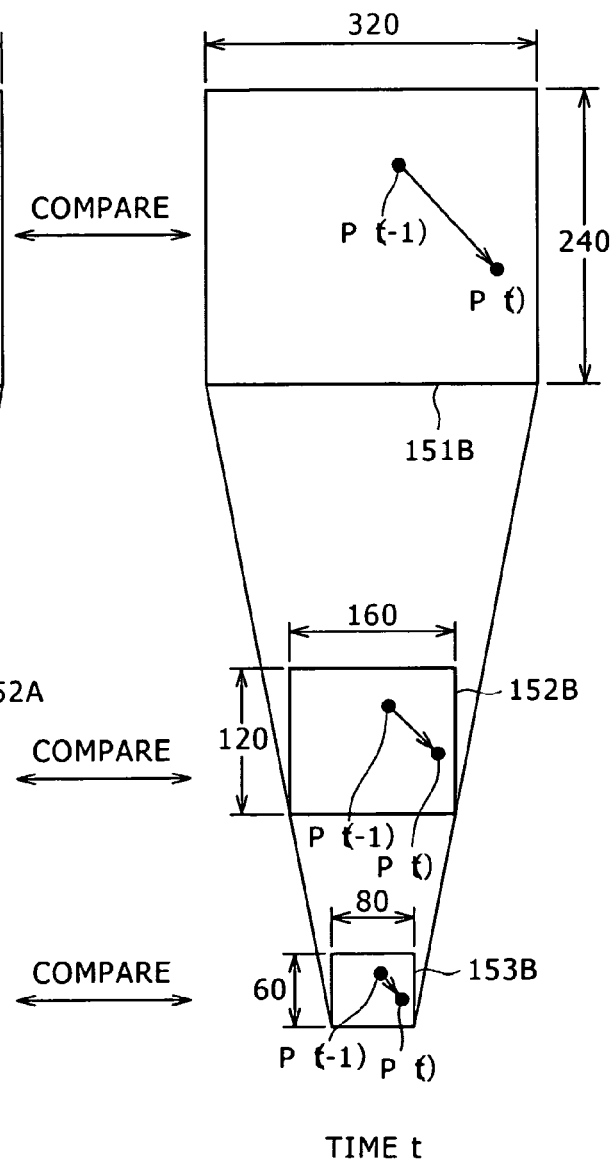

As shown in FIGS. 19A and 19B, if the number of pixels a previous input image 151A picked up by the image pickup block 21 at time t−1 and a target input image 151B picked up at time t are 320×240 each, then, on the basis of the previous input image 151A, the optical flow computation block 143 generates an image 152A having 160×120 pixels with resolution lowered to ¼ of the resolution of this previous input image 151A and then an image 153B having 80×60 pixels with resolution lowered to ¼ of the resolution of the image 152A. Likewise, on the basis of the target input image 151B, the optical flow computation block 143 generates an image 152B having 160×120 pixels with resolution lowered to ¼ of the resolution of this previous input image 151A and then an image 153B having 80×60 pixels with resolution lowered to ¼ of the resolution of the image 152B.

It should be noted that the image 152A (152B) and the image 153A (153B) are images in the same screen area as the previous input image 151A (the target input image 151B) having the original 320×240 pixels but are lowered in resolution by decreasing the number of pixels. The target input image 151B, the image 152B, and the image 153B are held in the optical flow computation block 143 to be used for the computation of an optical flow of the feature points of a next target input image. Namely, the previous input image 151A, the image 152A, and the image 153A are held at the time of the previous computation.

First, the optical flow computation block 143 makes a comparison between the image 153A and the image 153B that have the lowest resolution for analyzing a coarse shift of feature point P. Because the image 153A and the image 153B are low in the number of pixels and therefore demand the small number of search ranges, the computation of optical flow can be executed with a low load. Making a comparison between the image 153A and the image 153B, the optical flow computation block 143 obtains a vector directing from feature point P(t−1) at time t to feature point P(t) at time t as an optical flow of feature point P(t) in a simplified manner.

Next, around the range in which the optical flow of feature point P has been detected in the image 153A and the image 153B, the optical flow computation block 143 makes a comparison between the image 152A and the 152B for more detail analysis of the shift of feature point P. As compared with the image 153A and the image 153B, the number of pixels of the image 152A and the image 152B is greater, but, by narrowing the search ranges by the analysis of the image 153A and the image 153B, the load of the computation processing can be mitigated.

Then, around the range in which the optical flow of feature point P has been detected in the image 152A and the image 152B, the optical flow computation block 143 makes a comparison between the previous input image 151A and the target input image 151B of 320×240 pixels each picked up by the image pickup block 21 for more detail analysis of the shift of feature point P. Here, the search ranges are further narrowed by the analysis of the image 152A and the image 152B, so that the optical flow of feature point P(t) can be computed with less load and more accuracy by use of the previous input image 151A and the target input image 151B having the maximum number of pixels each.

As shown in FIG. 19, the LK method can prevent the quantity of processing from increasing when analyzing the shift of the feature point for each of the time-dependent frames, thereby analyzing the shift of time-dependent images with a time delay minimized. The image processing of the optical flow based on the LK method can be executed by a technique described in treatise "Pyramidal Implementation of the Lucas Kanade Feature Tracker Description of the algorithm; Jean-Yves Bouguet, Intel Corporation, Microprocessor Research Labs" in Homepage "http://robots.stanford.edu/ cs223b04/algo_tracking.pdf". Thus, applying the LK method to the feature point strong at optical flow computation to analyze the shift of feature point by use of images with resolutions gradually varied can compute the optical flow of feature point in relatively a short time and with a high accuracy.

The computation of optical flow may be executed by other than the LK method. For example, the known block matching method or a known gradient method is applicable to the computation of optical flow.

The optical flow of each feature point computed as described above is supplied to the affine matrix computation block 144. Next, in step S156, the affine matrix computation block 144 selects three feature points from the feature points corresponding to the optical flow supplied from the optical flow computation block 143.

In step S157, the affine matrix computation block 144 computes an affine matrix for executing affine transformation on the three feature points from the optical flow of the three feature points selected in step S156. The affine transformation is a transformation in which shearing is allowed for similar translation with dilation added to translation and rotation (Euclidian transformations), thereby keeping geometrical properties such that the points on a line in an original figure is also arranged on a line after transformation and the parallel lines in an original figure are also parallel lines after transformation.

The affine matrix for executing affine transformation is as follows. The affine transformation to optical flow $[u\ v]^T$ of the feature point of the target input image of optical flow $[x\ y]^T$ of the feature point of the previous image is given by equation (11) below.

$$\begin{bmatrix} u \\ v \end{bmatrix} = \begin{bmatrix} a_1 & a_2 \\ a_3 & a_4 \end{bmatrix} \begin{bmatrix} x \\ y \end{bmatrix} + \begin{bmatrix} b_1 \\ b_2 \end{bmatrix} = \begin{bmatrix} a_1 & a_2 & b_1 \\ a_3 & a_4 & b_2 \end{bmatrix} \begin{bmatrix} x \\ y \\ 1 \end{bmatrix} \quad (11)$$

In equation (11) above, $a_i(i=1,\ldots,4)$ denotes parameters for determining rotation, dilation, and shear and $[b_1, b_2]$ denotes a translation parameter. The affine matrix parameters (or the affine transformation parameters) to be computed are six, $a_1, \ldots, a_4$ and $b_1$ and $b_2$, so that three sets of feature points allow the determination of an affine matrix. Namely, the computation of an affine matrix (or affine transformation parameters) necessary for affine transformation demands three or more sets of feature points. Therefore, in step S156, three feature points are selected and, in step S157, an affine matrix is computed from the optical flow of these three feature points. The affine matrix computation block 144 supplies the affine matrix obtained by this computation to the error computation block 145.

In step S158, the error computation block 145 multiplies the affine matrix received from the affine matrix computation block 144 by the location of each feature point indicated by the previous-frame feature point information received from the feature point extraction block 142. In step S159, the error computation block 145 computes an error between the location of each feature point obtained by the multiplication and the location of each feature point indicated by the target frame feature point information received from the feature point extraction block 142 and supplies the obtained error and the affine matrix to the score computation block 146.

In step S160, of the errors of the feature points received from the error computation block 145, the score computation block 146 determines if there is any error smaller than preset threshold T. If an error smaller than preset threshold T is found in step S160, then the score computation block 146 increments the score of the affine matrix received along the error by the number of feature points of which errors are smaller than preset threshold T. It should be noted that the value to be incremented may be a predetermined value or a value corresponding to the error.

On the other hand, if there is no error smaller than threshold T, namely, if the errors of all feature points are found to be equal to or higher than threshold T, then step S161 is omitted. Namely, the score computation block 146 does not increment the score.

In step S162, the score computation block 146 determines whether the computation of the affine matrix in the target input image has been repeated by the predetermined number of times. It is also practicable here to determine whether the predetermined number of affine matrices have been supplied or not. If the computation is found not repeated by the predetermined number of times in step S162, then the procedure returns to step S156, in which the affine matrix computation block 144 newly selects three feature points and repeats the above-mentioned processing on the selected feature points.

On the other hand, if the computation of the affine matrix in the target input image is found repeated by the predetermined number of times, then, in step S163, the score computation block 146 selects the affine matrix having the greatest score of the affine matrices in the target input image as the typical affine matrix of the specified area.

The following describes the typical affine matrix selected as described above with reference to FIGS. 20 and 21. In the examples shown in FIGS. 20 and 21, an input image 160 is used as a target input image, in which a hand of a user hold a photograph 161 is taken as a subject when the photograph 161 that is a registered image is rotated around a point 162 located on the wrist of the user's hand.

Figure 20:
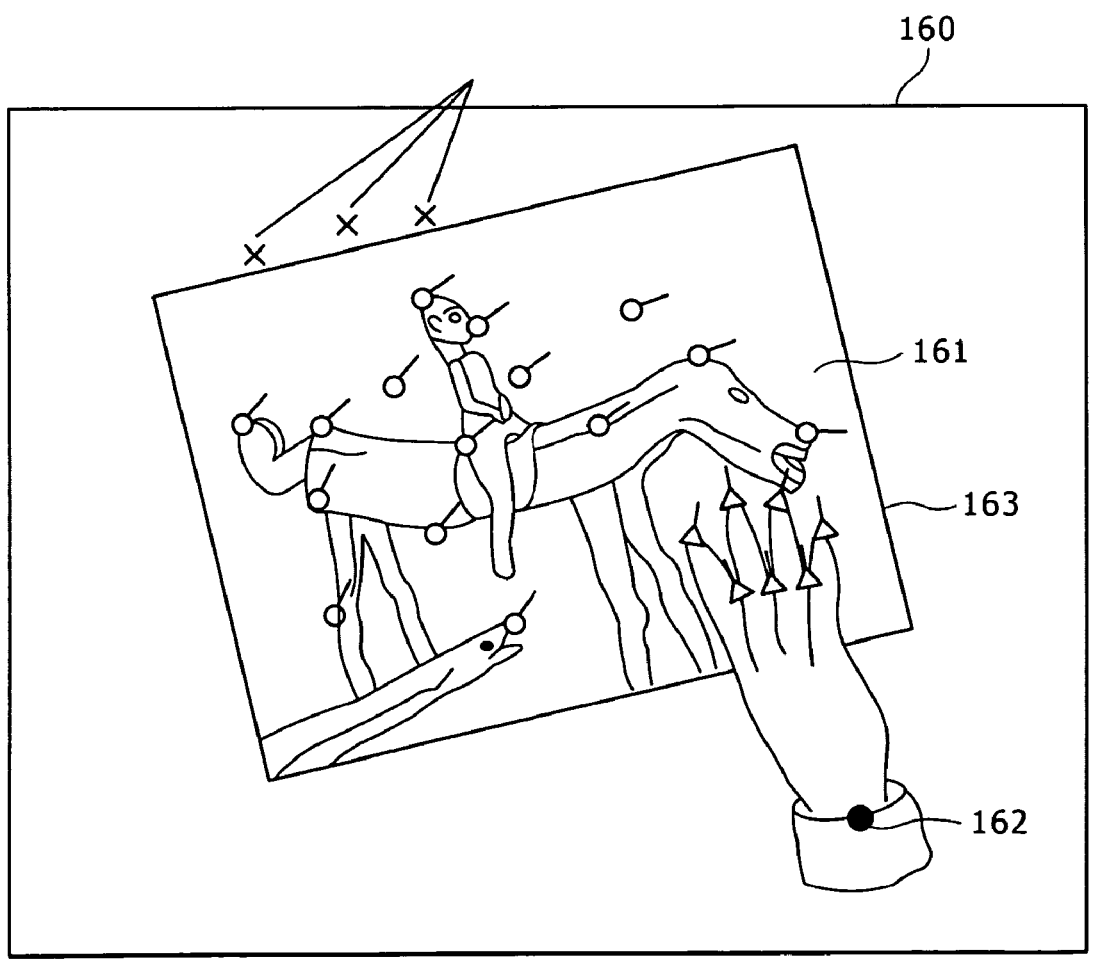
FIG. 20 is a diagram illustrating a representative affine matrix.

It should be noted that, in FIG. 20, each circle marker, each triangle marker, and each cross marker denote the feature points to be extracted in the input image 160. For a specified area 163, an area of the image of the photograph 161 in the input image 160 is specified.

The feature points each marked by circle are the feature points located on the photograph 161 in the specified area 163 in the input image 160. The feature points each marked by triangle are the feature points located in the boundary between the photograph 161 in the specified area 163 and the hand. The feature points each marked by cross are the feature points located outside the specified area 163 in the input image 160. Therefore, of the feature points extracted in the input image 160, the cross-marked feature points are deleted in the processing of step S154 by the feature point extraction block 142.

Figure 21:
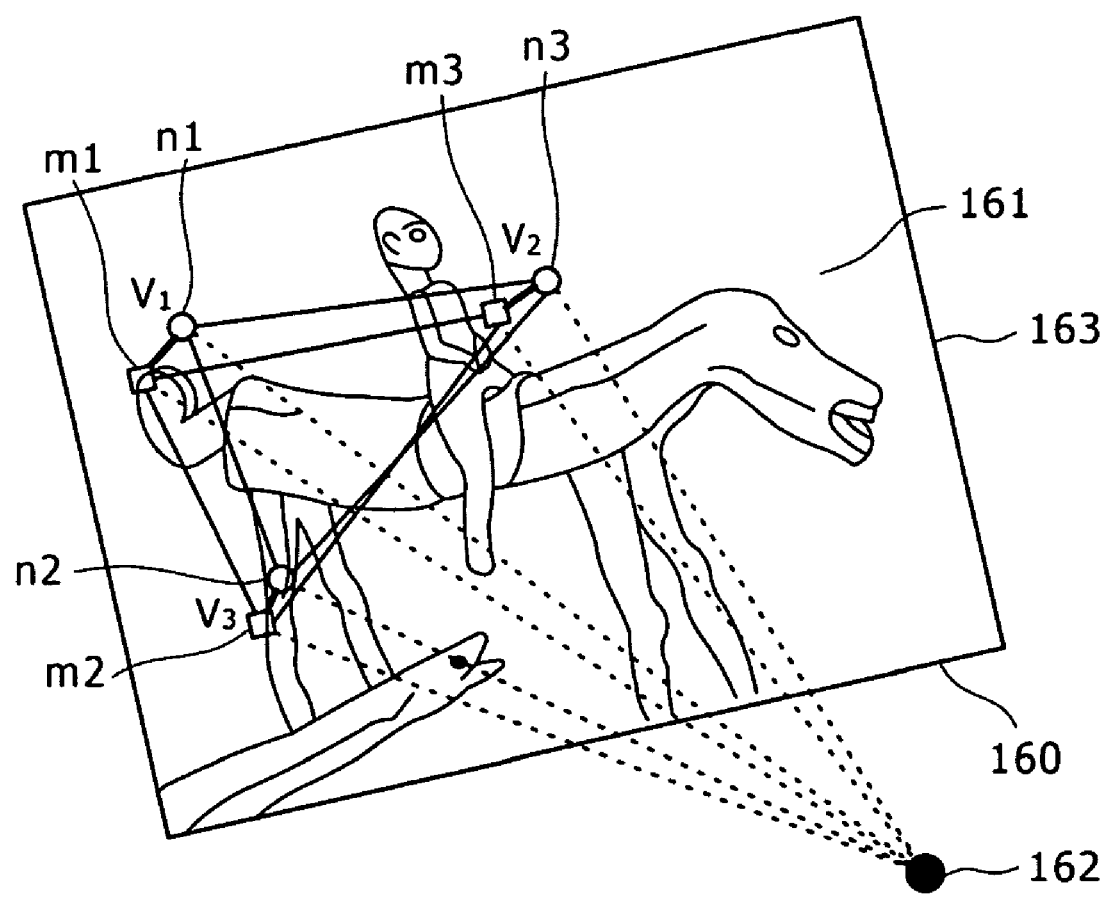
FIG. 21 is another diagram illustrating a representative affine matrix.

Of the feature points marked by circle and triangle located in the specified area 163, the specified-area tracking block 41 computes an affine matrix from the optical flow of three feature points. For example, as shown in FIG. 21, if the input image 160 is taken with the photograph 161 moved around the point 162, the optical flows of the three feature points n1 through n3 in the input image 160 are vectors v1 through v3 from the locations of three feature points m1 through m3 in the previous input image to the feature points n1 through n3. From these vectors v1 through v3, an affine matrix is computed.

If the error of the position of the feature points computed by use of this affine matrix is smaller than threshold T, the score is incremented by the number of these feature points and the affine matrix having the greatest score is selected as a typical affine matrix, so that the affine matrix having the smallest error in the specified area 163 is selected as a typical affine matrix. Therefore, not the affine matrix corresponding to the triangle-marked feature points located in the boundary of the hand in a local part of the specified area 163, but the affine matrix corresponding to the circle-marked feature points located on the photograph 161 located in the entirety of the specified area 163 is selected as a typical affine matrix. Namely, an affine matrix little affected by noise behavior can be selected as a typical affine matrix.

In step S164, the score computation block 146 determines whether the predetermined number of input images have been processed as target input images, namely, the typical affine matrices for the predetermined number of frames have been selected. As will be described later with reference to FIG. 30, this predetermined number of frames is equal to the number of frames of input images that are taken from the picking up of the input image used for the general object recognition processing to the end of the first specified area tracking processing of the specified area based on the object parameters entered by that general object recognition processing.

If the input images for the predetermined number of frames are found not yet processed as the target input images in step S164, then the score computation block 146 supplies the parameters of the typical affine matrix to the area specification block 141 as object parameters. In step S165, the area specification block 141 shifts the specified area on the basis of the received object parameters. It should be noted that the shift of the specified area denotes the movement of the specified area and the changing of posture thereof. Then, the area specification block 141 supplies the shifted specified area to the feature point extraction block 142.

In step S166, the feature point extraction block 142 reads, as a target input image, the input image having the frame number next to the frame number of the input image read immediately before as a target input image. Then, the procedure returns to step S153 to repeat the above-mentioned processing therefrom.

On the other hand, if the input images for the predetermined number of frames are found processed in step S164, then, in step S167, the score computation block 146 outputs the parameters of the typical affine matrix to the specified-area tracking block 42 as the object parameters obtained as a result of the specified area tracking processing along with the registration ID received from the recognition block 23. Then, the procedure returns to step S131 shown in FIG. 16.

As described above, the first specified area tracking processing can be fast executed, thereby enabling realtime tracking.

Figure 22:
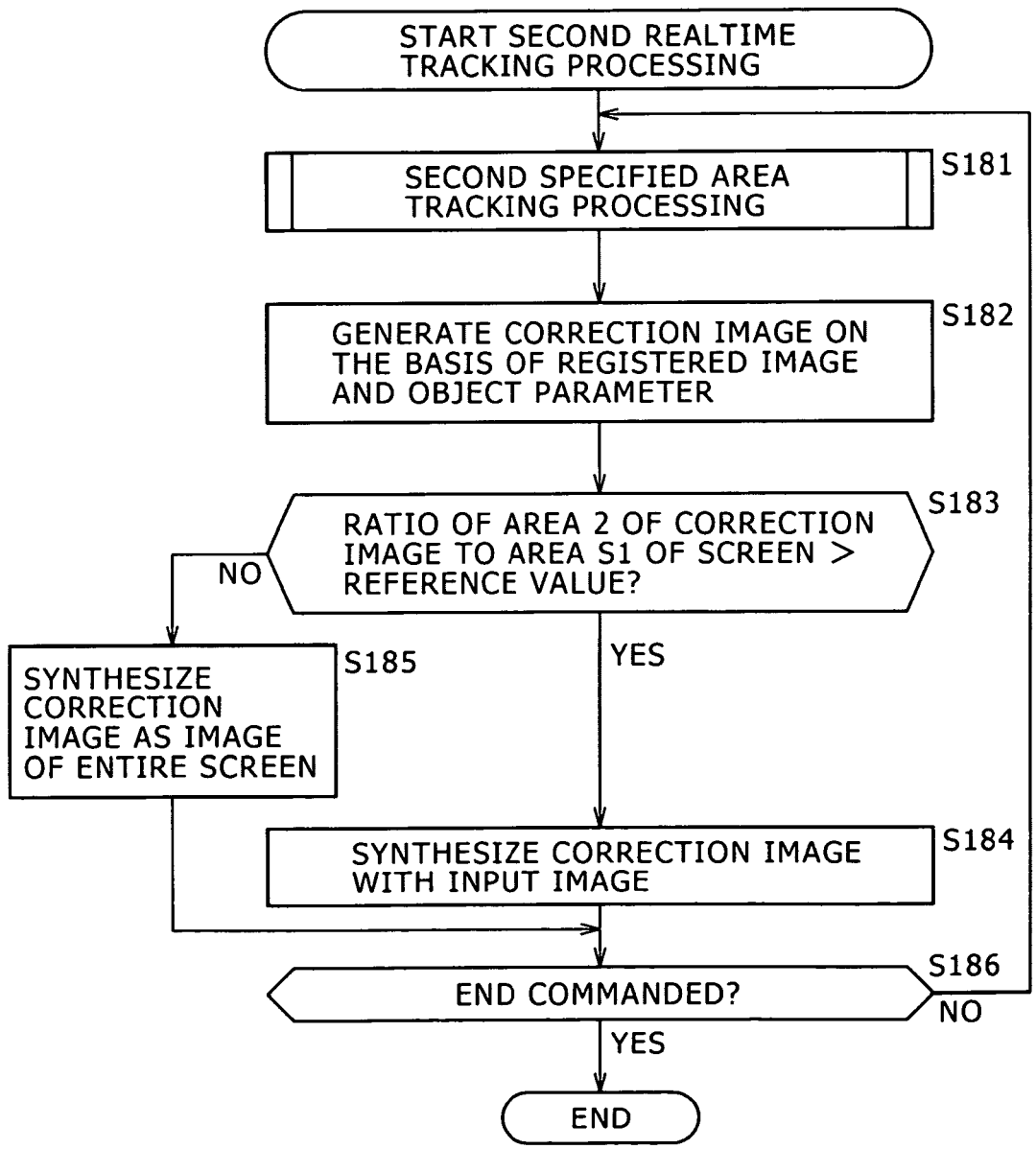
FIG. 22 is a flowchart indicative of second realtime tracking processing.

The following describes second realtime tracking processing to be executed by the image processing apparatus 11 shown in FIG. 2 with reference to the flowchart shown in FIG. 22.

In step S181, the specified-area tracking block 42 of the tracking unit 24 executes the second specified area tracking processing for tracking a specified area specified by the object parameters outputted from the specified-area tracking block 41 in step S167 shown in FIG. 18. Details of this second specified area tracking processing will be described later with reference to FIG. 29. Substantially, this is fast tracking operation similar to the first specified area tracking processing executed in step S131 shown in FIG. 16.

In step S182, the correction image generation block 25 generates, as a correction image for correcting the input image, a registration image of the same size and posture as those of the target object (the object recognized by the general object recognition processing by the recognition block 23) in the input image on the basis of the registered image received from the control block 28 in response to a request based on the registration ID supplied from the specified-area tracking block 42 and the object parameters received from the specified-area tracking block 42. The correction image generation block 25 supplies the generated correction image and the object parameters received from the specified-area tracking block 42 to the synthesis block 26.

In step S183, the synthesis block 26 determines whether a ratio of area S1 of a screen for displaying the input image to area S2 of the correction image received from the correction image generation block 25 is equal to or greater than a reference value. If this ratio is found equal to or greater than the reference value, then, in step S184, the synthesis block 26 synthesizes the correction image with the specified area specified by the specified-area tracking block 42 in the input image received from the image pickup block 21 on the basis of the object parameters received from the correction image generation block 25. Then, the synthesis block 26 supplies the synthesized image to the output block 27 and the control block 28. As a result, an image with the correction image embedded in the specified area of the input image is displayed on the screen of the output section of the other image processing apparatus 11 connected with the output block 27 via the network 12.

Figure 23:
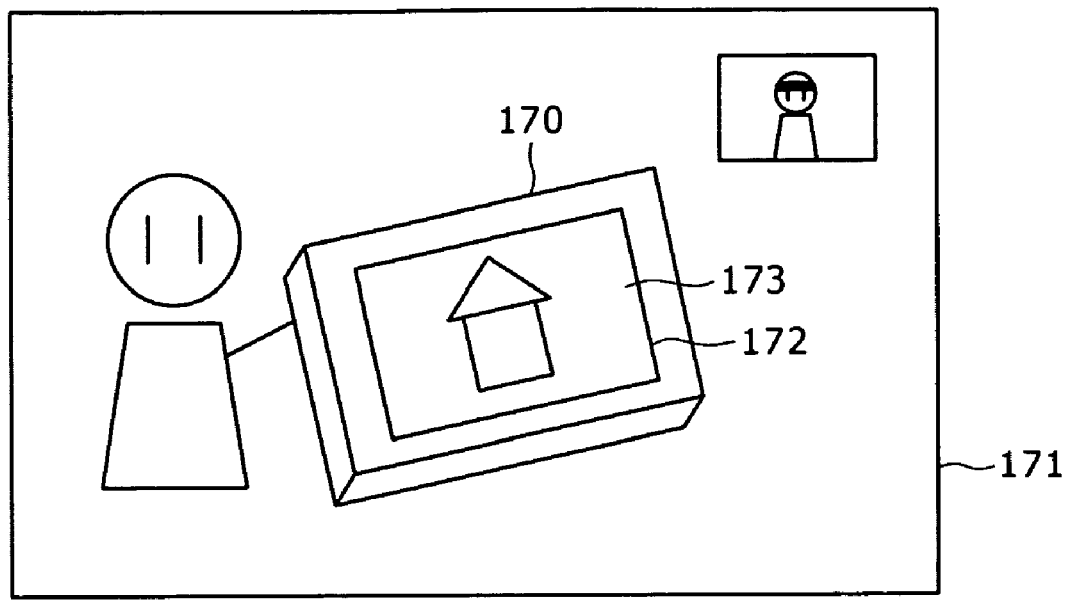
FIG. 23 is a diagram illustrating an exemplary synthesized image.

For example, if a person holding a digital camera 170 with a registered image displayed is taken as a subject and an input image 171 is resultantly obtained, a correction image 173 that is a registered image having the same size and posture as those of the input image 171 is imbedded in the area of a target object corresponding to the registered image that is the specified area 172 of the input image 171 as shown in FIG. 23. Consequently, the user can clearly see the registered image displayed on the digital camera 170 taken by the image pickup block 21 little feeling odd otherwise caused by the image synthesis.

Figure 24:
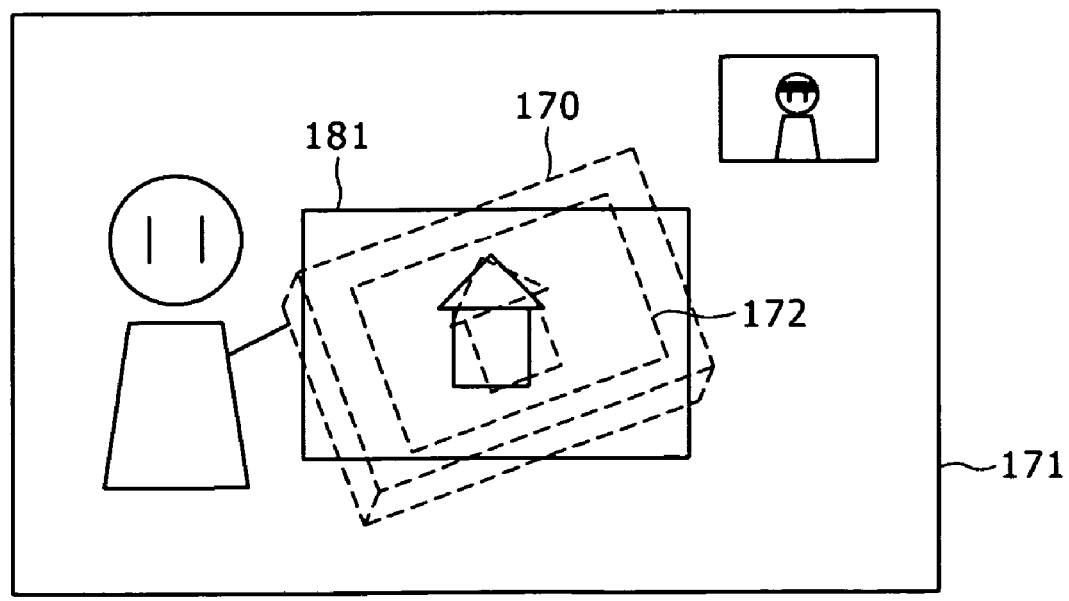
FIG. 24 is a diagram illustrating another exemplary synthesized image.

It is also practicable, as shown in FIG. 24, to generate as a correction image 181, a registered image having the same size as that of the target object in the input image 171 and having a posture facing the optical axis of the image pickup block 21 and display this correction image 181 in the specified area 172 with their centers in match, rather than generating a registered image having the same size and the same posture as those of the target object in the input image 171 as the format conversion block 173. In this case, if the user cannot arrange a registered image displayed on the digital camera 170 as facing the optical axis of the image pickup block 21, for example, the facing registered image can be displayed, thereby providing the user with an image in which the registered image can be seen more easily.

Figure 25:
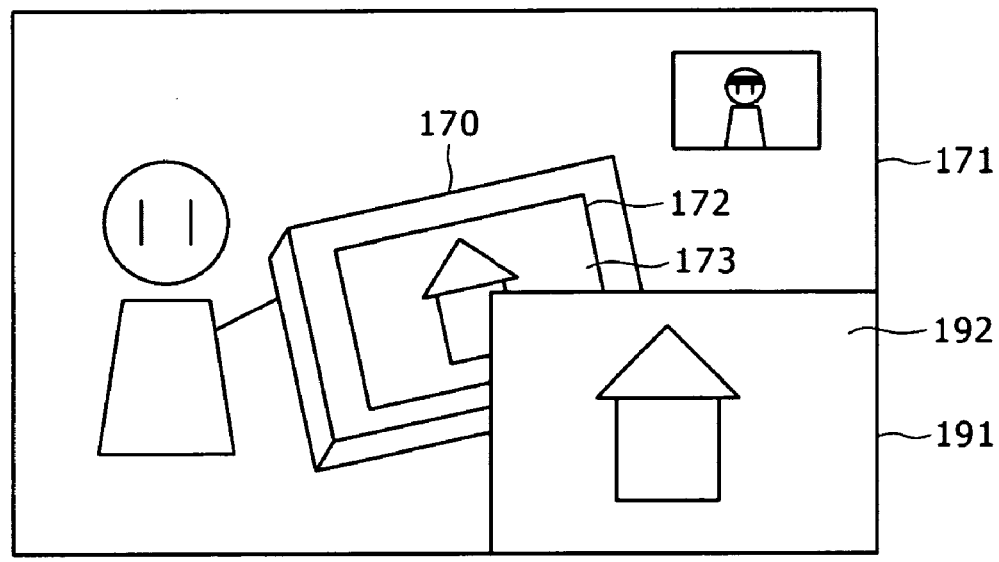
FIG. 25 is a diagram illustrating still another exemplary synthesized image.

As shown in FIG. 25, in addition to embed the format conversion block 173 into the specified area 172 of the input image 171, it is also practicable to display a registered image 192 on a predetermined area 191 without embedding.

On the other hand, if the ratio of square measure S1 of screen to area S2 of correction image is found below the reference value in step S183, then, in step S185, the synthesis block 26 synthesizes the correction image as the image of the entire screen with the input image received from the image pickup block 21 (substantially, an image obtained by the entire input image replaced by the correction image is generated) and supplies a resultant synthesized image to the output block 27 and the control block 28. Consequently, the correction image is displayed on the output block 27 of the other image processing apparatus 11 connected to the output block 27 of image processing apparatus 11 concerned via the network 12.

Figure 26:
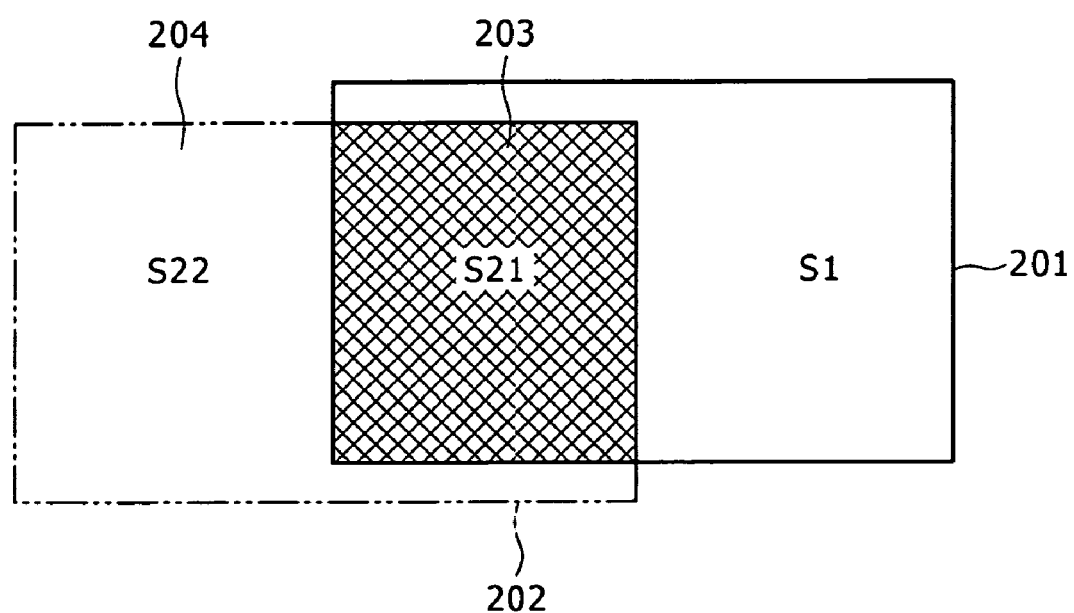
FIG. 26 is a diagram illustrating an area of a correction image and a screen.

For example, as shown in FIG. 26, if area S2 (a sum of area S21 of the specified area 203 and area S22 of a non-specified area 204 corresponding to the specified area 203 in the correction image 202) of a correction image 202 is greater, area S22 of the non-specified area 204 gets greater than area S21 of the specified area 203 in the screen 201 having area S1. Namely, in this case, is the correction image 202 is synthesized with the specified area 203, the correction area 202 becomes a local part of the correction image 202. Therefore, the user cannot recognize the registered image that has become the subject.

Figure 27:
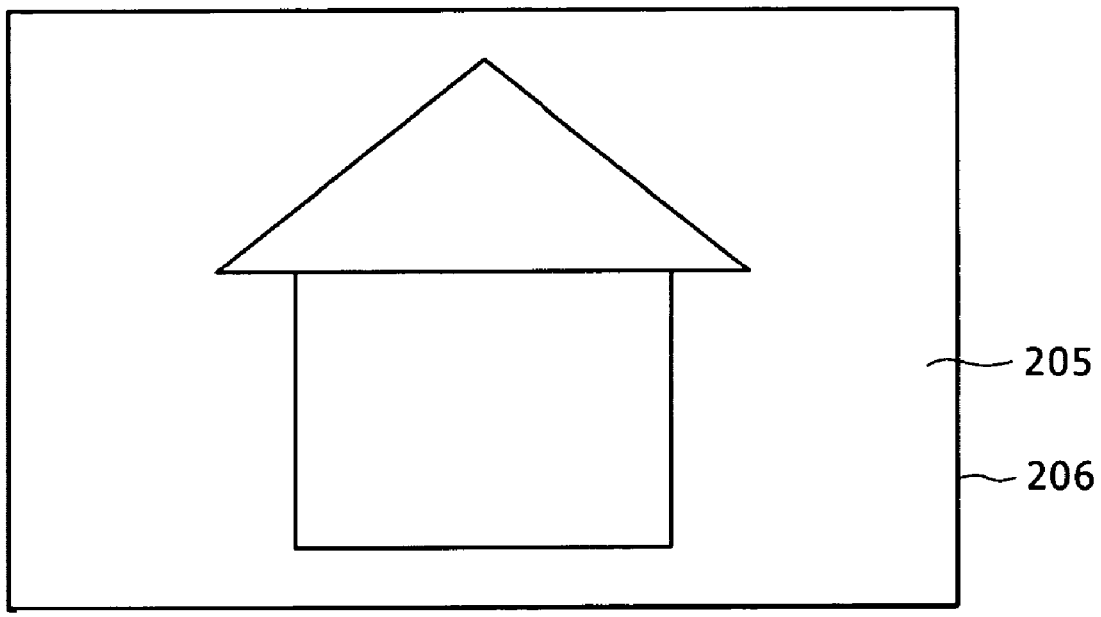
FIG. 27 is a diagram illustrating a synthesized image.

Consequently, if the ratio to area S2 of correction image is found below the reference value, the synthesis block 26 synthesizes a correction image 205 with the input image received from the image pickup block 21, as the image of an entire screen 206, as shown in FIG. 27 for example. As a result, the correction image 205 of full-screen size is displayed on the screen 206. Consequently, if the user puts the registered image too close to the image pickup block 21, taking only a part of the registered image, the user can recognize the registered image.

After the processing of step S184 or step S185, the procedure goes to step S186, in which the specified-area tracking block 42 determines whether the end of television communication has commanded by the user. If the end of television communication is found not commanded by the user in step S186, the processing operations of steps S181 through S185 are repeated until the end of television communication is commanded. When the end of television communication is found commanded in step S186, then the above-mentioned processing comes to an end.

Figure 28:
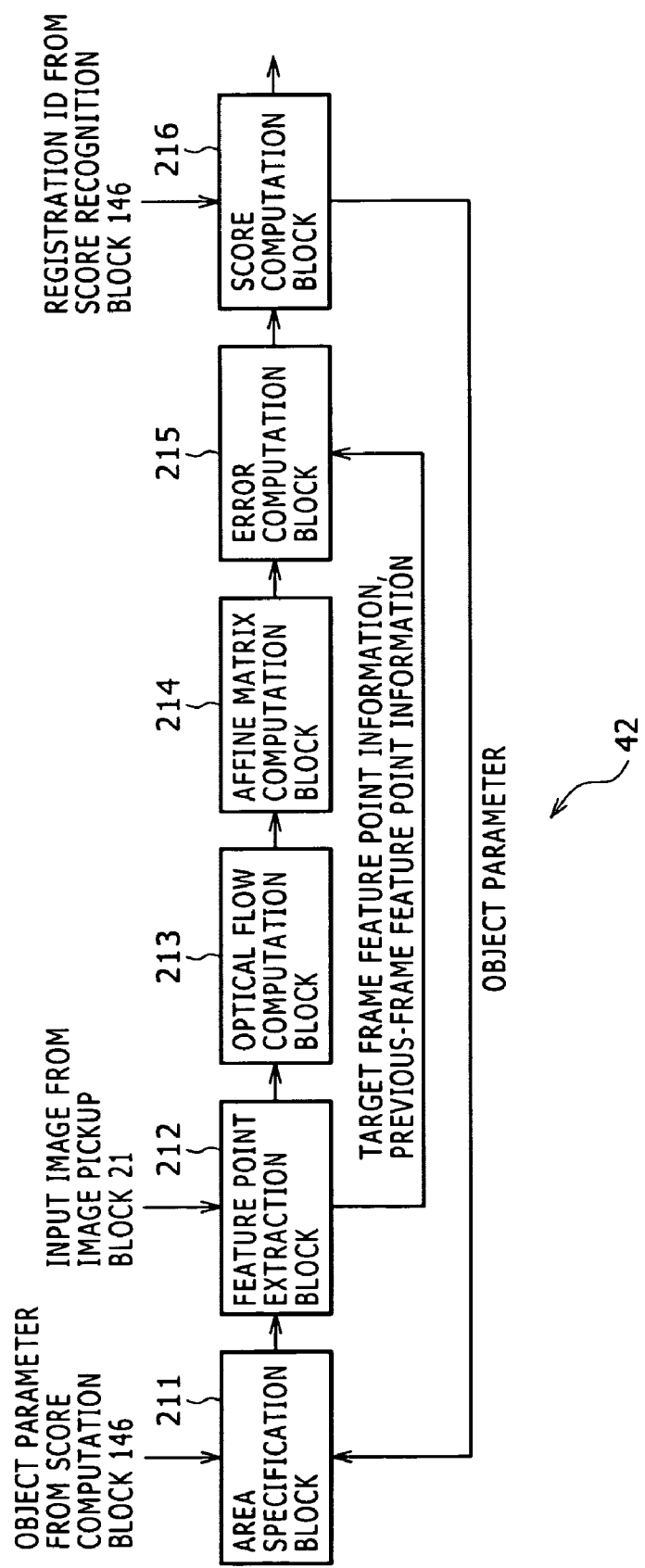
FIG. 28 is a block diagram illustrating an exemplary configuration of a specified-area tracking block shown in FIG. 2.

In order to execute the second specified area tracking processing of step S181 shown in FIG. 22, the specified-area tracking block 42 shown in FIG. 2 has a configuration as shown in FIG. 28.

A specified-area tracking block 42 shown in FIG. 28 has an area specification block 211, a feature point extraction block 212, an optical flow computation block 213, an affine matrix computation block 214, an error computation block 215, and a score computation block 216.

To the area specification block 211, an object parameter is supplied from the score computation block 146 of the specified-area tracking block 41 or the score computation block 216 of the specified-area tracking block 42. As with the area specification block 141 shown in FIG. 17, on the basis of the supplied object parameter, the area specification block 211 specifies a specified area and supplies the specified area to the feature point extraction block 212.

To the feature point extraction block 212, an input image is supplied from the image pickup block 21. By use of the supplied input image for a target input image, the feature point extraction block 212 extracts feature points from this target input image in the same manner as the feature point extraction block 122 (FIG. 3) and the feature point extraction block 142 (FIG. 17). Like the feature point extraction block 142, on the basis of he specified area supplied from the area specification block 211, the feature point extraction block 212 deletes, of the extracted feature points, any feature points located outside the specified area, temporarily holding the feature point information. Also, the feature point extraction block 212 supplies target frame feature point information, previous-frame feature point information, and the target input image to the optical flow computation block 213. The feature point extraction block 212 supplies the target frame feature point information and the previous-frame feature point information to the error computation block 215.

The functions of the optical flow computation block 213, the affine matrix computation block 214, and the error computation block 215 are the same as those of the optical flow computation block 143, the affine matrix computation block 144, and the error computation block 145 shown in FIG. 17, so that the description thereof will be omitted.

Like the score computation block 146 shown in FIG. 17, the score computation block 216 determines whether there is any error below predetermined threshold T, of the errors supplied from the error computation block 215. Like the score computation block 146, the score computation block 216 determines a score of the affine matrix corresponding to that error in accordance with a result of the determination.

Like the score computation block 146, the score computation block 216 selects, of the affine matrices in the target input image, the affine matrix having the greatest score as a typical affine matrix in the specified area. Like the score computation block 146, the score computation block 216 supplies the parameter of the typical affine matrix to the area specification block 211 as an object parameter. To the score computation block 216, the registration ID is also supplied from the score computation block 146. When a predetermined time comes, the score computation block 216 supplies the parameter of the typical affine matrix to the correction image generation block 25 along with this registration ID.

Thus, the configuration of the specified-area tracking block 42 is basically the same as the configuration of the specified-area tracking block 41.

Figure 29:
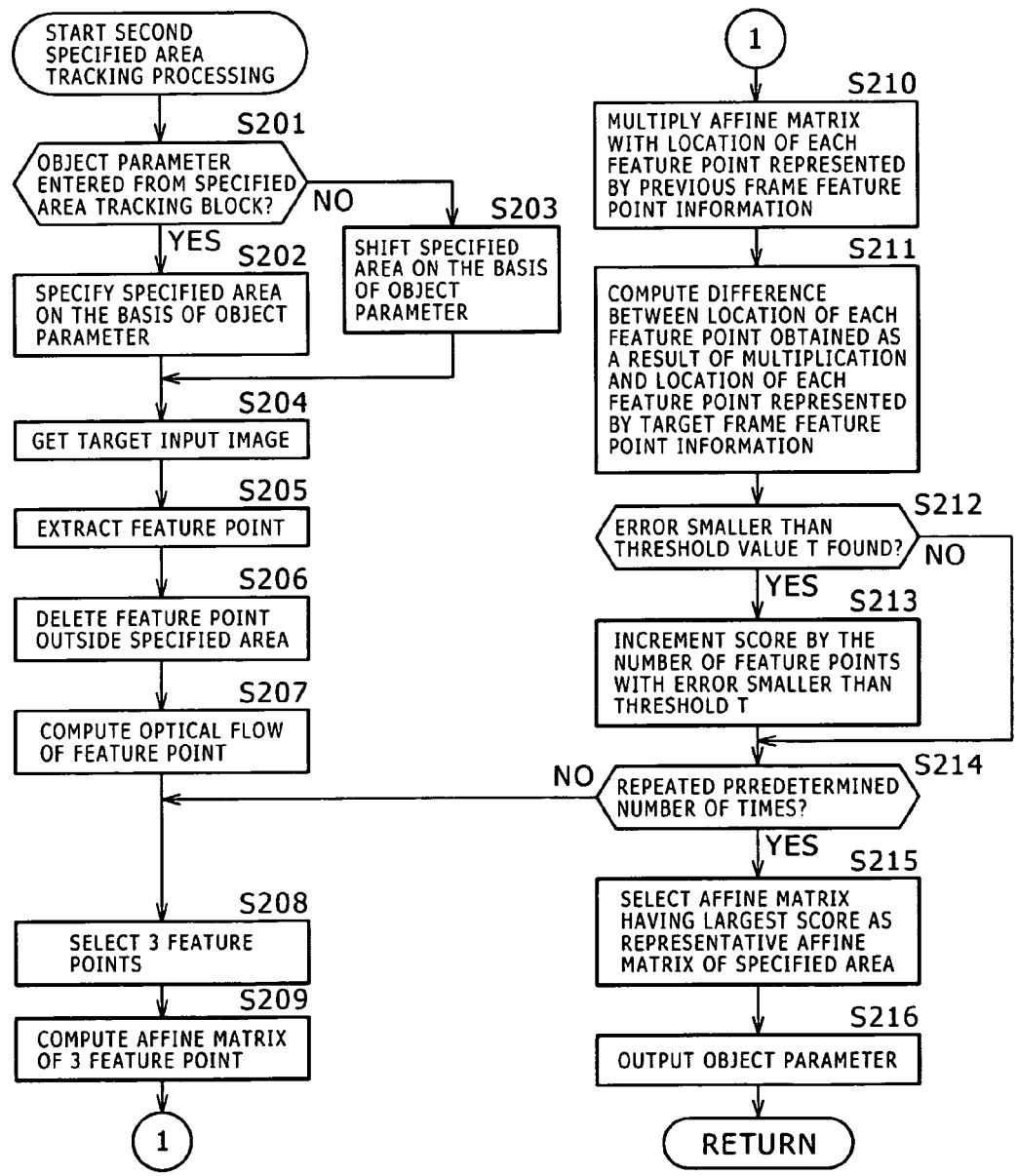
FIG. 29 is a flowchart indicative of second specified-area tracking processing shown in FIG. 22.

The following describes details of the second specification area tracking processing of step S181 shown in FIG. 22 with reference to the flowchart shown in FIG. 29.

In step S201, the area specification block 211 determines whether an object parameter has been entered from the specified-area tracking block 41. If an object parameter is found entered from the specified-area tracking block 41 in step S201, then, in step S202, the area specification block 211 specifies a specification area on the object parameter received from the specified-area tracking block 41, supplying the specified area to the feature point extraction block 212.

On the other hand, if no object parameter is found entered from the specified-area tracking block 41, then, in step S203, the area specification block 211 shifts the specified area on the basis of an object parameter to be supplied from the score computation block 216 in step S216 to be described later, supplying the specified area to the feature point extraction block 212.

After the processing of step S202 or step S203, the procedure goes to step S204, in which the feature point extraction block 212 gets an input image supplied from the image pickup block 21 as a target input image. The processing operations of steps S205 through S215 are the same as those of steps S153 through S163 shown in FIG. 18 and therefore the description thereof will be omitted.

In step S215, a typical affine matrix is selected and, in step S216, the score computation block 216 outputs the parameter of the typical affine matrix to the correction image generation block 25 as an object parameter obtained as a result of the tracking of the specified area, along with the registration ID received from the score computation block 146, at the same time outputting the object parameter to the area specification block 211. Then, the procedure returns to step S181 shown in FIG. 22.

As described above, the second specified area tracking processing by the specified-area tracking block 42, basically the same as the first specified area tracking processing by the specified-area tracking block 41, can execute the fast processing to enable realtime tracking. While an initial value to be tracked is set by use of the information supplied from the recognition block 23 in the first specified area tracking processing, the initial value is set by use of the information supplied from the specified-area tracking block 41 in the second specified area tracking processing. While images to be processed are input images stored in the storage block 22 in the first specified-area tracking processing, the images are input images supplied realtime from the image pickup block 21 in the second specified area tracking processing.

The following describes processing timings in the image processing apparatus 1 shown in FIG. 2 with reference to FIG. 30.

It should be noted that, in FIG. 30, the horizontal direction is dedicative of time. In FIG. 30, each square is indicative of a frame that is processed at the time corresponding to a horizontal direction. The number written in or above each square is indicative of the frame number of that frame.

As shown in A of FIG. 30, in the image taking processing shown in FIG. 15, a subject is taken by the image taking block 21 and an taken image in unit of frame is obtained as an input image. In the example shown in FIG. 30, the frame number of the input image first registered is "2".

Also, in the example shown in FIG. 30, as shown in B, five frames of input images are taken and stored between a time when the general object recognition processing to be described later with reference to FIGS. 34 through 36 initiates and a time when this processing ends. Therefore, as shown in B of FIG. 30, in the general object recognition processing, the input image of every five frame entered from the image taking block 21 at the start of this processing is used as a target input image. To be more specific, in the example shown in FIG. 30, the input images having frame numbers "2", "7", "12", "17" . . . and so on provide input images sequentially.

As shown in C of FIG. 30, the first specified area tracking processing shown in FIG. 18 starts when an object parameter is entered from the recognition block 23 by the general object recognition processing. In this first specified area tracking processing, the input image used for obtaining the object parameter entered at starting of the processing provides a target input image, namely, each of the input images having frame numbers supplied from the recognition block 23 provides a target input image until the input image stored last is used as a target input image. That is, each of the input images taken from a time when the input images having frame numbers supplied from the recognition block 23 were taken to a time when the first specified area tracking processing has ended sequentially provide a target input image.

It should be noted that, in the example shown in FIG. 30, seven frames of input images are taken and stored from a time when an input image having a frame number supplied from the recognition block 23 was taken to a time when the first specified area tracking processing has ended. Therefore, in the first specified area tracking processing, seven frames of input images provide target input images.

As described above, in the first specified area tracking processing, the specified area is tracked in the input images taken from a time when input images used for general object recognition processing were taken to a time when the first specified area tracking processing has ended. Therefore, the object parameter outputted in the first specified area tracking processing is a result of the tracking of the specified area in the input image taken immediately before the second specified area tracking processing starts.

As shown in D of FIG. 30, the second specified area tracking processing shown in FIG. 29 starts when an object parameter has been entered from the specified-area tracking block 41 by the first specified area tracking processing or an input image has been entered after the entry of an object parameter. In this second specified area tracking processing, the processing is executed with the input image taken at the start of the processing used as a target image.

As described above, the object parameter outputted in the first specified area tracking processing is a result of the tracking of the specified area in the input image taken immediately before the starting of the second specified area tracking processing, so that, in the second specified area tracking processing, tracking the specified area on the basis of this object parameter allows the realtime tracking in the input image taken at the time of the starting of the processing. Consequently, while executing the general object recognition processing that is accurate but takes time, the image processing apparatus 11 shown in FIG. 2 allows the realtime tracking on the basis of a result of this general object recognition processing, thereby providing realtime precision tracking.

As shown in FIG. 30, in the present embodiment, the second specified area tracking processing does not continue to the first specified area tracking processing that is executed on the basis of the second frame through the eighth frame and the shift is made from the first specified area tracking processing to the second specified area tracking processing; but the general object recognition processing and the first specified area tracking processing are executed every five frames and the second specified area tracking processing is restarted every time these processing operations are executed. This configuration allows the more accurate tracking than the configuration in which the second specified area tracking processing is not restarted.

Figure 32A:
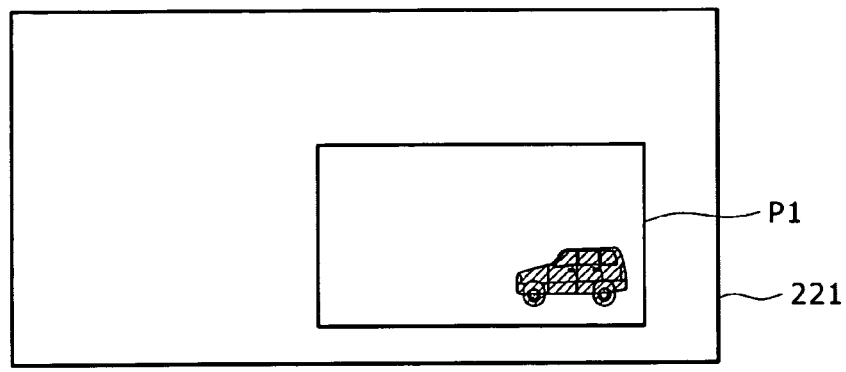
FIGS. 32A, 32B, and 32C are diagrams illustrating effects to be obtained by the image processing apparatus shown in FIG. 2.
Figure 32B:
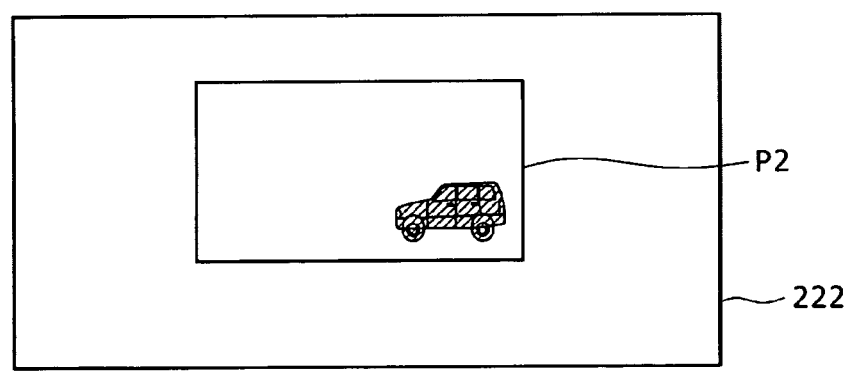
Figure 32C:
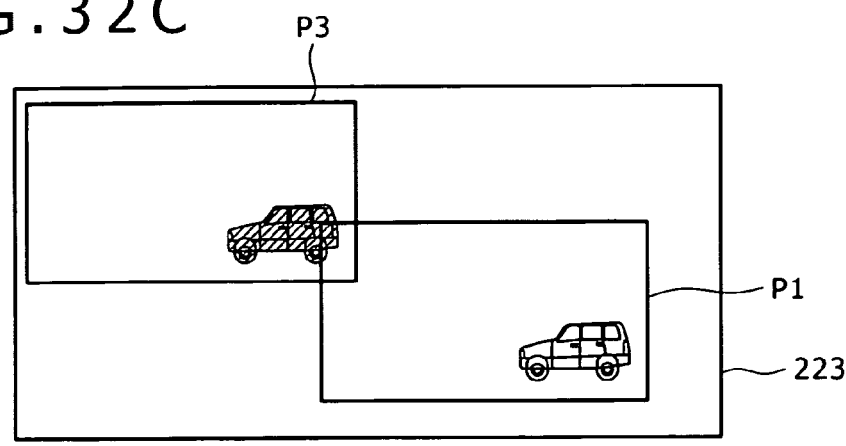
Figure 33A:
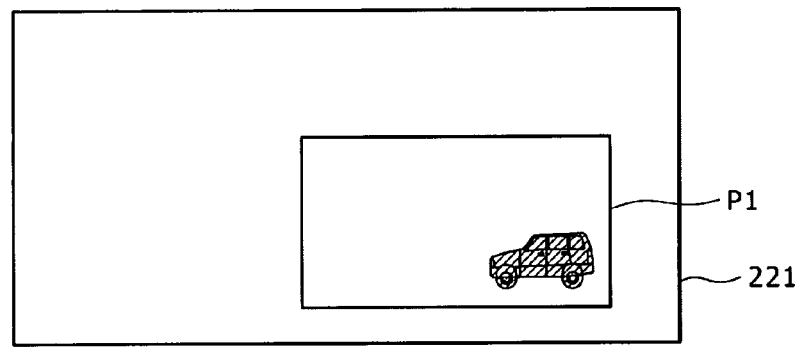
FIGS. 33A, 33B, and 33C are diagrams illustrating effects to be obtained by the image processing apparatus shown in FIG. 2.
Figure 33B:
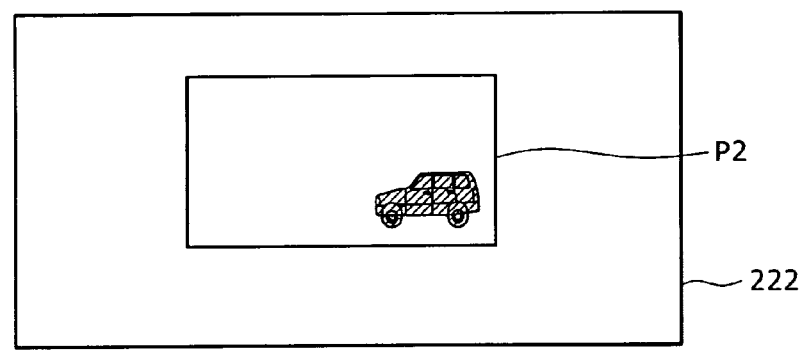

The following describes effects to be provided by the image processing apparatus 11 shown in FIG. 2 with reference to FIGS. 31 through 33.

Figure 31A:
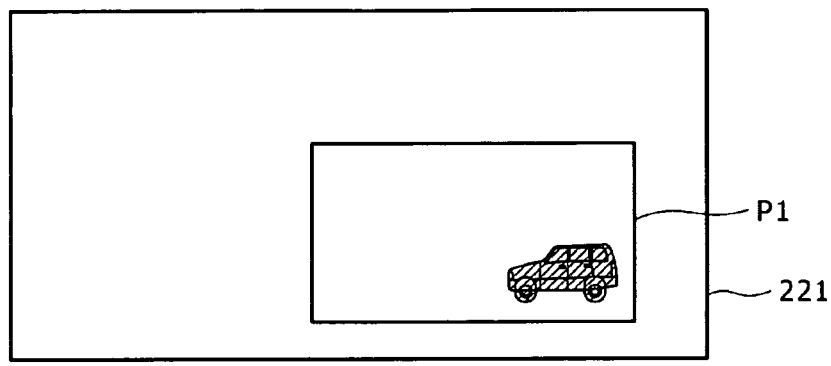
FIGS. 31A, 31B, and 31C are diagrams illustrating effects to be obtained by the image processing apparatus shown in FIG. 2.
Figure 31B:
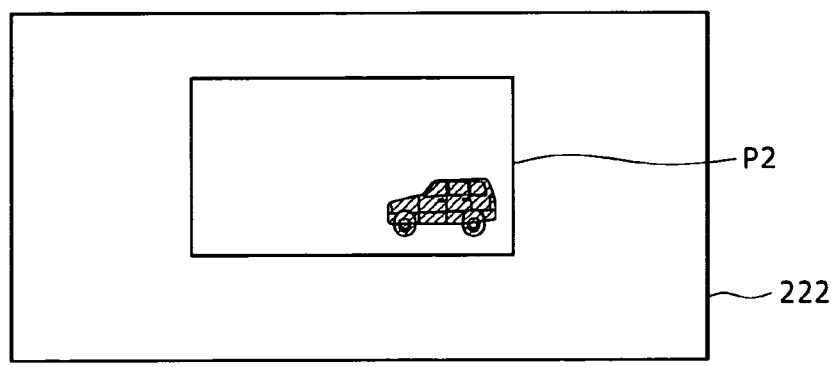
Figure 31C:
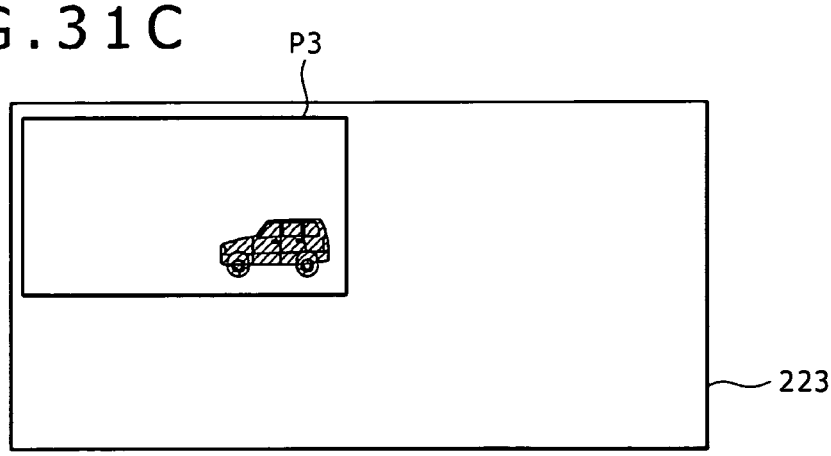

First, images to be taken realtime by the image taking block 21 will be described with reference to FIG. 31. In the example shown in FIG. 31, after an input image 221 with a display area of a target object shown in FIG. 31A (hereafter referred to as a target object area) being area P1 is taken, an input image 222 with a target object area shown in FIG. 31B being P2 is taken, and an input image 223 with a target object area shown in FIG. 31C being area P3 is taken. Namely, states in which the user moves a photograph from the lower right to the upper left are taken.

The following describes a situation with reference to FIG. 32 in which tracking processing for tracking a specified area based on an object parameter obtained as a result of the general object recognition processing is executed and a synthesized image is generated by use of an object parameter obtained as a result of this processing. Namely, the following describes a case in which the recognition block 23 and the specified-area tracking block 41 are combined. It should be noted that, in this case, the input images taken from the taking of the input image providing a target input image in the general object recognition processing to the starting of the tracking processing are used for tracking.

Like the case of FIG. 31, in the example shown in FIG. 32, an input image 221 (FIG. 32A), an input image 222 (FIG. 32B), and an input image 223 (FIG. 32C) are sequentially taken. As described above, the tracking processing is executed by use of input images taken from a time when an input image providing a target input image in the general object recognition processing was taken to a time when the tracking processing has started, so that, if a synthesized image is generated on the basis of the input image 223 taken at the time of synthesis by use of an object parameter obtained as a result of the tracking processing, a synthesized image with a correction image embedded in area P1 of the input image 223 is generated on the basis of the object parameter in the input image 221 prior to the input image 223 taken at starting of the tracking processing. Therefore, the display position of the correction image is delayed by a time between the starting of the tracking processing and the time of the synthesis.

In contrast, if the first specified area tracking processing for tracking a specified area on the basis of an object parameter obtained as a result of the general object recognition processing is executed, the second specified area tracking processing for tracking a specified area on the basis of an object parameter obtained as a result of the first specified area tracking processing is executed, and a synthesized image is generated by use of an object parameter obtained as a result of the second specified area tracking processing, namely, if the tracking is executed by the recognition block 23, the specified-area tracking block 41, and the specified-area tracking block 42, an example shown in FIG. 33 is obtained.

In the example shown in FIG. 33, the input images 221 through 223 are sequentially taken as with the examples shown in FIGS. 31 and 32. As described above, in the first specified area tracking processing, input images taken from a time when an input image providing a target input image in the general object recognition processing was taken to a time when the first specified area tracking processing has ended provide target input images, so that, in the second specified area tracking processing, tracking a specified area on the basis of an object parameter obtained as a result of the first specified area tracking processing allows the realtime tracking in each input image taken at the starting of the second specified area tracking processing.

Figure 33C:
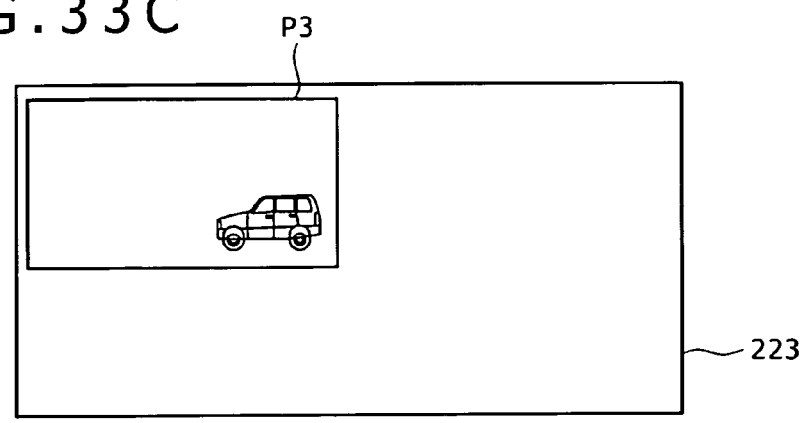

Therefore, as shown in FIG. 33C, if the input image 223 is taken, a synthesized image with a correction image embedded in area P3 of the target object of the input image 223 is generated on the basis of an object parameter obtained as a result of the realtime tracking in the input image 223.

Figure 34:
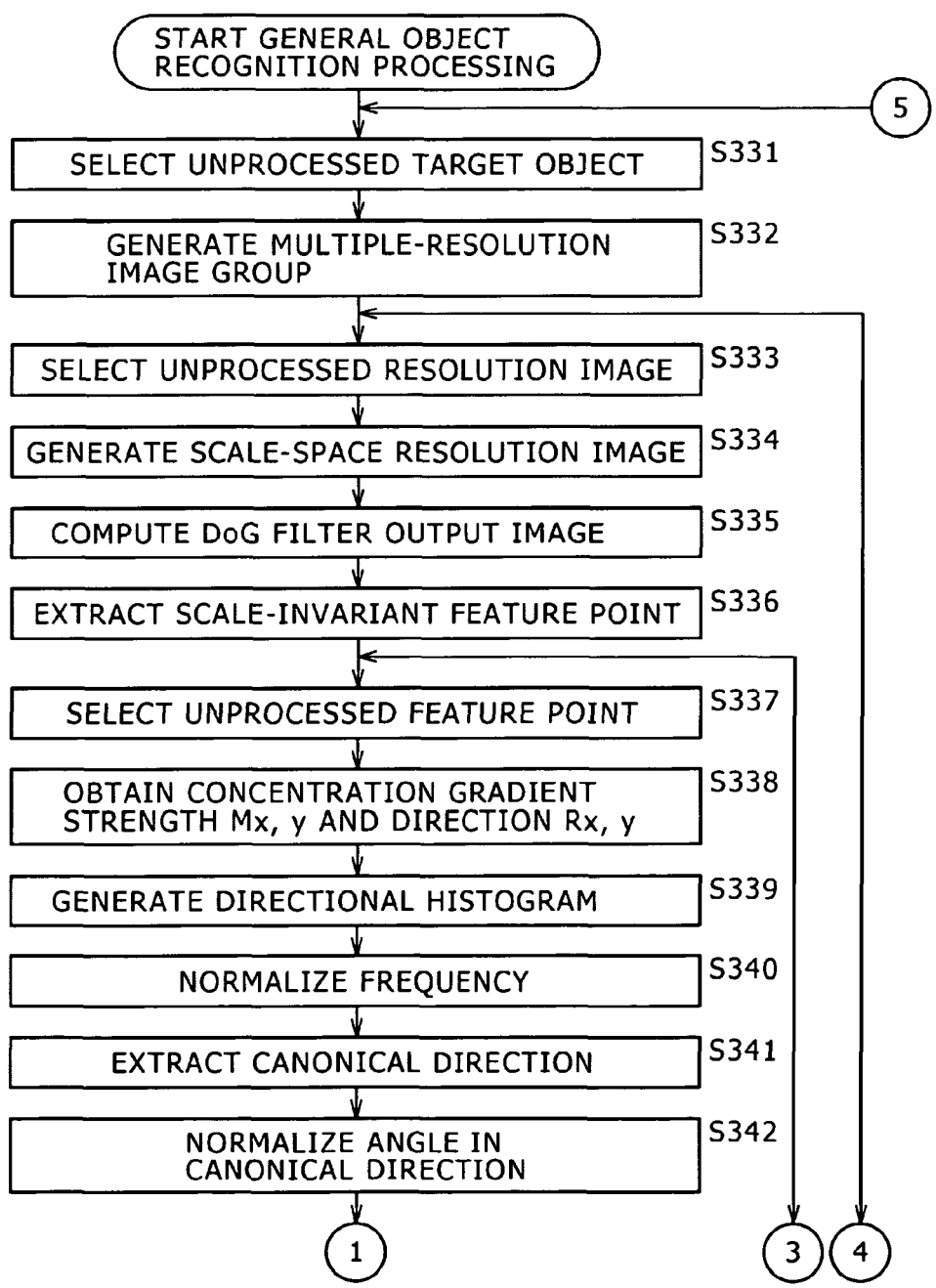
FIG. 34 is a flowchart indicative of general object recognition processing to be executed by the recognition block shown in FIG. 2.
Figure 35:
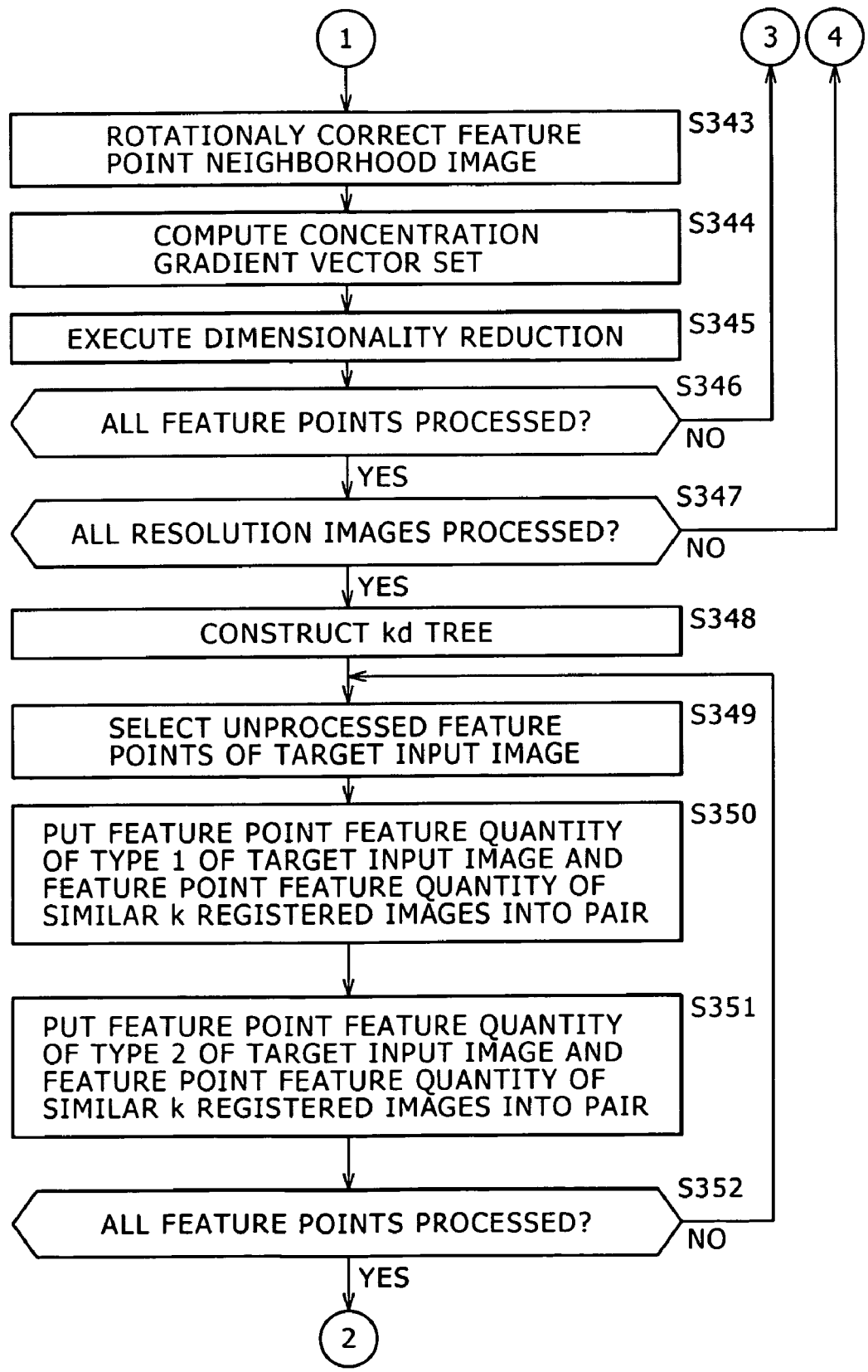
FIG. 35 is a flowchart continued from the flowchart shown in FIG. 34.
Figure 36:
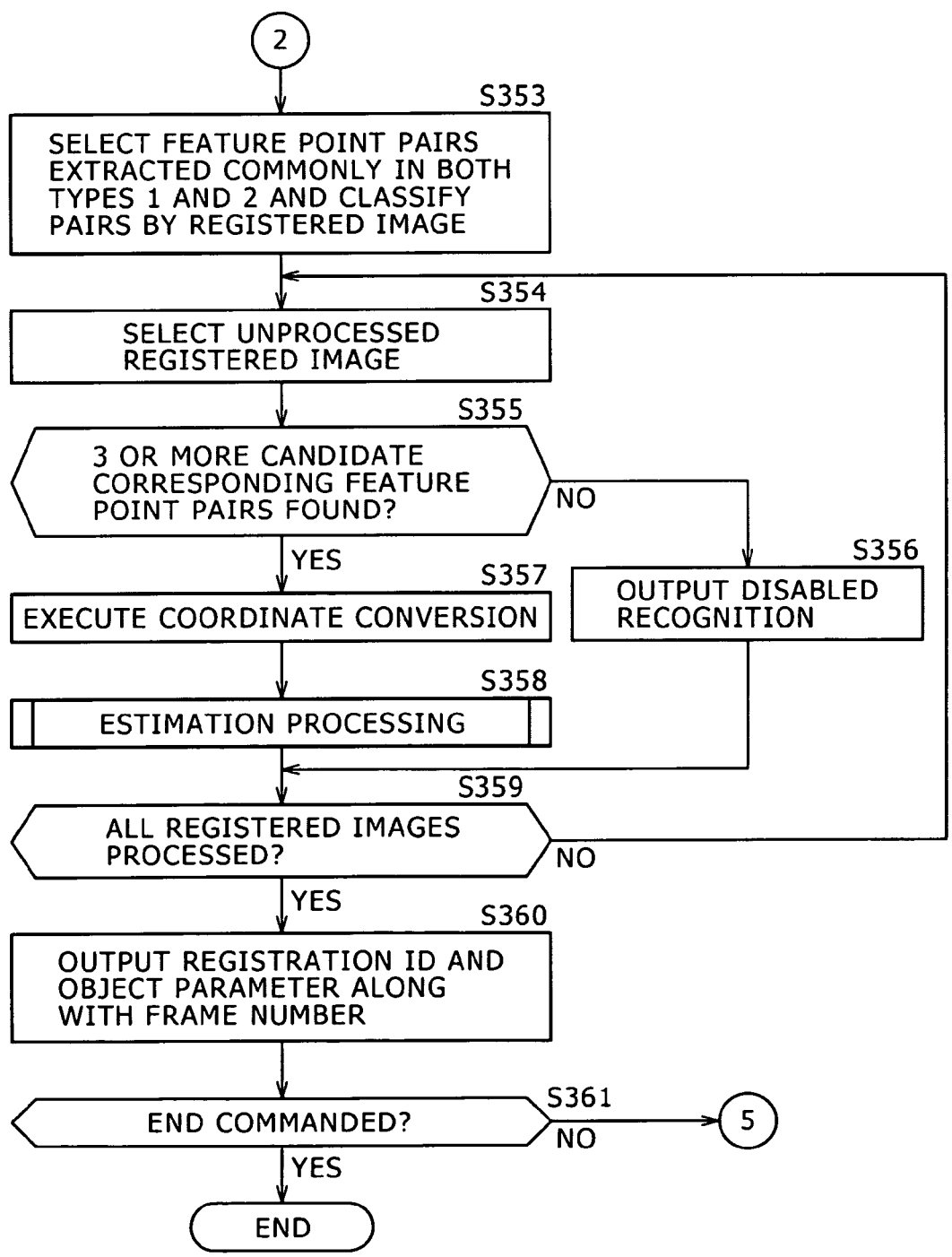
FIG. 36 is a flowchart continued from the flowchart shown in FIG. 35.

The following describes the general object recognition processing to be executed by the recognition block 23 shown in FIG. 2 with reference to the flowcharts shown in FIGS. 34 through 36.

In step S331 through S347, the multiple-resolution generation block 131, the feature point extraction block 132, and the feature quantity extraction block 133 use an input image entered at this time for a target input image and execute substantially the same processing operations on this target input image as those to be executed by the multiple-resolution generation block 121, the feature point extraction block 122, and the feature quantity extraction block 123 of the learning block 111 in steps S11 through S27 shown in FIGS. 4 and 5. Therefore, the description of these processing operations will be omitted for the brevity of description. However, there is a difference in the configuration of multiple-resolution image determined by parameters N and a between recognition and learning.

While the multiple-resolution generation block 121 generates a multiple-resolution image at the time of learning with a wide magnification range and a high accuracy, the multiple-resolution generation block 131 generates a multiple-resolution image with a coarse accuracy at the time of recognition. To be more specific, while the parameters applied in the present embodiment are $N=10$ and $\alpha=0.1$ at the time of learning in step S12, the parameters applied at the time of recognition in step S332 are $N=2$ and $\alpha=0.5$. The reasons therefor are as follows.

(1) In order to enhance the accuracy of recognition, it is desired to make a comparison of feature quantities by use of more amounts of feature point feature quantity information. Namely, it is desired to extract feature points from more multiple-resolution images.

(2) In order to obtain robustness of scale variation, it is desired to widen the scale range of the configuration of each multiple-resolution image as far as possible.

(3) Because the realtime nature need not be valued much at the time of the learning of registered images, the number of multiple-resolution images of registered images can be increased to extract and hold feature point feature quantities by widening the scale range.

(4) In the present embodiment, a comparison is made between the feature point feature quantities extracted from each target input image by use of k-Nearest Neighbor (k-NN) search (to be described later) of kd tree built from all feature point feature quantities of all registered images, so that the computation cost for the comparison of feature quantities increases as the number of feature points extracted from each target input image increases, but, with respect to the number of registered image feature points, the computation cost can be contained to an order of logn (namely, O(logn)) if the kd tree is constructed from all registered images, where n denotes the total number of image feature points.

(5) On the other hand, because the realtime nature is stressed at the time of recognition, it is necessary to lower the computation cost as far as possible by decreasing the number of multiple-resolution images.

(6) However, if only target input images are used without generating multiple-resolution images from target input images and the size of the registered image in each target input image is greater than the size of the original registered image, then the recognition of that target object is disabled.

Figure 37:
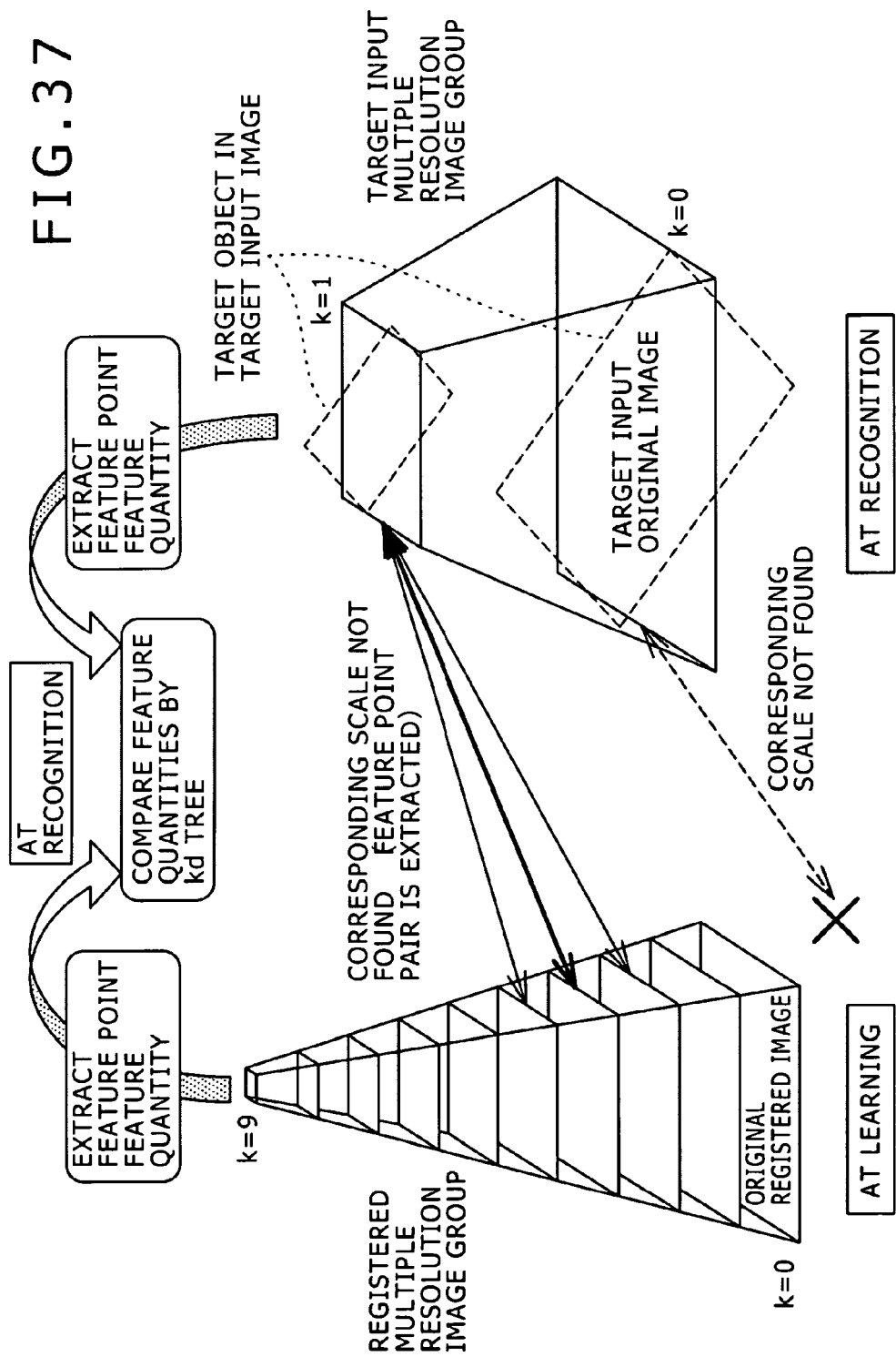
FIG. 37 is a diagram illustrating multiple resolutions at learning and recognition.

For these reasons, while more ($k=0$ to 9) multiple-resolution images are generated from the registered images at the time of learning with a wider range ($N=10$, $\alpha=0.1$) to extract more feature points as shown in FIG. 37, the minimum necessary ($k=0$, 1) multiple-resolution images are generated from the target input images at the time of recognition ($N=2$, $\alpha=0.5$) to extract feature points and a feature quantity comparison is made by applying the k-NN search on the kd tree, thereby realizing the recognition processing low in computation cost and good in recognition accuracy. FIG. 37 shows that the original registered image is too large and therefore there is no target object of a layer having a scale corresponding to this original registered image, but reducing the original registered image ($k=0$) by 0.5 times ($k=1$) to provide the target object of the layer having a scale corresponding to the original registered image.

When the processing operations of steps S331 through S345 have been executed on all feature points and all resolution-images, then the procedure goes to step S348.

As will be described later, each of the feature point feature quantities (a dimensionally degenerated concentration gradient vector group) extracted from the target input image is compared with each of the feature point feature quantities of the registered image to be combined with a similar registered image feature point feature quantity as a candidate corresponding feature point pair. The simplest feature quantity comparison method is the total search method. In this method, the similarity between feature quantities with all feature point feature quantities of all registered images is executed for each feature point feature quantity of the target input image and a corresponding feature point pair is selected in accordance with the obtained similarity. However, the total search method is not practical in terms of computation cost. So, in the present embodiment, in order to fast search a huge amount of data groups for necessary data, the tree search method using a data structure called kd tree is used (J. H. Friedman, J. L. Bentley, R. A. Finkel, "An algorithm for finding best matches in logarithmic expected time" ACM Transactions on Mathematical Software, Vol. 3, No. 3, pp. 209-226, September 1977). The kd tree denotes a tree structure of k dimensions.

If only a part of registered images registered in the registered image dictionary registration block 124 by the learning process so far may be recognized, the kd tree construction block 134 constructs the kd tree from all feature point feature quantities of only the registered image to be recognized in step S348. In the present embodiment, 36d tree (k=36) of type-1 feature quantity and 18d tree (k=18—) of type-2 tree of type-2 feature quantity are constructed. Each of the leaves (or end nodes) of each tree holds one feature point feature quantity with a label indicative that one particular feature point feature quantity is extracted from which scale of which image of the multiple-resolution images having which registration ID.

On the other hand, in order to recognize all registered images registered in the registered image dictionary registration block 124, a tree is constructed every time a registered image is additionally learned, registering the constructed tree into the registered image dictionary registration block 124. In this case, the processing of kd tree construction in step S348 is omitted.

In step S349, the feature quantity comparison block 135 selects an unprocessed feature point in the target input image. In step S350, the feature quantity comparison block 135 puts the type-1 feature point feature quantity of the target input image and the feature point feature quantity of similar k registered images into a pair. Likewise, in step S351, the feature quantity comparison block 135 puts the type-2 feature point feature quantity of the target input image and the feature point feature quantity of similar k registered images into a pair.

Namely, each of the feature point feature quantities of the target input image extracted by the feature point extraction block 132 and the feature quantity extraction block 133 is paired by the feature quantity comparison block 135 with k (4 in the example shown in FIG. 38) registered image feature point feature quantities that are similar in feature quantity based on the k-NN search method (the value of k of the k-NN method and the value of k of kd tree may be different (or the same)). In the present embodiment, a Euclidian distance shown in equation (12) below (as the value of this distance increases, the similarity decreases) is used for dissimilarity for use in the k-NN search for type-1 feature quantity and the cosine correlation value shown in equation (13) below (as the value of this cosine correlation value increases, the similarity increases) is used for the similarity of type-2 feature quantity.

$$\text{distance}(u_v, v_v) = \sqrt{\sum_{n=1}^{N} (u_n - v_n)^2} \qquad (12)$$

$$\text{similarity}(u_v, v_v) = \frac{1}{2}\left[\frac{u_v \cdot v_v}{\|u_v\|\|v_v\|} + 1\right] \qquad (13)$$

In equation (12) above, $u_v$, $v_v$ are indicative of the feature quantity vectors to be computed for dissimilarity, $u_n$, $v_n$ are indicative of values in n dimensions of $u_v$, $v_v$, and N is indicative of the number of dimensions of $u_v$, $v_v$ vectors.

In equation (13) above, $u_v$, $v_v$ are indicative of the feature quantity vectors to be computed for similarity and $u_v \cdot v_v$ is indicative of the inner product of vector. In extracting k pairs similar to each other in feature quantity, a threshold decision may be inserted for determining dissimilarity (for type-1 feature quantity) and similarity (for type-2 feature quantity).

The cosine correlation value mentioned above is used for the similarity computation scale for type-2 feature quantity to prevent the feature quantity from being affected by the change in the strength of local concentration gradient vector due to the change in brightness. It is also practicable to normalize $u_v$, $v_v$ vectors by 1 to use, as dissimilarity, the Euclidian distances of the normalized vectors for type-2 feature quantity, rather than using the similarity based on cosine correlation value. Also, in this case, the feature quantity becomes unaffected by the change in the strength of the local concentration gradient vector due to the change in brightness.

The feature quantity comparison block 135 executes the processing operations of steps S349 through S351 for the feature points of each target input image. In step S352, the feature quantity comparison block 135 determines whether all feature points have been processed. If there are found any unprocessed feature points, the procedure returns to step S349 to repeat the above-mentioned processing therefrom. If all feature points are found processed in step S352, then the procedure goes to step S353.

Because the feature quantities of the two types, type 1 and type 2, are used, the feature quantity comparison block 135, after obtaining feature point pairs for the feature points of the entered target input image for each feature quantity type by the above-mentioned method, selects only the feature point pairs commonly extracted for both type 1 and type 2 as candidate corresponding feature point pairs in step S353, classifying the obtained candidate corresponding feature point pairs for each registered image. Then, these candidate corresponding feature point pairs are supplied to the estimation block 136. In order to execute the processing for each registered image, the estimation block 136 classifies the extracted candidate corresponding feature point pairs for each registered image before passing these pairs to the following stage, thereby making the processing more efficient.

Figure 38:
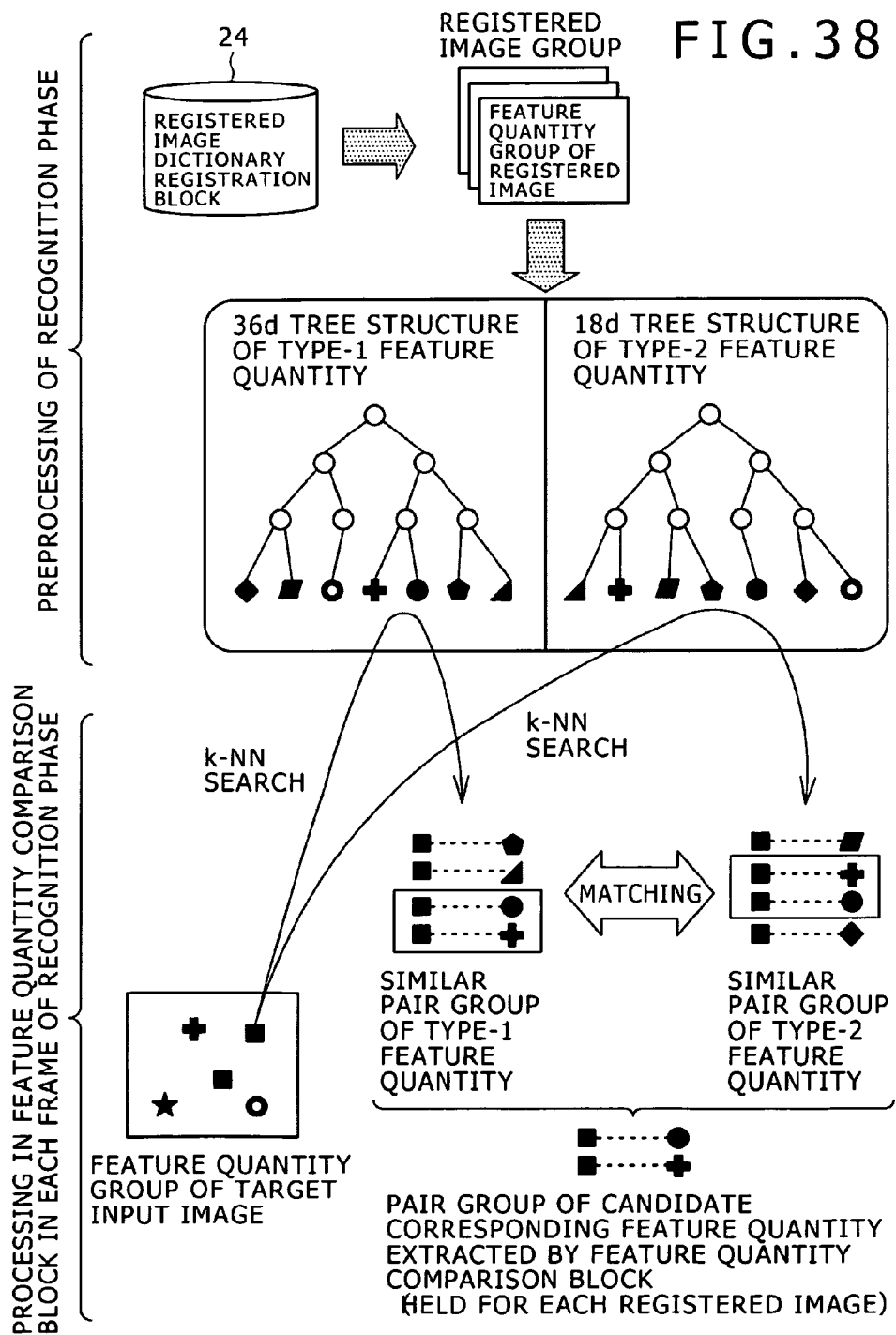
FIG. 38 is a diagram illustrating a comparison between feature quantities.

FIG. 38 shows the above-mentioned processing in schematic manner. The kd tree construction block 134 generates the 36d tree structure of type 1 and the 18d tree structure of type 2. From the feature quantities of a target input image, the 36*d* tree structure of type-1 feature quantities is searched by the k-NN search (in this example, k=4) for four similar pairs of type-1 feature quantities. In this example, the feature point feature quantities represented by squares in the target input image (in the figure, square, pentagon, triangle, circle, and cross are indicative of feature point feature quantities) are searched for as similar to the pentagon, triangle, circle, and cross of the type-1 feature quantity 36d tree structure. Further, the type-2 feature quantity 18d tree structure is searched by the k-NN search method for four similar pairs of type-2 feature quantities. In this example, the square in the target input image is retrieved as similar to the parallelogram, cross, circle, or rhombus in the type-2 feature quantity 18d tree structure.

From the four similar pairs of type-1 feature quantities and the four similar pairs of type-2 feature quantities, a common similar pair group is selected. In this example, there are four similar pairs of type-1 feature quantities, namely, square and pentagon, square and triangle, square and circle, and square and cross. On the other hand, there are four similar pairs of type-2 feature quantities, namely, square and parallelogram, square and cross, square and circle, and square and rhombus. Therefore, the similar pairs of square and circle and square and cross are the feature point pairs common to these two types, so that these pairs are selected as candidate corresponding feature point pairs (or sets).

It is also practicable to construct a kd tree for each feature quantity type and each registered image to search for the k-NN of each feature point feature quantity of the target input image for each registered image, rather than constructing one kd tree from all feature point feature quantities of all registered images to search for the k-NN of each feature point feature quantity of the target input image for each of the feature quantity types. In either case, the output is candidate corresponding feature point pair groups classified for each registered image and therefore the subsequent processing to be described later becomes common to both the cases.

The above-mentioned processing allows the extraction of pair groups (or the pairs of registered image feature points and target input image feature points) similar in the local concentration gradient information in the neighborhood of feature points; however, macroscopically, the pair groups thus obtained include not only "true feature point pair (inlier)" not contradictory with the location posture of the target object in which the spatial location relationship of corresponding feature points corresponds to the registered image, but also "false feature pair (outlier) that is contradictory with the location posture.

Figure 39:
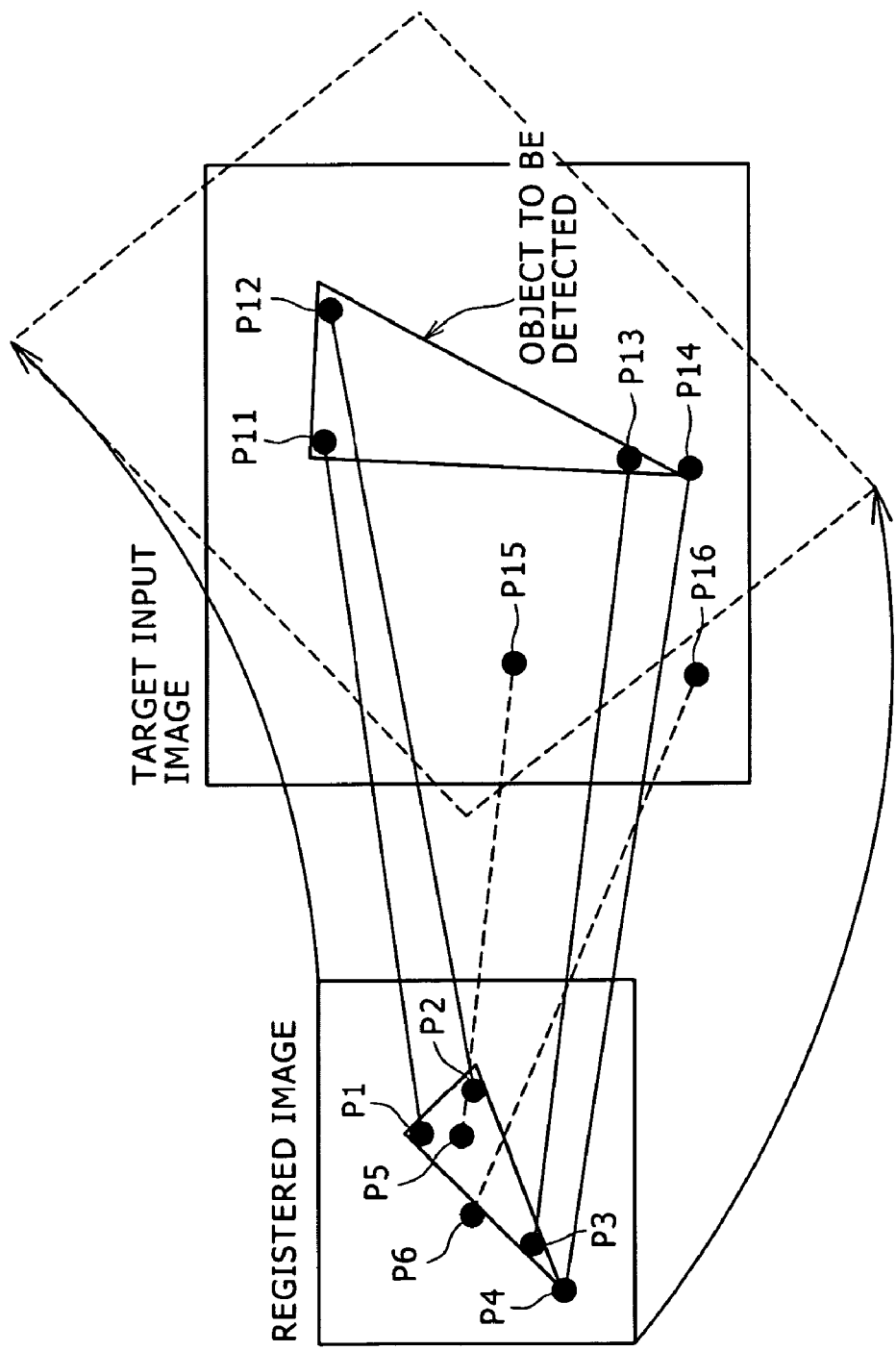
FIG. 39 is a diagram illustrating an inlier and an outlier.

FIG. 39 shows an inlier and an outlier in a schematic manner. As shown in the figure, when the triangle registered image shown in the left side of the figure corresponds to the triangle detected target object in the target input image shown in the right side of the figure, feature points P1 through P4 in the neighborhood of the vertex of the triangle of the registered image come to correspond to feature points P11 through P14 of the detected target object, respectively. Namely, feature point P1 corresponds to feature point P11, feature point P2 to feature point P12, feature point P3 to feature point P13 and feature point P4 to feature point P14. Therefore, these candidate corresponding feature point pairs configure inliers. It should be noted that, in FIG. 39, the inliers are indicated by solid lines.

On the other hand, feature point P of the registered image is located at approximately the center of the triangle and feature point P6 is located outside the neighborhood of the periphery of the triangle. In contrast, feature point P15 of the target input image paired with feature point P5 and feature point P16 of the target input image paired with feature point P6 are located far away from the detected target object. Namely, the candidate corresponding feature point pair of feature point P5 and feature point P15 and the candidate corresponding feature point pair of feature point P6 and feature point P16 are outliers. It should be noted that, in FIG. 39, the outliers are indicated by dashed lines.

For a method of deriving an object parameter for determining the location and posture in a target input image of a target object from candidate corresponding feature point pairs, a method is possible in which an estimated image transformation parameter is obtained by least-square estimation. The location and posture of target object can be obtained more accurately by repeating the processing of excluding the pairs in which there is a contradiction between the resultant estimated target object location and posture and the spatial location relationship and deriving an estimated image transformation parameter by least-square estimation by use of remaining pairs.

However, if the number of outliers in candidate corresponding feature point pairs is large or if there is any outlier that is extremely deviated from the true image transformation parameter, the result of estimation by least-square estimation is known to be not generally satisfactory (Hartley R., Zisserman A., "Multiple View Geometry in Computer Vision," Chapter 3, pp. 69-116, Cambridge University Press, 2000). Therefore, the estimation block 136 of the present embodiment extracts "a true feature point pair (inlier)" from the spatial location relationship of a candidate corresponding feature point pair under some constraint of image transformation and estimates an image transformation parameter for determining the location posture of a target object by use of the extracted inlier.

This estimation processing by the estimation block 136 is executed for each registered image subject to recognition to determine whether there is a target object for each registered image, thereby estimating the location posture if a corresponding target object is found. The candidate corresponding feature point pair in the following description denotes a pair group in which only the pairs associated with a registered image concerned among the candidate corresponding feature point pairs that is the output of the feature quantity comparison block 135.

The image transformations includes Euclidian transformation, similar transformation, affine transformation, and projective transformation. In the present embodiment, detail description will be made on the case in which location posture estimation is executed under the constraint of affine transformation. As described above, an affine transformation parameter cannot be computed unless there are three or more feature point sets, so that, selecting one unprocessed registered image in step S354, the estimation block 136 determines whether there are three or more candidate corresponding feature point pairs (sets) in step S354.

If the number of candidate corresponding feature point pairs is two or less, the estimation block 136 determines in step S356 that no target object exists in the target input image or the detection of target object location posture has failed, thereby outputting "recognition disabled". On the other hand, if three or more candidate corresponding feature point sets are found, it indicates that the detection of target object location posture is enabled, so that the estimation block 136 executes the estimation of an affine transformation parameter. Hence, the estimation block 136 executes coordinates transformation in step S357. Namely, the registered image feature point location posture of the candidate corresponding feature point sets is transformed into the location coordinates on the original registered image and, at the same time, the target input image feature point location coordinates are transformed into the location coordinates of the input original image. Then, in step S358, the estimation block 136 executes estimation processing.

Now, let pair group P composed of three sets of candidate corresponding feature points be $([x_1\ y_1]^T, [u_1\ v_1]^T), ([x_2\ y_2]^T, [u_2\ v_2]^T), ([x_3\ y_3]^T, [u_3\ v_3]^T)$, then the relationship of pair group P and affine transformation parameter is expressed in a linear system shown in relation (14) below.

$$\begin{bmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ x_3 & y_3 & 0 & 0 & 1 & 0 \\ 0 & 0 & x_3 & y_3 & 0 & 1 \end{bmatrix} \begin{bmatrix} a_1 \\ a_2 \\ a_3 \\ a_4 \\ b_1 \\ b_2 \end{bmatrix} = \begin{bmatrix} u_1 \\ v_1 \\ u_2 \\ v_2 \\ u_3 \\ v_3 \end{bmatrix} \quad (14)$$

With relation (14) above, when rewritten to $Ax_v = b_v$ (subscript V is indicative that the precedent is a vector (x of $x_v$ for example), the least-square solution of affine transformation parameter $x_v$ is given by equation (15) below.

$$x_v = A^- b_v \quad (15)$$

If pair group P is randomly selected with repetition from candidate corresponding feature point set groups so as to mix in one or more outliers, that affine transformation parameter is dispersedly projected in the parameter space. On the other hand, if pair group P composed of only inliers is randomly selected with repetition, the affine transformation parameter becomes very similar to the true affine transformation parameter of target object location posture, namely close in distance in the parameter space. Therefore, repeating the processing of randomly selecting pair group P from candidate corresponding feature point set group to project the affine transformation parameter into the parameter space causes the inliers to form a highly concentrated (or high in the number of members) cluster in the parameter space, causing the outliers to appear in a dispersed manner. Namely, clustering in the parameter space causes the elements of a cluster having the most members to provide inliers.

Figure 40:
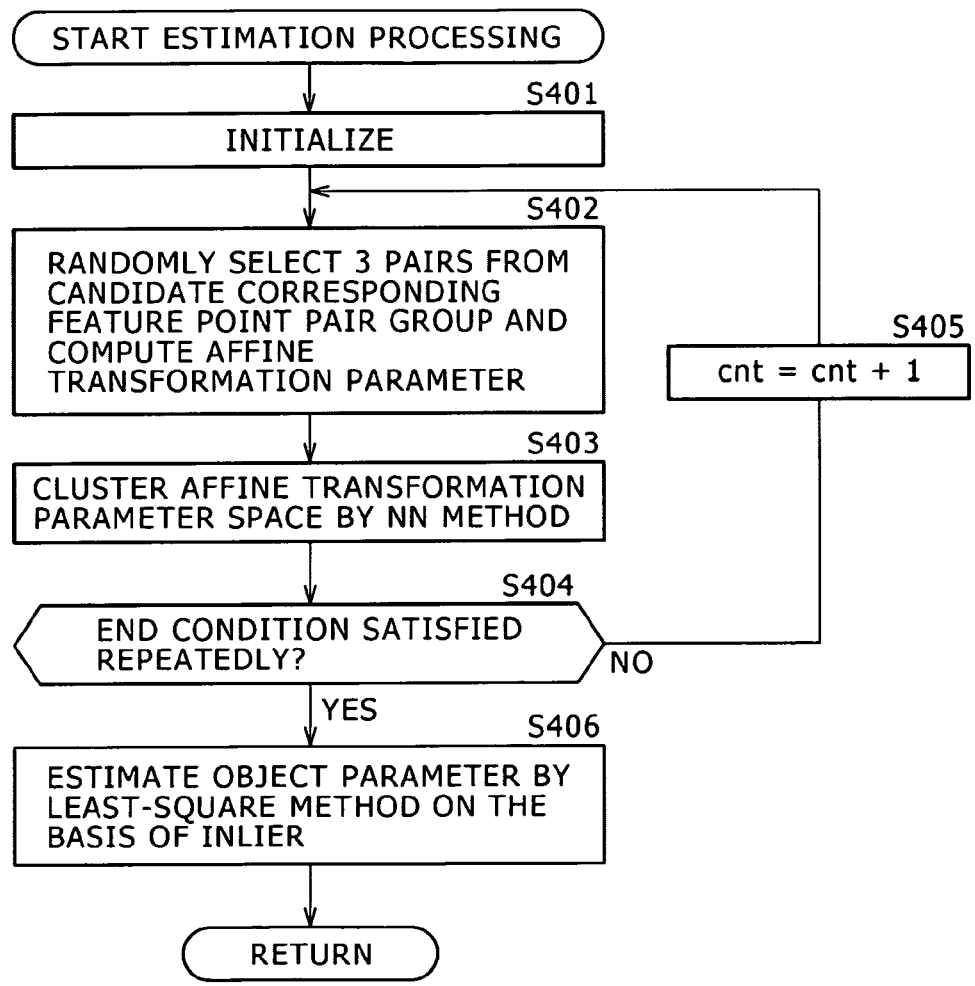
FIG. 40 is a flowchart indicative of details of estimation processing.

The following describes details of the estimation processing to be executed by the estimation block 136 with reference to the flowchart shown in FIG. 40. For clustering by the estimation block 136, the NN (Nearest Neighbor) method is used. Because the above-mentioned parameters $b_1$, $b_2$ take various values depending on the registered image, the selection of a clustering threshold in clustering depends on the registered image also in x-space. Therefore, the estimation block 136 executes clustering only in the parameter space that is defined parameters $a_1, \ldots, a_4$ (hereafter noted as $a_v$) on the assumption that pair group P giving affine transformation parameters in which there is similarity between the true parameter and parameters $a_1, \ldots, a_4$ but parameters $b_1$, $b_2$ are different is seldom found. It should be noted that, even if a situation occurs in which the above-mentioned assumption cannot be established, clustering can be executed in the parameter space composed of parameters $b_1$, $b_2$ separately from $a_v$-space to easily circumvent the problem by taking a result of the clustering into consideration.

First, in step S401, the estimation block 136 executes initialization processing. To be more specific, count value cnt that is a variable indicative of the number of repetitions is set to 1 and three pairs are randomly selected as pair group $P_1$ from a candidate corresponding feature point set group, thereby obtaining affine transformation parameter $a_{v1}$. In addition, the estimation block 136 sets variable N indicative of the number of clusters to 1, creating cluster $Z_1$ around $a_{v1}$ in affine transformation parameter space $a_v$. The estimation block 136 sets centroid $c_{v1}$ of this cluster $Z_1$ to $a_{v1}$ and variable $nz_1$ indicative of the number of cluster members to 1, thereby updating count value cnt to 2.

Next, in step S402, the estimation block 136 randomly selects three pairs as pair group $P_{cnt}$ from the candidate corresponding feature point set group, thereby computing affine transformation parameter $a_{Vcnt}$. Then, the estimation block 136 projects the obtained affine transformation parameter $a_{Vcnt}$ into the parameter space.

In step S403, the estimation block 136 clusters the affine transformation parameter space by the NN method. To be more specific, the estimation block 136 obtains minimum distance $d_{min}$ of distances d ($a_{Vcnt}$, $c_{Vi}$) to centroid $c_{Vi}$ (i= 1, ..., N) between affine transformation parameter $a_{Vcnt}$ and each cluster $Z_i$ in accordance with equation (16) below.

$$d_{min} = \min_{1 \leq i \leq N} \{d(a_{Vcnt}, c_{Vi})\} \quad (16)$$

Then, the estimation block 136 makes $a_{Vcnt}$ belong to cluster $Z_i$ that gives $d_{min}$ if $d_{min} < \tau$ for predetermined threshold $\tau$ ($\tau=0.1$ for example), thereby updating centroid $c_i$ of cluster $Z_i$ in all members including $a_{Vcnt}$. The number of members $nZ_i$ of cluster $Z_i$ is equal to $nz_1+1$. On the other hand, if $d_{min} \geq \tau$, the estimation block 136 creates a new cluster $Z_{N+1}$ in which $a_{Vcnt}$ is centroid $c_{VN+1}$ in affine transformation parameter space $a_v$, setting the number of members $nz_{N+1}$ of that cluster to 1 and the number of clusters N to N+1.

Next, in step S404, the estimation block 136 determines whether the repetition end condition is satisfied or not. The repetition end condition may be that the highest number of members exceeds a predetermined threshold (15 for example) and a difference between the highest number of members and the next highest number of members exceeds a predetermined threshold (3 for example) or count value cnt of the repetition counter exceeds a predetermined threshold (5,000 for example), for example. If the repetition end condition is found not satisfied in step S404 (the decision is No), then the estimation block 136 sets count value cnt of the number of repetitions to cnt+1 in step S405, upon which the procedure returns to step S402 to repeat the above-mentioned processing therefrom.

On the other hand, if the repetition end condition is found satisfied in step S404 (the decision is Yes), then, in step S406, the estimation block 136, if the number of inliers obtained by the above-mentioned processing is less the three pairs, outputs a result of the recognition as "target object not detected" because the affine transformation parameter is not determined; if the number of extracted inliers is three pairs or more, the estimation block 136 estimates the affine transformation parameter for determining target object location posture by the least-square method on the basis of the inliers, thereby outputting the estimated affine transformation parameter as a result of the recognition.

If the inliers are $([x_{IN1} \ y_{IN1}]^T, [u_{IN1} \ v_{IN1}]^T)$, $([x_{IN2} \ y_{IN2}]^T, [u_{IN2} \ v_{IN2}]^T)$ and so on, then the relationship between the outliers and the affine transformation parameter is expressed in a linear system shown in relation (17) below.

$$\begin{bmatrix} x_{IN1} & y_{IN1} & 0 & 0 & 1 & 0 \\ 0 & 0 & x_{IN1} & y_{IN1} & 0 & 1 \\ x_{IN2} & y_{IN2} & 0 & 0 & 1 & 0 \\ 0 & 0 & x_{IN2} & y_{IN2} & 0 & 1 \\ & & \cdots & & & \\ & & \cdots & & & \end{bmatrix} \begin{bmatrix} a_1 \\ a_2 \\ a_3 \\ a_4 \\ b_1 \\ b_2 \end{bmatrix} = \begin{bmatrix} u_{IN1} \\ v_{IN1} \\ u_{IN2} \\ v_{IN2} \\ \cdots \\ \cdots \end{bmatrix} \quad (17)$$

When relation (17) above is rewritten to $A_{IN}x_{VIN}=b_{VIN}$, the least-square solution of affine transformation parameter $x_{VIN}$ is given by equation (18) below.

$$x_{VIN} = (A_{IN}^T A_{IN})^{-1} A_{IN}^T b_{VIN} \quad (18)$$

In step S406, the estimation block 136 estimates this affine transformation parameter $x_{VIN}$ as an object parameter. The estimation block 136 relates this object parameter with the registration ID corresponding to the registered image selected in step S354 and holds this related information.

Referring to FIG. 36 again, after the processing of step S358 or S356, the estimation block 136 determines in step S359 whether all registered images have been processed. If any unprocessed registered image is found, then the procedure returns to step S354 to repeat the above-mentioned processing therefrom. If all registered images are found processed in step S359, then, in step S360, the estimation block 136 outputs the registration ID and the object parameter held in step S406 to the specified-area tracking block 41 along with the frame number of the target input image.

In step S361, the multiple-resolution generation block 131 determines whether the end of television communication has been commanded by the user. If the end television communication is found not command, the procedure returns to step S331 to repeat the above-mentioned therefrom. If the end of television communication is found command, then the processing comes to an end.

Figure 41:
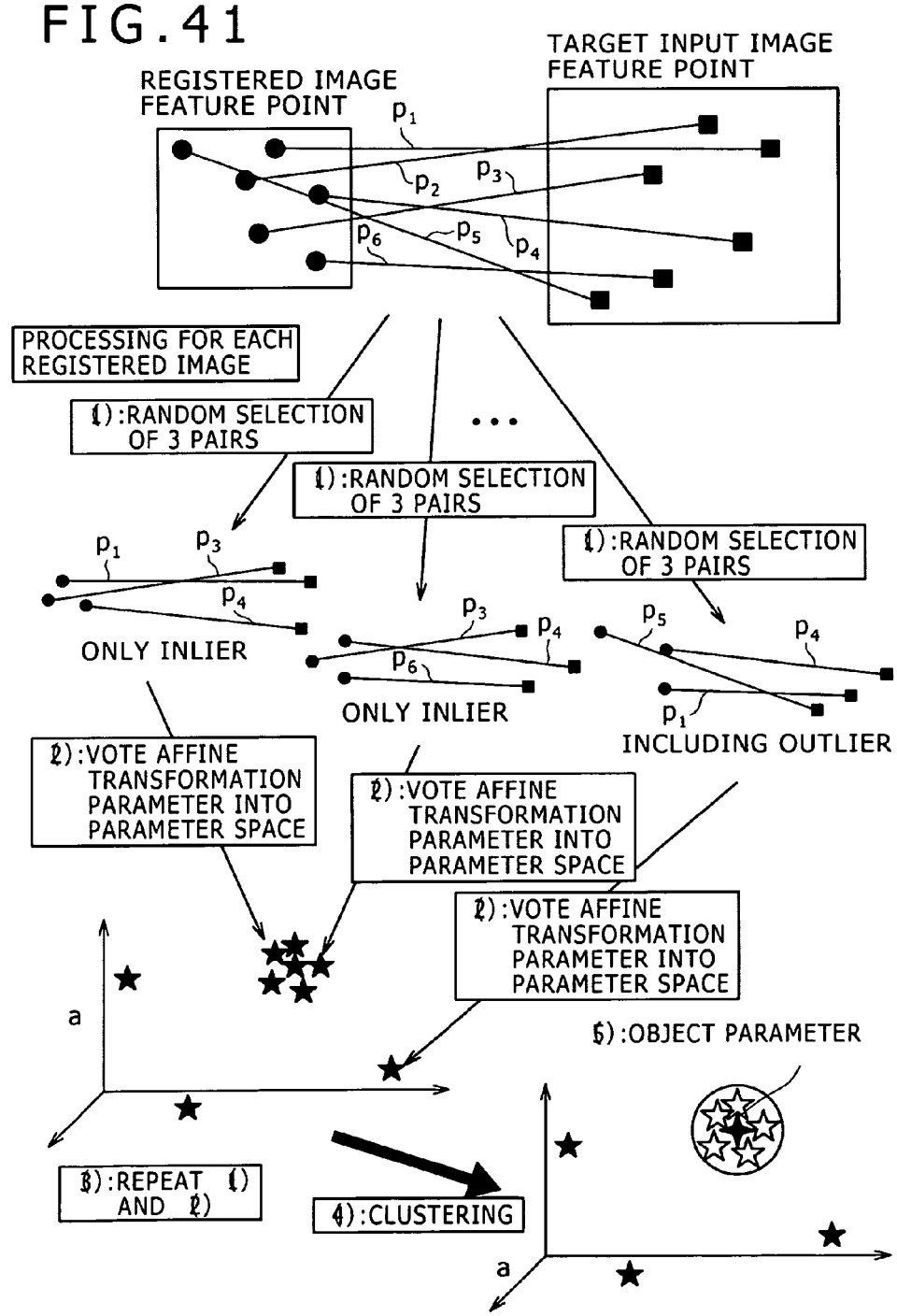
FIG. 41 is a diagram illustrating estimation processing.

The processing operations of steps S354 through S359 shown in FIG. 36 are executed for each registered image to be recognized. This processing is shown in FIG. 41 in a schematic manner. In this example, three candidate corresponding feature point set group p1, p3, and p4 are first randomly selected from candidate corresponding feature point set group p1 through p6 and an affine transformation parameter obtained on the basis of the selected groups is projected into the parameter space. Next, three candidate corresponding feature point set groups p3, p4, and p6 are randomly selected and an affine transformation parameter obtained on the basis of these groups is projected into the parameter space. The like processing is repeated to select three candidate corresponding feature point set groups p5, p4, and p1 in this example and an affine transformation parameter is obtained on the basis of these groups to be projected into the parameter space. Then, in the parameter space, the adjacent affine transformation parameters are clustered and the least-square method is applied to the clustered affine transformation parameters to determine an object parameter.

The above-described technique allows the exclusion of outliers if many thereof are included in the candidate corresponding feature point set group, thereby execution location posture estimation (or object parameter derivation) with accuracy.

In the above-described embodiment, the location posture estimation under the constraint of affine transformation has been detailed. Under the constraint of affine transformation, a three-dimensional object such as a box or a book for example that is dominant in planar area can execute the location posture estimation that is robust to the viewpoint change for that dominant plane. However, executing the location posture estimation that is robust to a three-dimensional object that is dominant in curved surface and concavity and convexity needs the expansion of the affine transformation constraint to projective transformation constraint. It should be noted that, in this case too, only the number of dimensions of the transformation parameter to be estimated increases, and therefore the above-mentioned technique can be expanded with ease.

The location posture thus obtained of the target object is shown in FIGS. 37 and 39 in dashed lines. As shown in these figures, in the present embodiment, not only the presence or absence of the target object corresponding to the registered image is detected, but also, if the target object exists, the location posture thereof is estimated and outputted.

It should be noted that, because the location posture of the target object estimated by the estimation block 136 denotes the location posture relative to the target object of the target input image, if the location posture of the target object is considered as a reference location posture, the estimation block 136 estimates the location posture of the target object for the registered image.

In the above description, threshold τ is a constant value. It is also practicable, in repeating the processing of steps S402 through S405, to use a technique so-called annealing method in which a coarse inlier extraction is used first using a relatively large threshold I and, as the number of repetitions increases, using smaller thresholds τ. This approach allows the extraction of inliers with accuracy.

In the above description, an object parameter is estimated on the basis of the least-square method by repeating the processing of randomly selecting pair (or set) group P from candidate corresponding feature point set groups, projecting the obtained affine transformation parameter into the parameter space, and using the elements of the cluster having the highest number of members as inliers. However, it is also practicable to use the centroid of the cluster having the highest number of members as an object parameter. In addition, each pair may be configured by three or more feature points.

As described above, the feature point pairs extracted by the feature quantity comparison block 135 for each registered image are classified for each registered image and the location posture estimation is executed for each registered image by the estimation block 136, so that, with even images in which two or more registered images are included in each target input image, each target object registered image can be recognized.

In the above-described embodiment, three feature points are selected in each of the first specified area tracking processing and the second specified area tracking processing. However, it is also practicable to select more than three feature points.

In the above-described embodiment, an affine matrix is computed from an optical flow in each of the first specified area tracking processing and the second specified area tracking processing. It is also practicable to compute a projective transformation matrix. In this case, four or more feature points are selected and a projective transformation matrix is computed from the optical flow of these feature points.

In the image processing apparatus 11 shown in FIG. 2, the first specified area tracking processing and the second specified area tracking processing area separately executed by the specified-area tracking block 41 and the specified-area tracking block 42 as separate threads. However, it is also practicable to execute both the first and second specified area tracking processing operations by the two specified area tracking blocks alternately.

Figure 42:
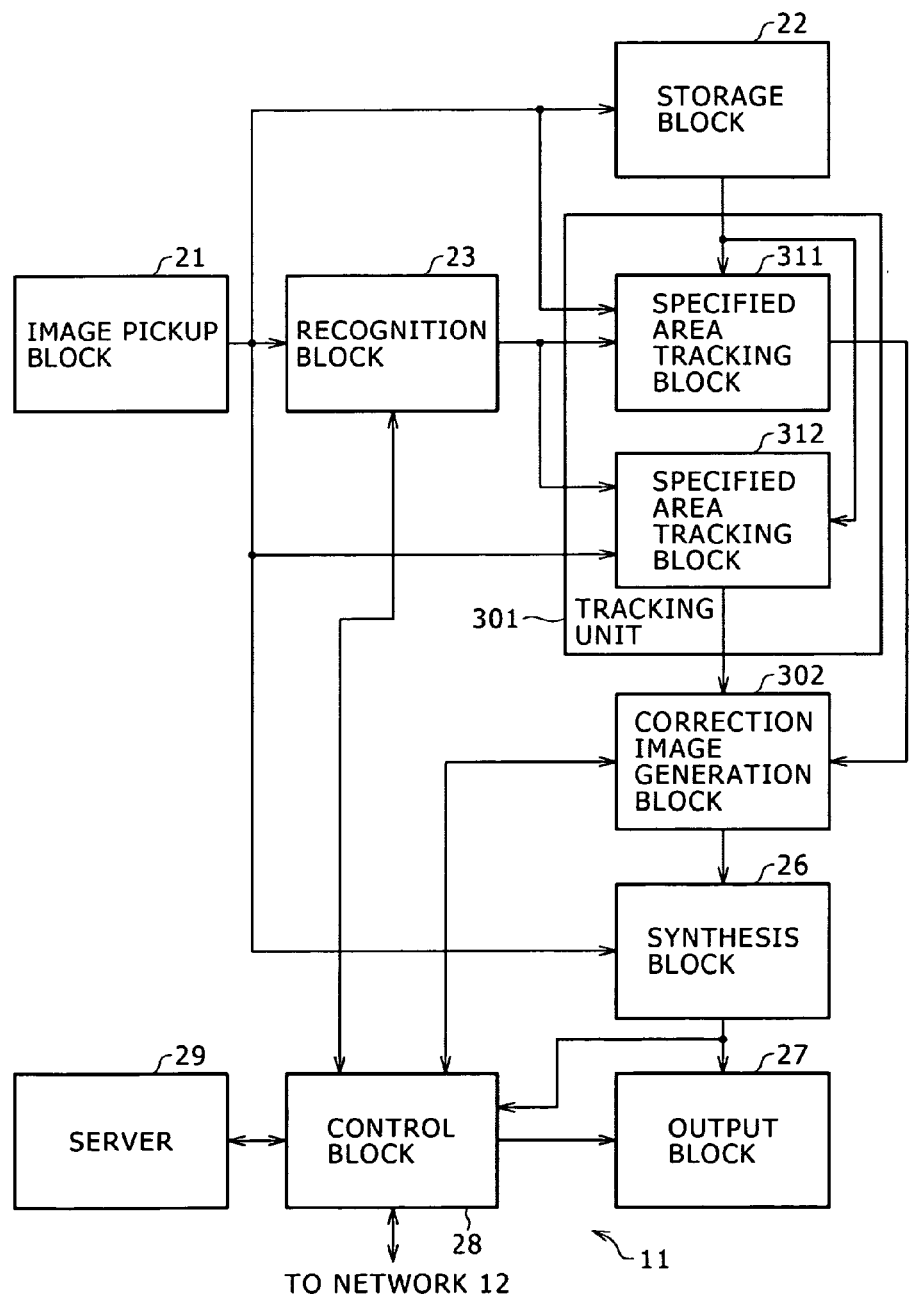
FIG. 42 is a block diagram illustrating an exemplary configuration of an image processing apparatus practiced as another embodiment of the invention.

Referring to FIG. 42, there is shown a block diagram illustrating an exemplary configuration of the image processing apparatus 11 in which both the first and second specified area tracking processing operations are executed by the two specified area tracking blocks alternately.

The image processing apparatus 11 shown in FIG. 42 has an image pickup block 21, a storage block 22, a recognition block 23, a synthesis block 26, an output block 27, a control block 28, a server 29, a tracking unit 301, and a correction image generation block 302. It should be noted that, with reference to FIG. 42, components similar to those previous described with reference to FIG. 2 are denoted by the same reference numerals and therefore the description thereof will be omitted for the brevity of description.

The tracking unit 301 has a specified area tracking block 311 and a specified area tracking block 312. The specified area tracking block 311 and the specified area tracking block 312 are each configured by a combination of the specified-area tracking block 41 shown in FIG. 17 and the specified-area tracking block 42 shown in FIG. 28, thereby executing both the first specified area tracking processing shown in FIG. 18 and the second specified area tracking processing shown in FIG. 29. The specified area tracking block 311 and the specified area tracking block 312 supply the identification ID received from the recognition block 23 and the object parameter obtained as a result of the second specified area tracking processing to the correction image generation block 302.

The correction image generation block 302 supplies the registration ID received from the specified area tracking block 311 or the specified area tracking block 312 to the control block 28, thereby requesting the control block 28 for the registered image corresponding to this registration ID. On the basis of the registered image supplied from the control block 28 in response to the request and an object parameter received from the specified area tracking block 311 or the specified area tracking block 312, the correction image generation block 302 generates a registered image having the same size and posture as those of the target object as a correction image. The correction image generation block 302 supplies the object parameter received from the specified area tracking block 311 or the specified area tracking block 312 and the generated correction image to the synthesis block 26.

As described above, because the tracking unit 301 of the image processing apparatus 11 shown in FIG. 42 has the specified area tracking block 311 and the specified area tracking block 312 having the same configuration, the development, modification, and maintenance of the tracking unit 301 can be done with ease.

The storage processing to be executed in the storage block 22 is as described with reference to FIG. 15.

Figure 43:
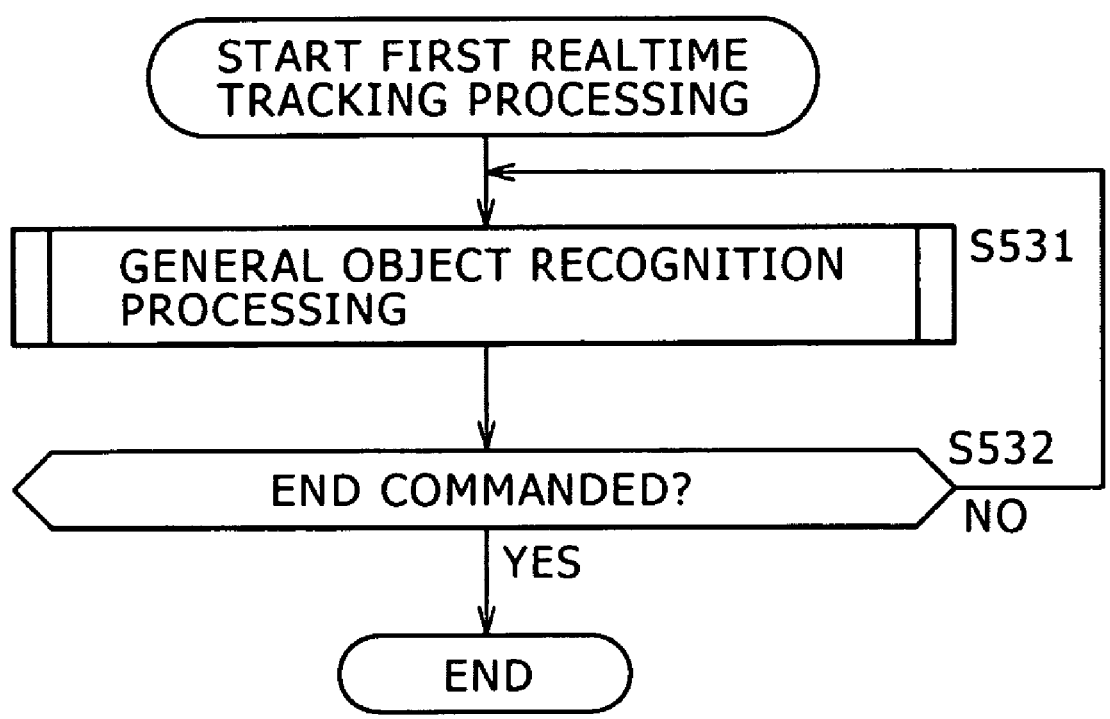
FIG. 43 is a flowchart indicative of first realtime tracking processing to be executed by the image processing apparatus shown in FIG. 42.

The following describes the first realtime tracking processing to be executed by the image processing apparatus 11 shown in FIG. 42 with reference to the flowchart shown in FIG. 43.

In step S531, the recognition block 23 executes the general object recognition processing shown in FIGS. 34 through 36 by use of the input image entered from the image pickup block 21 in step S101 of FIG. 15 as a target input image.

In step S532, the recognition block 23 determines whether the end of television communication has been commanded by the user and repeats the processing of step S531 until the end of television communication is commanded. If the end of television communication is found command in step S532, then the procedure comes to an end.

Figure 44:
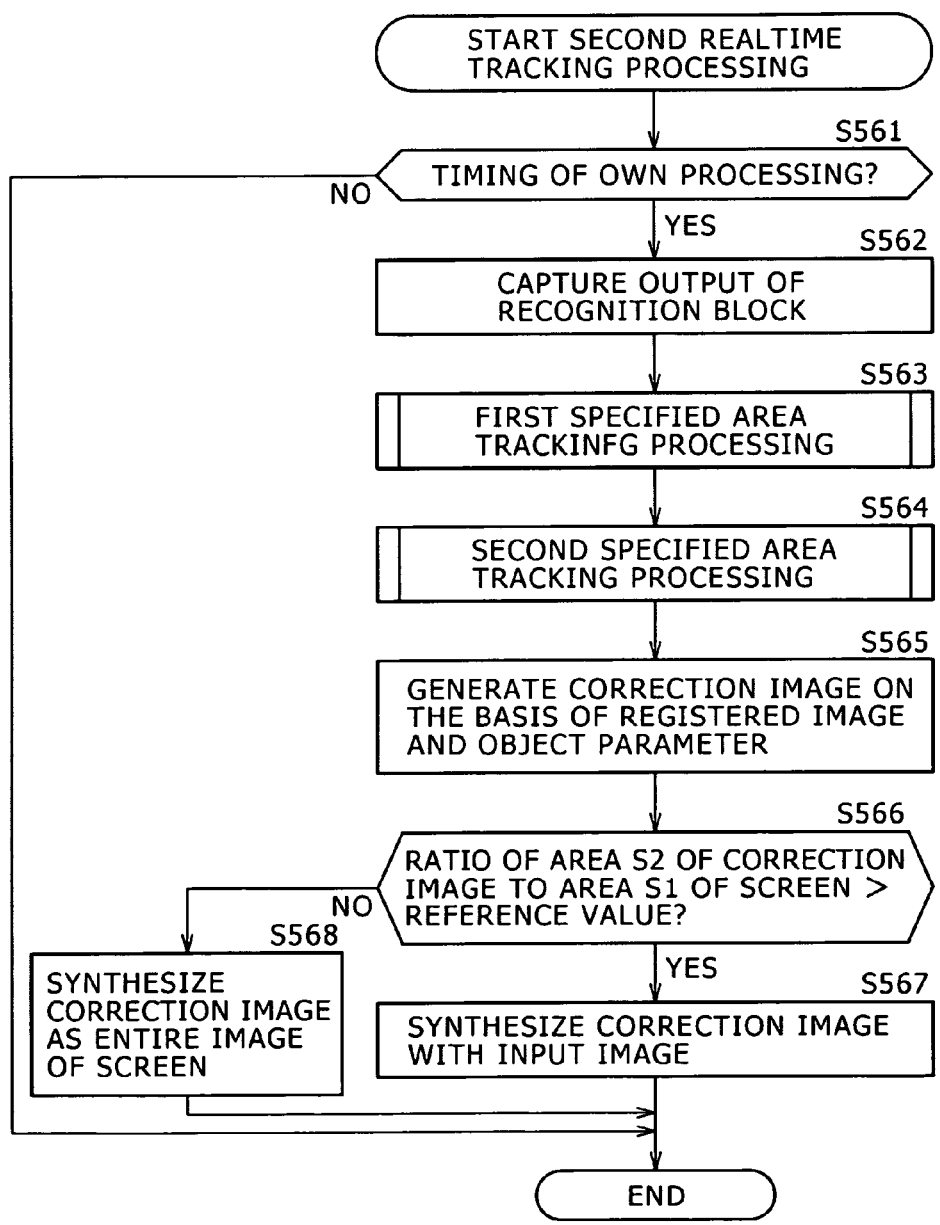
FIG. 44 is a flowchart indicative of second realtime processing to be executed by the image processing apparatus shown in FIG. 42.

The following describes the second realtime tracking processing to be executed by the image processing apparatus 11 shown in FIG. 42 with reference to the flowchart shown in FIG. 44. This second realtime tracking processing is executed by each of the specified area tracking block 311 and the specified area tracking block 312 when the registration ID, the frame number, and the object parameter are outputted from the recognition block 23 as a result of the general object recognition processing executed in step S531, for example.

In step S561, the specified area tracking block 311 and the specified area tracking block 312 each determine whether the processing timing thereof has been reached. For example, the specified area tracking block 311 and the specified area tracking block 312 determine that, if the previous output from the recognition block 23 has been captured, the timing has not been reached this time. Consequently, the specified area tracking block 311 and the specified area tracking block 312 determine that the timings thereof have come alternately every time the registration ID, the frame number, and the object parameter are outputted from the recognition block 23.

If the timing is found not to be the timing for own processing in step S561, then the specified area tracking block 311 or the specified area tracking block 312 ends the processing. On the other hand, if the timing is found to be the timing for own processing (the output of the recognition block 23 was not captured last) in step S561, then the specified area tracking block 311 or the specified area tracking block 312 captures the output of the recognition block 23 in step S562.

In step S563, the specified area tracking block 311 or the specified area tracking block 312 executes the first specified area tracking processing shown in FIG. 18. In step S564, the specified area tracking block 311 or the specified area tracking block 312 executes the second specified area tracking processing shown in FIG. 29. The processing operations of steps S565 through S568 are the same as those of steps S182 through S185 shown in FIG. 22 and therefore the description thereof will be omitted.

The following describes the timing of the processing to be executed by the image processing apparatus 11 shown in FIG. 42 with reference to FIGS. 45A, 45B, 45C and 45D.

It should be noted that the horizontal direction in FIGS. 45A, 45B, 45C and 45D is indicative of time as with FIGS. 30A, 30B, 30C and 30D. With reference to FIGS. 45A, 45B, 45C and 45D, each square is indicative of a frame to be executed at the time corresponding to horizontal location and a number shown in or over each square is indicative of the frame number of that frame as with FIGS. 30A, 30B, 30C and 30D.

Figure 45:
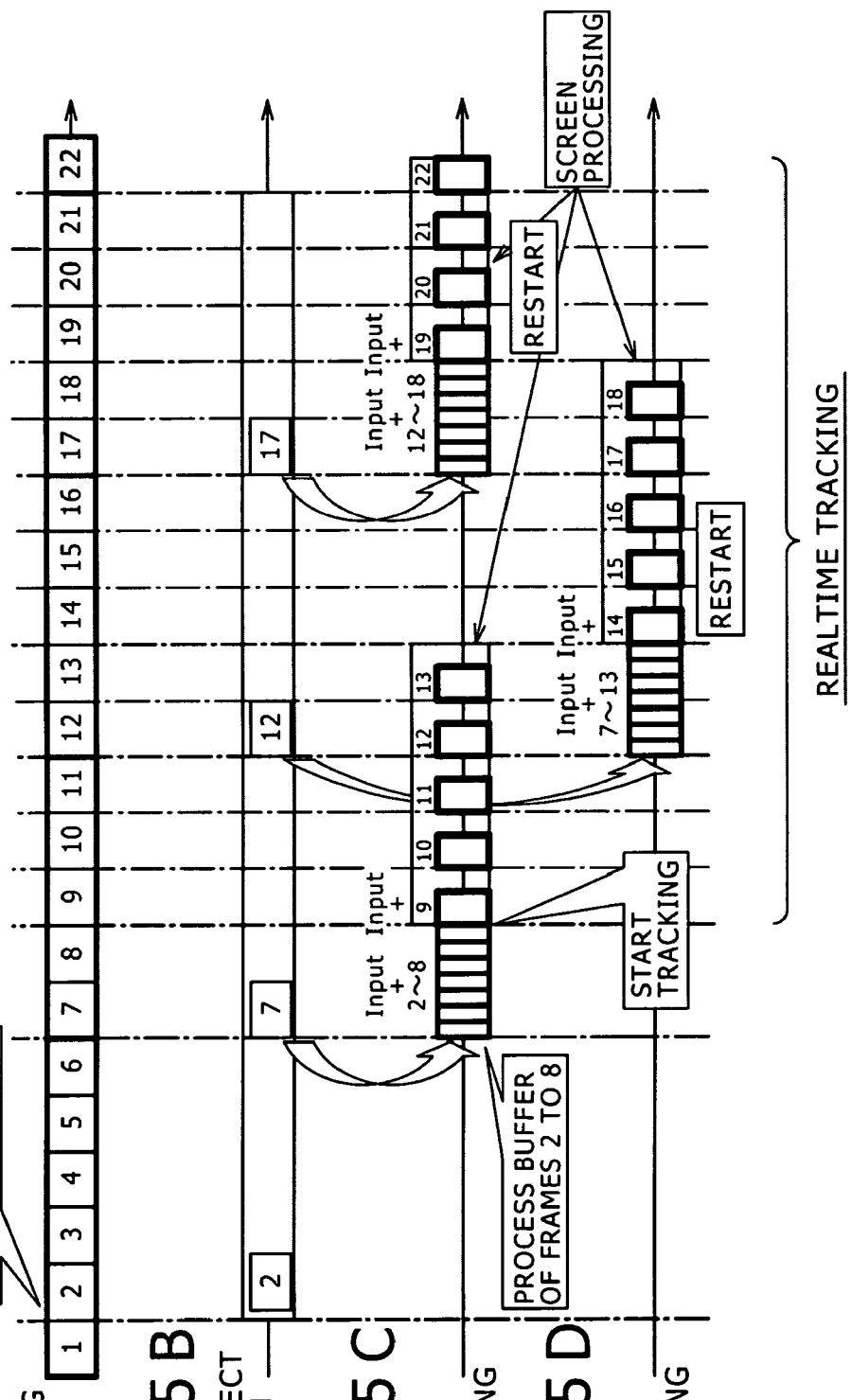
FIGS. 45A, 45B, 45C, and 45D are diagrams illustrating timings of processing to be executed by the image processing apparatus shown in FIG. 42.

The storage processing shown in FIG. 45A and the general object recognition processing shown in FIG. 45B are the same as the storage processing shown in FIG. 30A and the general object recognition processing shown in FIG. 30B, respectively, so that the description thereof will be omitted.

As shown in FIG. 45C, the processing by the specified area tracking block 311 starts when the number of outputs, such as object parameters obtained by the general object recognition processing executed by the recognition block 23, is odd. In the first specified area tracking processing by the specified area tracking block 311, as with the first specified area tracking processing shown in FIG. 30C, the input image used for obtaining the object parameter entered at starting of the processing provides a target input image, namely, each of the input images having frame numbers supplied from the recognition block 23 provides a target input image until the input image stored last is used as a target input image.

Next, when an object parameter has been computed by the first specified area tracking processing, the second specified area tracking processing is executed by use of the input image taken at the starting of the processing as a target input image as with the second specified area tracking processing shown in FIG. 30D. Then, this second specified area tracking processing is executed by use of the input image as a target input image every time an input image is entered from the image pickup block 21 until the first specified area tracking processing by the specified area tracking block 312 ends.

Namely, the second specified area tracking processing is executed by use of, as target input images, the images taken between the end of the first specified area tracking processing by the specified area tracking block 311 and the end of the first specified area tracking processing by the specified area tracking block 312.

The number of frames of input images taken between the end of the first specified area tracking processing by the specified area tracking block 311 and the end of the first specified area tracking processing by the specified area tracking block 312 is equal to the number of frames of input images taken between the start of the first specified area tracking processing by the specified area tracking block 311 and the first specified area tracking processing by the specified area tracking block 312, namely, during a period of time necessary for general object recognition processing. In the example shown in FIGS. 45A, 45B, 45C and 45D, as with the example shown in FIGS. 30A, 30B, 30C and 30D, the time necessary for general object recognition processing is equal to a time necessary for storing five frames of input images, so that the number of frames of input images that are used as target input images in the second specified area tracking processing is five.

As shown in FIG. 45D, the processing by the specified area tracking block 312 starts when the number of outputs, such as the object parameters obtained by the general object recognition processing executed by the recognition block 23, is even. The first specified area tracking processing and the second specified area tracking processing by the specified area tracking block 312 are different only in timing from the processing by the specified area tracking block 311 shown in FIG. 45C and therefore the first specified area tracking processing and the second specified area tracking processing by the specified area tracking block 312 are executed in substantially the same manner as the processing by the specified area tracking block 311.

As described above, in the image processing apparatus 11 shown in FIG. 42, the second specified area tracking processing by the specified area tracking block 311 executes tracking of each input image taken from the start of that processing to the start of the second specified area tracking processing by the specified area tracking block 312 and the second specified area tracking processing by the specified area tracking block 312 executes tracking of each input image taken from the start of that processing to the start of the second specified area tracking processing by the specified area tracking block 311. Therefore, the image processing apparatus 11 shown in FIG. 42 can execute realtime tracking of each input image taken by the image pickup block 21.

In the above description, the image processing apparatus 11 executes the first and second specified area tracking processing capable of fast processing with less load and the processing combined with general object recognition processing that is greater in load, making fast processing difficult. However, it is also practicable that the recognition processing combined with the first and second specified area tracking processing be any recognition processing other than general object recognition processing. For example, the image processing apparatus 11 may execute the processing in which the first and second specified area tracking processing is combined with cyber code recognition processing or color recognition processing that are lower in accuracy than the former. In this case, on the basis of the location and posture loosely recognized by the cyber code recognition processing or the color recognition processing, the image processing apparatus 11 can execute the first and second specified area tracking processing, thereby recognizing the location and posture of each target object in more detail.

In the above description, the present invention is applied to an image processing apparatus that executes television communication. Obviously, however, the present invention is also applicable to any image processing apparatuses that execute tracking.

Figure 46:
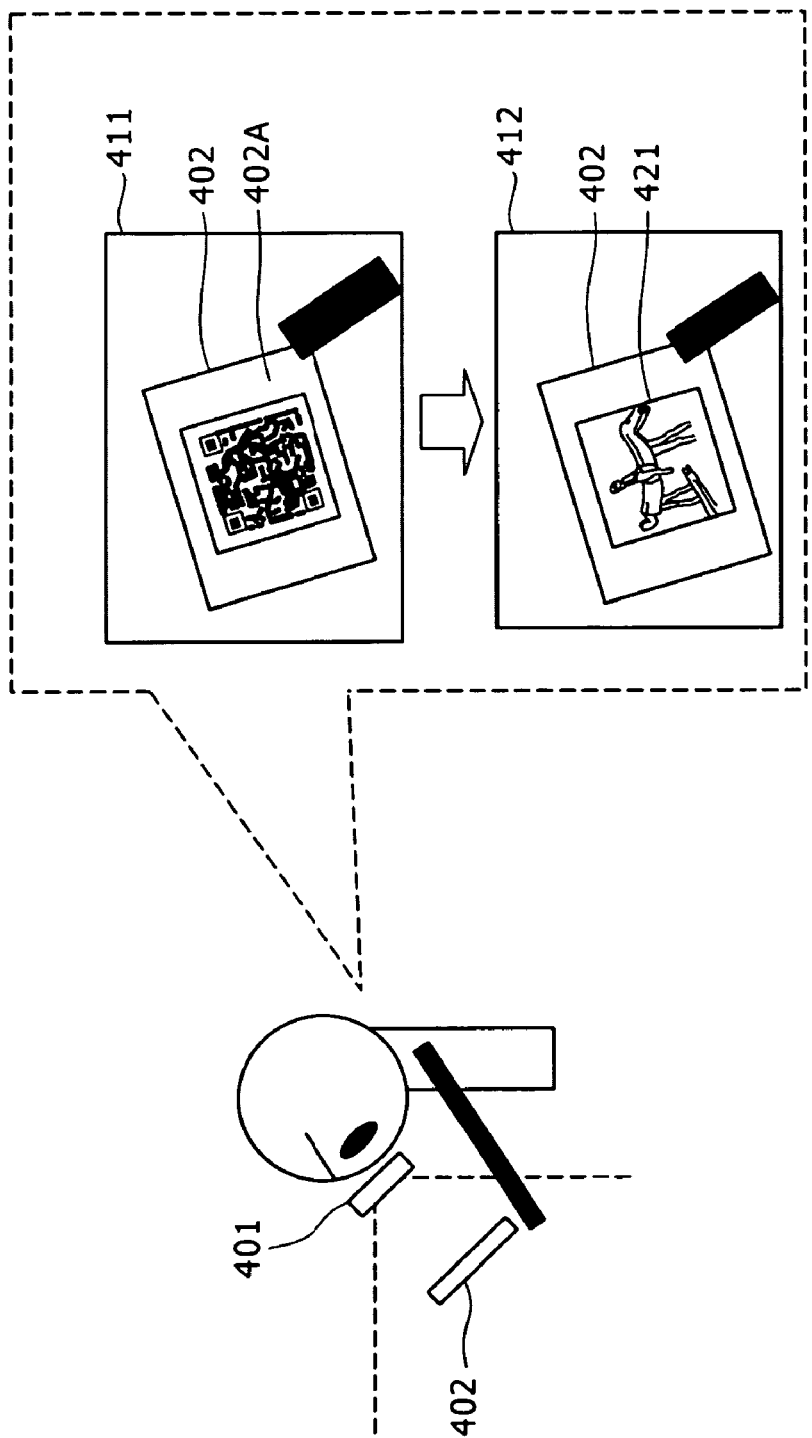
FIG. 46 is a schematic diagram illustrating an overview of an eyeglass-type wearable computer practiced as one embodiment of the invention.
Figure 47:
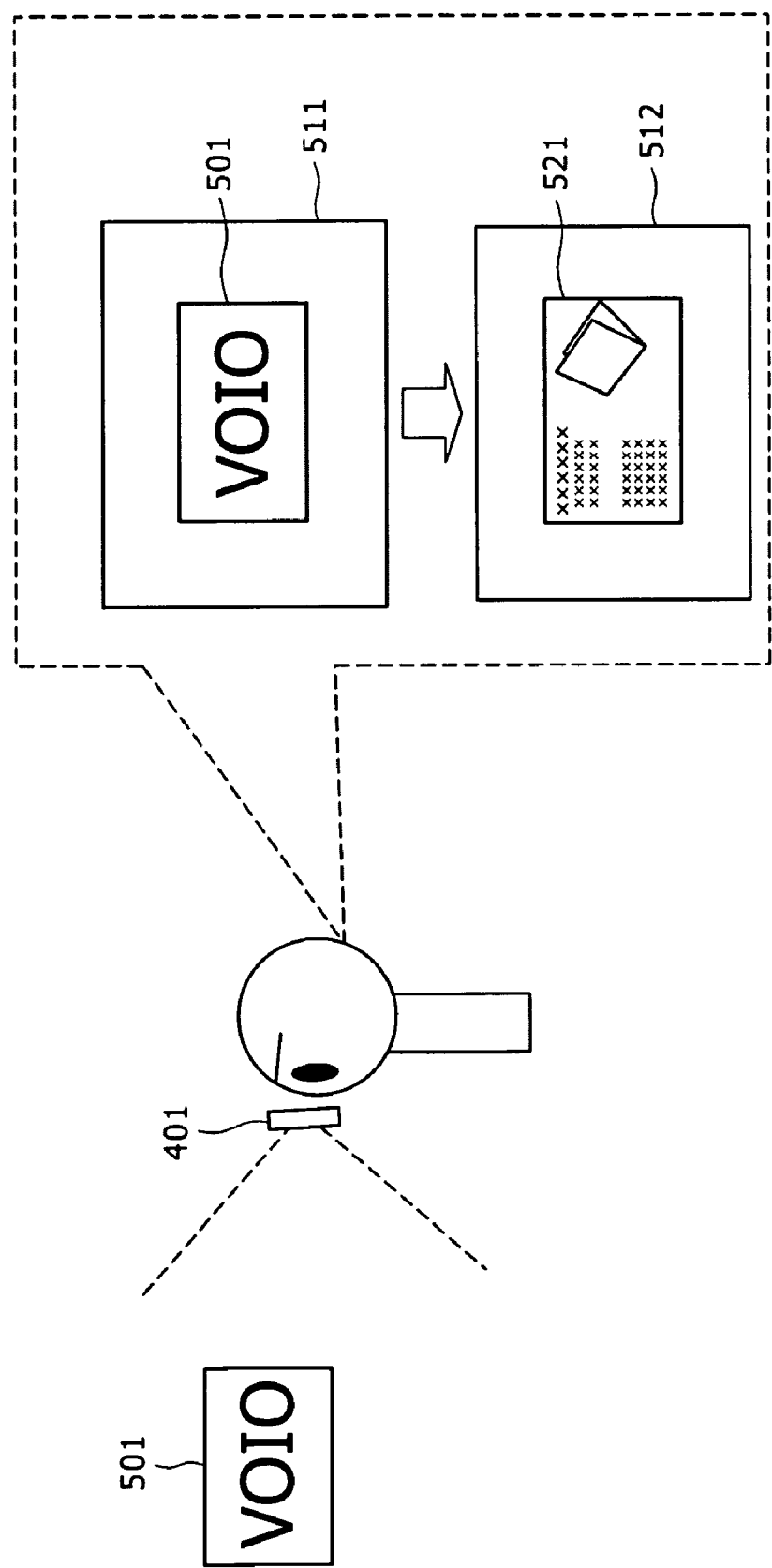
FIG. 47 is a schematic diagram illustrating an overview of an eyeglass-type wearable computer practiced as another embodiment of the invention.

FIGS. 46 and 47 show outlines of an eyeglass-type wearable computer to which the present invention is applied.

As shown in FIG. 46, when a user wears an eyeglass-type wearable computer 401 and looks at a sheet of paper 402 printed with a cyber code 402A, the eyeglass-type wearable computer 401 takes an image of the sheet of paper 402 through an imaging block, not shown, thereby executing cyber code recognition processing and first and second specified area tracking processing by use of an input image 411 obtained as a result of the image taking. Consequently, an object parameter of the cyber code 402A in the input image 411 is computed. Then, on the basis of the obtained object parameter and an associated image 421 associated with a cyber code 402A stored in advance, the eyeglass-type wearable computer 401 displays, on an output block, not shown, a synthesized image 412 with the associated image 421 embedded in an area of the cyber code 402A in the input image 411.

Consequently, moving the sheet of paper 402, the user is able to move the location of the associated image 421 in the synthesized image 412 or enlarge or shrink the size of the associated image 421.

As shown in FIG. 47, when the user wears the eyeglass-type computer 401 and looks at a poster 501 located on the street for example, the eyeglass-type wearable computer 401 takes an image of the poster 501 through an imaging block, not shown, and executes general object recognition processing and first and second specified-area tracking processing by use of an input image 511 obtained as a result of the image taking. Consequently, an object parameter of the poster 501 in the input image 511 is computed. Then, on the basis of the obtained object parameter and a moving image 521 for advertisement as an associated image associated with a poster 501 stored in advance, the eyeglass-type wearable computer 401 displays, on an output block, not shown, a synthesized image 512 with the moving image 521 embedded in an area of the poster 501 in the input image 511.

Consequently, an advertiser can provide the user with the moving image 521 that can include more pieces of information than the poster 501 only by placing the poster 501 on the street for example.

It should be noted that, in the example shown in FIG. 46, the associated image 421 is embedded in the area of the cyber code 402A in the input image 411; however, the size and posture of the associated image 421 may not be the same as those of the cyber code 402A. For example, as with the example shown in FIG. 24, the associated image 421 having the posture of facing the optical axis of the imaging taking block of the eyeglass-type wearable computer 401 may be displayed with the same size as that of the cyber code 402A in the input image 411. This holds true with the example shown in FIG. 47.

The above-mentioned sequence of processing operations may be executed by software as well as hardware.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

What is claimed is:

1. An image processing apparatus for recognizing, from a taken image, an object corresponding to a registered image registered in advance, comprising:
    an image taker configured to take an image of a subject to obtain said taken image of said subject;
    a recognizer configured to recognize, from said taken image, an object corresponding to said registered image;
    a first specified area tracker configured to execute first specified area tracking processing for tracking, in said taken image, a first tracking area specified on the basis of a result of recognition by said recognizer;
    a second specified area tracker configured to execute second specified area tracking processing for tracking a second specified area specified on the basis of a result of said first specified area tracking processing;
    a generator configured to generate, on the basis of a result of said second specified area tracking processing and said registered image, a registered image having a same size and a same posture as those of said object as a correction image for correcting said taken image; and a synthesizer configured to synthesize, on the basis of a result of said second specified area tracking processing, said correction image with said second specified area in said taken image, wherein, if a ratio of an area of a screen for displaying said taken image to an area of said correction image is equal to or higher than a reference value, said synthesizer synthesizes said correction image with said second specified area in said taken image and, if said ratio is below said reference value, synthesizes said correction image with said taken image as an image for said screen in the entirety thereof.

2. The image processing apparatus according to claim 1, wherein said first specified area tracker executes said first specified area tracking processing on each taken image in a period of time ranging from the taking of an image for use in the recognition by said recognizer to the ending of said first specified area tracking processing.

3. The image processing apparatus according to claim 1, further comprising:
a generator configured to generate, on the basis of a result of said second specified area tracking processing and said registered image, a registered image having substantially a same size as that of said object and a predetermined posture as a correction image for correcting said taken image; and
a synthesizer configured to synthesize, on the basis of a result of said second specified area tracking processing, said correction image with a location of said second specified area in said taken image.

4. The image processing apparatus according to claim 1, further comprising:
a generator configured to generate, on the basis of a result of said second specified area tracking processing and an associated image associated with said registered image, an associated image having substantially a same size and a same posture as those of said object as a correction image for correcting said taken image; and
a synthesizer configured to synthesize, on the basis of a result of said second specified area tracking processing, said correction image with said second specified area in said taken image.

5. The image processing apparatus according to claim 1, wherein said first specified area tracker has a first specifier configured to specify said first specified area;
a first extractor configured to extract a first feature point in said first specified area in said taken image;
a first calculator configured to calculate first movement information indicative of a movement of said first feature point;
a first parameter calculator configured to calculate a first parameter indicative of a location and a posture of said first specified area from said first movement information;
a first error calculator configured to calculate a first error that is an error between a multiplication value obtained by multiplying said first parameter by a value indicative of a location of a first feature point in said first specified area of a taken image taken before said taken image and a value indicative of a location of a first feature point in said first specified area in said taken image; and
a second score calculator configured to calculate a first score of said first parameter on the basis of said first error;
wherein said first specifier shifts said first specified area on the basis of said first parameter having said first score having the highest thereof, said second specified area tracker has
a second specifier configured to specify said second specified area on the basis of said first parameter;
a second extractor configured to extract a second feature point in said second specified area in said taken image;
a second calculator configured to calculate second movement information indicative of a movement of said second feature point;
a second parameter calculator configured to calculate a second parameter indicative of a location and a posture of said second specified area from said second movement information;
a second error calculator configured to calculate a second error that is an error between a multiplication value obtained by multiplying said second parameter by a value indicative of a location of a first feature point in said second specified area of a taken image taken before said taken image and a value indicative of a location of a second feature point in said second specified area in said taken image; and
a score calculator configured to calculate a second score of said second parameter on the basis of said second error;
wherein said second specifier shifts said second specified area on the basis of said second parameter having said second score having the highest thereof.

6. The image processing apparatus according to claim 5, wherein said first movement information and said second movement information are each an optical flow.

7. The image processing apparatus according to claim 5, wherein said first parameter and said second parameter are each at least one of parameters of affine transformation and projective transformation.

8. The image processing apparatus according to claim 5, wherein said first parameter calculator calculates said first parameter from said first movement information of at least one of at least three of said first feature points and at least four of said first feature points; and
said second parameter calculator calculates said second parameter from said second movement information of at least one of at least three of said second feature points and at least four of said second feature points.

9. An image processing method for an image processing apparatus for recognizing, from a taken image, an object corresponding to a registered image, comprising the steps of:
taking an image of a subject to obtain said taken image of said subject;
recognizing, from said taken image, an object corresponding to said registered image;
executing first specified area tracking processing for tracking, in said taken image, a first tracking area specified on the basis of a result of recognition in said recognizing step;
executing second specified area tracking processing for tracking a second specified area specified on the basis of a result of said first specified area tracking processing;
generating, on the basis of a result of said second specified area tracking processing and said registered image, a registered image having a same size and a same posture as those of said object as a correction image for correcting said taken image; and
synthesizing, on the basis of a result of said second specified area tracking processing, said correction image with said second specified area in said taken image,
wherein, if a ratio of an area of a screen for displaying said taken image to an area of said correction image is equal to or higher than a reference value, said synthesizer synthesizes said correction image with said second specified area in said taken image and, if said ratio is below said reference value, synthesizes said correction image with said taken image as an image for said screen in the entirety thereof.

10. A program configured to make a computer execute recognition processing for recognizing, from a taken image, an object corresponding to a registered image registered in advance, comprising the steps of:
- taking an image of a subject to obtain said taken image of said subject;
- recognizing, from said taken image, an object corresponding to said registered image;
- executing first specified area tracking processing for tracking, in said taken image, a first tracking area specified on the basis of a result of recognition in said recognizing step;
- executing second specified area tracking processing for tracking a second specified area specified on the basis of a result of said first specified area tracking processing;
- generating, on the basis of a result of said second specified area tracking processing and said registered image, a registered image having a same size and a same posture as those of said object as a correction image for correcting said taken image; and
- synthesizing, on the basis of a result of said second specified area tracking processing, said correction image with said second specified area in said taken image,
- wherein, if a ratio of an area of a screen for displaying said taken image to an area of said correction image is equal to or higher than a reference value, said synthesizer synthesizes said correction image with said second specified area in said taken image and, if said ratio is below said reference value, synthesizes said correction image with said taken image as an image for said screen in the entirety thereof.

11. An image processing apparatus for recognizing, from a taken image, an object corresponding to a registered image registered in advance, comprising:
- an image taker configured to take an image of a subject to obtain said taken image corresponding to said subject;
- a recognizer configured to recognize, from said taken image, an object corresponding to said registered image;
- two specified area trackers configured to execute a first specified area tracking processing for tracking, in said taken image, a first specified area specified on the basis of a result of recognition by said recognizer and second specified area tracking processing for tracking, in said taken image, a second specified area specified on the basis of a result of said first specified area tracking processing;
- a generator configured to generate, on the basis of a result of said second specified area tracking processing and said registered image, a registered image having a same size and a same posture as those of said object as a correction image for correcting said taken image; and
- a synthesizer configured to synthesize, on the basis of a result of said second specified area tracking processing, said correction image with said second specified area in said taken image,
- wherein said two specified area trackers alternately execute said second specified area tracking processing with one of said two specified area trackers starting said first specified area tracking processing while the other is executing said second specified area tracking processing, and
- wherein, if a ratio of an area of a screen for displaying said taken image to an area of said correction image is equal to or higher than a reference value, said synthesizer synthesizes said correction image with said second specified area in said taken image and, if said ratio is below said reference value, synthesizes said correction image with said taken image as an image for said screen in the entirety thereof.

12. The image processing apparatus according to claim 11, wherein one of said two specified area trackers executes said first specified area tracking processing in each taken image taken in a period of time ranging from the taking of a taken image for use in the recognition by said recognizer to the end of said first specified area tracking processing and executes said second specified area tracking processing in each taken image taken in a period of time ranging from the end of said first specified area tracking processing to the end of said first specified area tracking processing executed by the other specified area tracker.

13. An image processing method for an image processing apparatus for recognizing, from a taken image, an object corresponding to a registered image registered in advance, comprising the steps of:
- taking an image of a subject to obtain said taken image corresponding to said subject;
- recognizing, from said taken image, an object corresponding to said registered image;
- executing, by two specified area trackers, a first specified area tracking processing for tracking, in said taken image, a first specified area specified on the basis of a result of recognition by said recognizer and second specified area tracking processing for tracking, in said taken image, a second specified area specified on the basis of a result of said first specified area tracking processing;
- generating, on the basis of a result of said second specified area tracking processing and said registered image, a registered image having a same size and a same posture as those of said object as a correction image for correcting said taken image; and
- synthesizing, on the basis of a result of said second specified area tracking processing, said correction image with said second specified area in said taken image,
- wherein, while one of first specified area tracking processing for tracking, in said taken image, a first specified area specified on the basis of a result of said recognition and second specified area tracking processing for tracking, in said taken image, a second specified area on the basis of a result of said first specified area tracking processing is executing said second specified area tracking processing, the other starts said first specified area tracking processing, thereby alternately executing said second specified area tracking processing, and
- wherein, if a ratio of an area of a screen for displaying said taken image to an area of said correction image is equal to or higher than a reference value, said synthesizer synthesizes said correction image with said second specified area in said taken image and, if said ratio is below said reference value, synthesizes said correction image with said taken image as an image for said screen in the entirety thereof.

14. A program configured to make a computer execute recognition processing for recognizing, from a taken image, an object corresponding to a registered image registered in advance, comprising the steps of:
- taking an image of a subject to obtain said taken image corresponding to said subject;
- recognizing, from said taken image, an object corresponding to said registered image;

executing, by two specified area trackers, a first specified area tracking processing for tracking, in said taken image, a first specified area specified on the basis of a result of recognition by said recognizer and second specified area tracking processing for tracking, in said taken image, a second specified area specified on the basis of a result of said first specified area tracking processing;

generating, on the basis of a result of said second specified area tracking processing and said registered image, a registered image having a same size and a same posture as those of said object as a correction image for correcting said taken image; and synthesizing, on the basis of a result of said second specified area tracking processing, said correction image with said second specified area in said taken image, wherein, while one of first specified area tracking processing for tracking, in said taken image, a first specified area specified on the basis of a result of said recognition and second specified area tracking processing for tracking, in said taken image, a second specified area on the basis of a result of said first specified area tracking processing is executing said second specified area tracking processing, the other starts said first specified area tracking processing, thereby alternately executing said second specified area tracking processing, and wherein, if a ratio of an area of a screen for displaying said taken image to an area of said correction image is equal to or higher than a reference value, said synthesizer synthesizes said correction image with said second specified area in said taken image and, if said ratio is below said reference value, synthesizes said correction image with said taken image as an image for said screen in the entirety thereof.

15. An image processing apparatus for recognizing an object corresponding to a registered image from a taken image, comprising:

image taking means configured to take an image of a subject to obtain said taken image of said subject;

recognizing means configured to recognize, from said taken image, an object corresponding to said registered image;

first specified area tracking means configured to execute first specified area tracking processing for tracking, in said taken image, a first tracking area specified on the basis of a result of recognition by said recognizing means;

second specified area tracking means configured to execute second specified area tracking processing for tracking a second specified area specified on the basis of a result of said first specified area tracking processing;

generating means configured to generate, on the basis of a result of said second specified area tracking processing and said registered image, a registered image having a same size and a same posture as those of said object as a correction image for correcting said taken image; and synthesizing means configured to synthesize, on the basis of a result of said second specified area tracking processing, said correction image with said second specified area in said taken image, wherein, if a ratio of an area of a screen for displaying said taken image to an area of said correction image is equal to or higher than a reference value, said synthesizer synthesizes said correction image with said second specified area in said taken image and, if said ratio is below said reference value, synthesizes said correction image with said taken image as an image for said screen in the entirety thereof.

* * * * *